United States Patent
Tazume

(10) Patent No.: US 11,775,899 B2
(45) Date of Patent: Oct. 3, 2023

(54) DEVICE, METHOD, AND SYSTEM FOR MULTIPLE-LOCATION PICK-UP OF PRODUCTS AND DELIVERY

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 91 days.

(21) Appl. No.: 17/362,081

(22) Filed: Jun. 29, 2021

(65) Prior Publication Data

US 2022/0101233 A1 Mar. 31, 2022

(30) Foreign Application Priority Data

Sep. 30, 2020 (JP) ................................. 2020-165942

(51) Int. Cl.
*G06Q 10/0835* (2023.01)
*G06Q 10/0631* (2023.01)
(Continued)

(52) U.S. Cl.
CPC ... *G06Q 10/06315* (2013.01); *G01C 21/3407* (2013.01); *G01C 21/3605* (2013.01);
(Continued)

(58) Field of Classification Search
CPC ......... G06Q 10/06315; G06Q 10/0835; G06Q 30/0639; G06Q 50/28; G01C 21/3407; G01C 21/3605; G07C 5/008
See application file for complete search history.

(56) References Cited

U.S. PATENT DOCUMENTS 9,552,564 B1 * 1/2017 Martenis ............ G07C 9/00571
10,613,536 B1 * 4/2020 Lathia ............... G06Q 10/08355
(Continued)

FOREIGN PATENT DOCUMENTS

JP 2003-30550 A 1/2003
JP 2003-208549 A 7/2003
(Continued)

OTHER PUBLICATIONS

Askri, Ahlem; "Mono-objective and multi-objective models for the pickup and delivery problem with time windows"; May 1, 2015; https://ieeexplore.ieee.org/stamp/stamp.jsp?tp=&arnumber=7230941 (Year: 2015).*

*Primary Examiner* — Rupangini Singh
*Assistant Examiner* — David G. Godbold
(74) *Attorney, Agent, or Firm* — Sughrue Mion, PLLC

(57) ABSTRACT

An information processing system, a device, and a method capable of identifying a time required for a vehicle to transport a product to a specified location specified by a user or an arrival time at which a product, transported by a vehicle, arrives at the specified location with high precision. An acceptor accepts product information relating to a product purchasable by a user and performance information indicating vehicle performance of a vehicle associated with the user. An identifier performs identification of a time required for the vehicle to transport the product relating to the accepted product information to a location specified by the user or identification of an arrival time at which the product arrives at the specified location, based on the accepted performance information.

20 Claims, 25 Drawing Sheets

(51) Int. Cl.
  *G07C 5/00* (2006.01)
  *G01C 21/36* (2006.01)
  *G06Q 50/28* (2012.01)
  *G01C 21/34* (2006.01)
  *G06Q 30/0601* (2023.01)

(52) U.S. Cl.
  CPC ..... *G06Q 10/0835* (2013.01); *G06Q 30/0639* (2013.01); *G06Q 50/28* (2013.01); *G07C 5/008* (2013.01)

(56) References Cited

U.S. PATENT DOCUMENTS

| | | | |
|---|---|---|---|
| 2019/0188629 A1 | 6/2019 | Fujisawa | |
| 2019/0228375 A1* | 7/2019 | Laury | G05D 1/0088 |
| 2019/0287046 A1* | 9/2019 | Skaaksrud | B60W 10/20 |
| 2020/0184541 A1* | 6/2020 | Nagarathinam | H04N 23/90 |
| 2021/0241224 A1* | 8/2021 | Taniguchi | G06Q 10/0832 |
| 2021/0398070 A1* | 12/2021 | Rockman | G06Q 10/0838 |

FOREIGN PATENT DOCUMENTS

| | | |
|---|---|---|
| JP | 2004-227373 A | 8/2004 |
| JP | 2017-220126 A | 12/2017 |
| JP | 2019-121086 A | 7/2019 |
| JP | 2020-7148 A | 1/2020 |
| WO | 2017/119096 A1 | 7/2017 |

* cited by examiner

FIG. 7

USER TABLE

| USER ID | PASSWORD | SPECIFIED LOCATION |
|---|---|---|
| U01 | ... | ...SETAGAYA-KU, TOKYO |
| U02 | ... | ...CHUO-KU, TOKYO |
| ... | ... | ... |

FIG. 8

SHOP TABLE

| | SHOP ID | LOCATION INFORMATION | VEHICLE ID | VEHICLE PERFORMANCE | LOAD TIME |
|---|---|---|---|---|---|
| 1 | SH1 | ···CHIYODA-KU, TOKYO | NULL | NULL | 7 MIN. |
| 2 | SH2 | ···CHUO-KU, TOKYO | 400 | 30 km/h | 5 MIN. |

FIG. 9

PRODUCT TABLE

| PRODUCT INFORMATION | SHOP ID | STOCK FLAG |
|---|---|---|
| S01 | SH1 | IN STOCK |
| S01 | SH2 | IN STOCK |
| ... | ... | ... |
| S02 | SH1 | OUT OF STOCK |
| ... | ... | ... |

FIG. 18

STOREHOUSE TABLE

| | STOREHOUSE ID | LOCATION INFORMATION | VEHICLE ID | VEHICLE PERFORMANCE | LOAD TIME |
|---|---|---|---|---|---|
| 1 | ST1 | ···CHIYODA-KU, TOKYO | NULL | NULL | 7 MIN. |
| 2 | ST2 | ···CHUO-KU, TOKYO | 400 | 30 km/h | 5 MIN. |

FIG. 19

PRODUCT TABLE

| PRODUCT INFORMATION | STOREHOUSE ID | STOCK FLAG |
|---|---|---|
| S01 | ST1 | IN STOCK |
| S01 | ST2 | IN STOCK |
| ... | ... | ... |
| S02 | ST1 | OUT OF STOCK |
| ... | ... | ... |

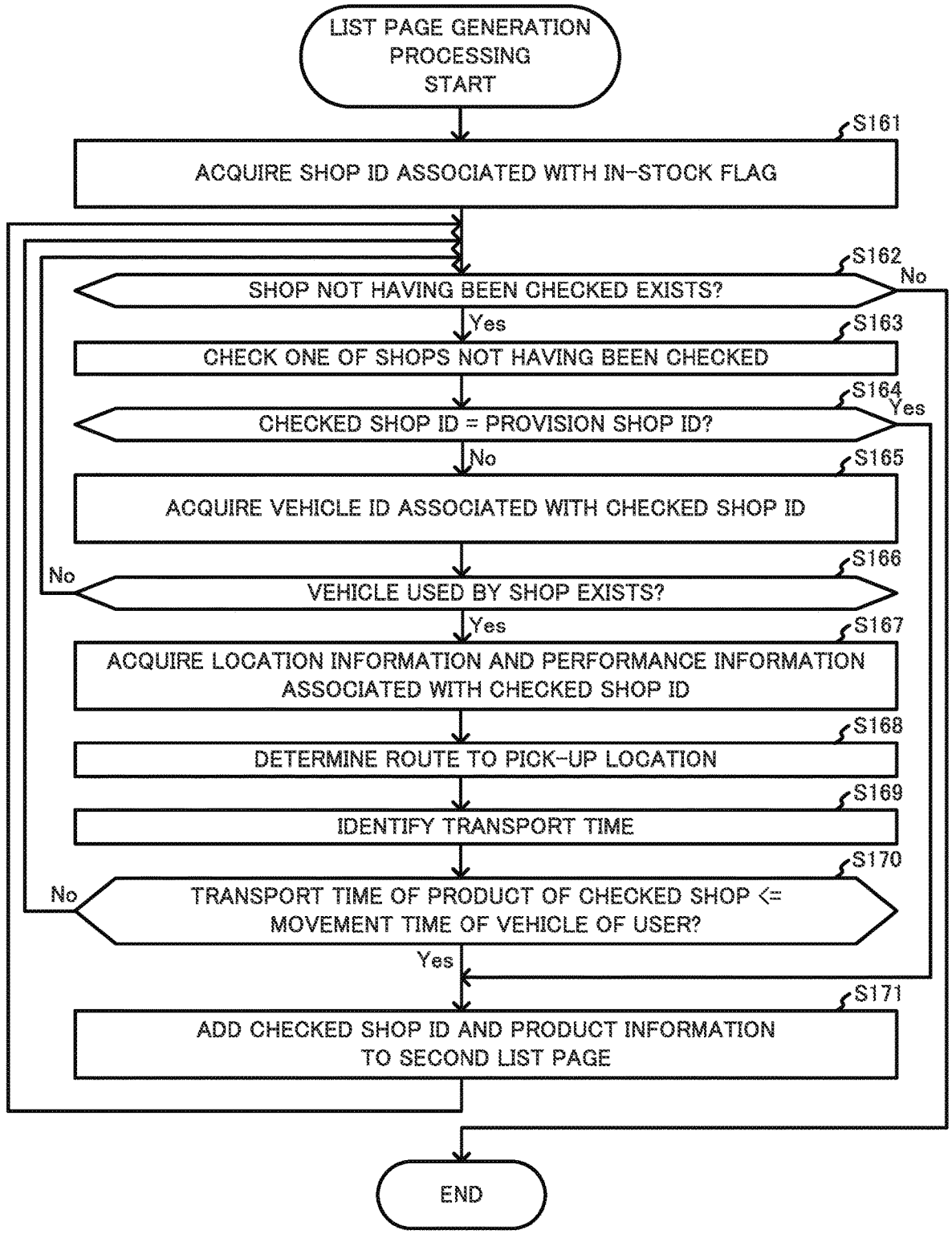

DEVICE, METHOD, AND SYSTEM FOR MULTIPLE-LOCATION PICK-UP OF PRODUCTS AND DELIVERY

TECHNICAL FIELD

The present disclosure relates to an information processing system, a device, and a method.

BACKGROUND ART

Conventionally, a system that identifies a required time required for a vehicle to transport a product to a specified location specified by a user and that, based on the identified required time, causes the vehicle to transport a product has been known (for example, Patent Literature 1).

CITATION LIST

Patent Literature

Patent Literature 1: Unexamined Japanese Patent Application Publication No. 2019-121086

SUMMARY OF INVENTION

Technical Problem

A required time required for a vehicle to transport a product is determined based on not only the location of the vehicle and the location of a specified location but also vehicle performance of the vehicle. In addition, when a product is transported by a vehicle associated with a user, such as a vehicle owned by a user himself/herself, vehicle performance determining a required time is determined depending on what type of vehicle is associated with the user. However, since a system in Patent Literature 1 only calculates a required time, based on the location of a vehicle and the location of a specified location, there has been a problem in that the system cannot identify both a required time required for the vehicle to transport a product to a specified location and an arrival time at which the product, transported by the vehicle, arrives at the specified location, with high precision.

Accordingly, the present disclosure has been made in consideration of the above-described problem, and an objective of the present disclosure is to provide an information processing system, a device, and a method that is capable of identifying a required time required for a vehicle to transport a product to a specified location specified by a user or an arrival time at which a product, transported by a vehicle, arrives at the specified location, with high precision.

Solution to Problem

In order to achieve the above-described objective, an information processing system according to a first aspect of the present disclosure includes:

an acceptor that accepts product information relating to a product purchasable by a user and performance information indicating vehicle performance of a vehicle associated with the user; and an identifier that performs identification of a required time required for the vehicle to transport the product relating to the accepted product information to a specified location specified by the user or identification of an arrival time at which the product, transported by the vehicle, arrives at the specified location, based on the accepted performance information.

Advantageous Effects of Invention

An information processing system, a device, and a method according to the present disclosure enable a required time required for a vehicle to transport a product to a specified location specified by a user or an arrival time at which a product, transported by a vehicle, arrives at the specified location to be identified with high precision.

BRIEF DESCRIPTION OF DRAWINGS

FIG. 7 is a diagram illustrating an example of a user table that the information processing device of the business office stores;

FIG. 8 is a diagram illustrating an example of a shop table that the information processing device of the business office stores;

FIG. 9 is a diagram illustrating an example of a product table that the information processing device of the business office according to Embodiment 1 stores;

FIG. 18 is a diagram illustrating an example of a storehouse table that the information processing device of the business office stores;

FIG. 19 is a diagram illustrating an example of a product table that the information processing device of the business office according to Modified Example 6 of Embodiment 1 stores;

FIG. 24 is a flowchart illustrating an example of list page generation processing that the information processing device of the business office executes.

DESCRIPTION OF EMBODIMENTS

Embodiment 1

Hereinafter, Embodiment 1 of the present disclosure will be described with reference to the drawings.

Figure 1:
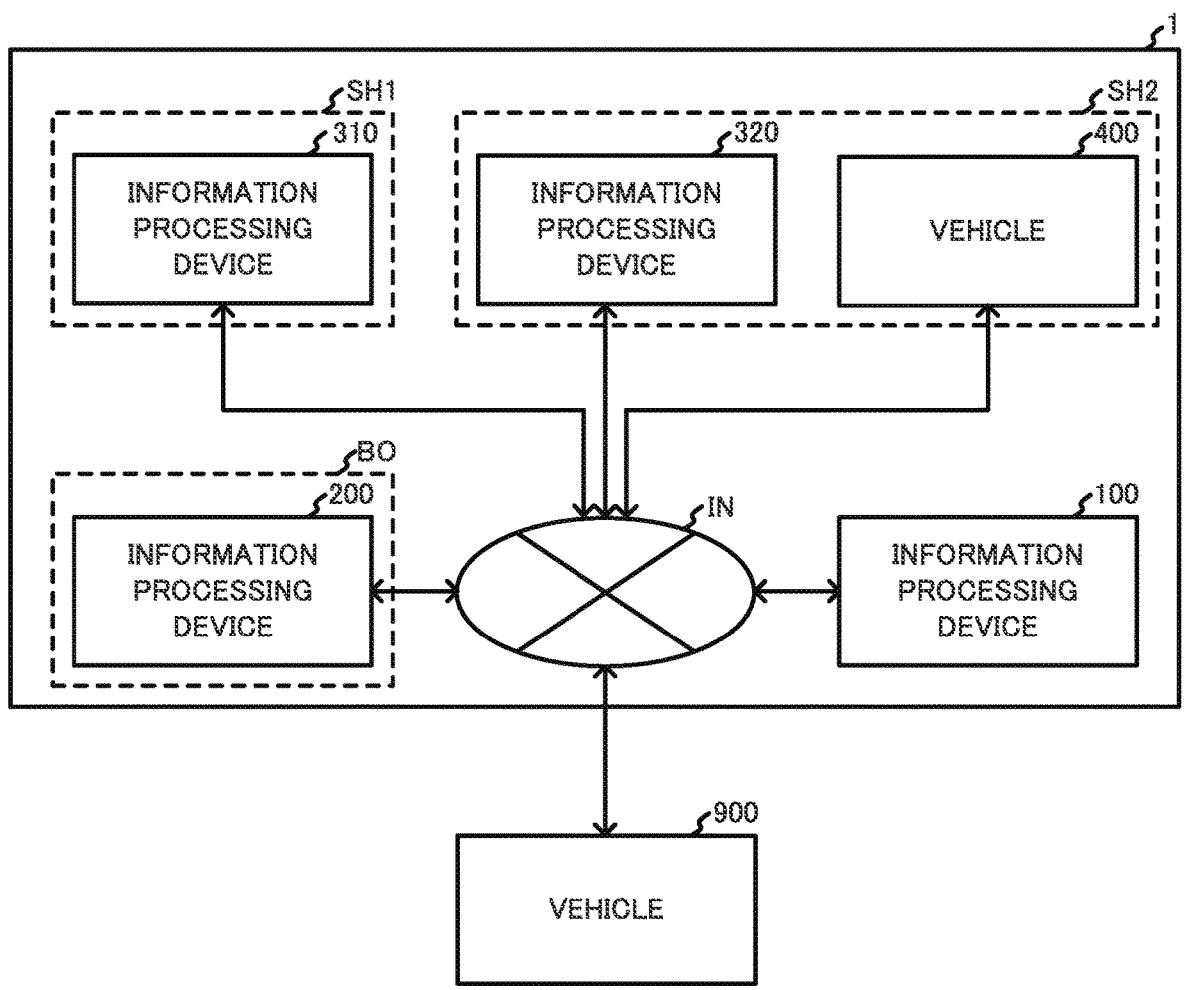
FIG. 1 is a system configuration diagram illustrating a configuration example of an information processing system according to Embodiment 1 of the present disclosure.

An information processing system 1 according to Embodiment 1 of the present disclosure includes an information processing device 100, as illustrated in FIG. 1, that is carried by a user who purchases a product and an information processing device 200 that performs, on a vehicle 900 that the user owns, control of causing the vehicle 900 to transport a purchased product to a specified location that is specified by the user. As described above, in the present embodiment, the information processing system 1 does not include the vehicle 900 but includes the information processing device 200 that controls the vehicle 900.

In addition, the information processing system 1 includes an information processing device 310 that is installed in a shop SH1 that sells a product and that manages stock of the product sold by the shop SH1 and an information processing device 320 that is installed in a shop SH2 and that manages stock of a product sold by the shop SH2.

Further, the information processing system 1 further includes a vehicle 400 that an employee of the shop SH2 uses to cause the vehicle 400 to transport a product sold by the shop SH2 from the shop SH2 to a pick-up location at which the vehicle 900 picks up the product. Since an employee of the shop SH1 does not use a vehicle for transport of a product sold by the shop SH1, the information processing device 200 that the information processing system 1 includes performs, on the vehicle 900, control of causing the vehicle 900 to pick up a product sold by the shop SH1 at the shop SH1.

Figure 2:
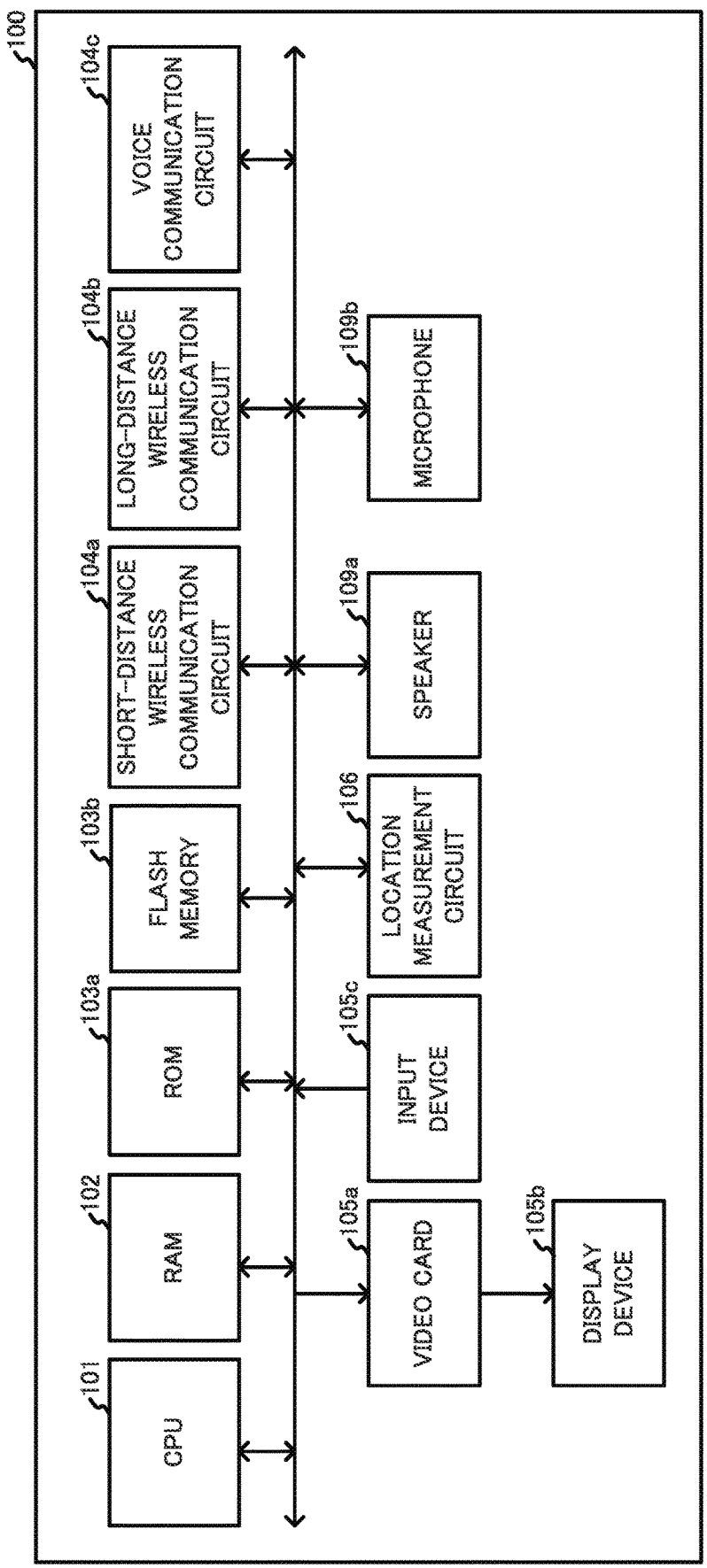
FIG. 2 is a hardware configuration diagram illustrating a configuration example of an information processing device carried by a user.

The information processing device 100 of the user is a smartphone and includes a central processing unit (CPU) 101, a random access memory (RAM) 102, a read only memory (ROM) 103a, a flash memory 103b, a short-distance wireless communication circuit 104a, a long-distance wireless communication circuit 104b, a voice communication circuit 104c, a video card 105a, a display device 105b, an input device 105c, a location measurement circuit 106, a speaker 109a, and a microphone 109b, which are hardware components, as illustrated in FIG. 2. Although, in the present embodiment, the information processing device 100 includes one CPU 101, the information processing device 100 may include a plurality of CPUs. In addition, the information processing device 100 may include a plurality of RAMs and may include a plurality of flash memories.

The CPU 101 of the information processing device 100 performs overall control of the information processing device 100 by executing programs stored in the ROM 103a or the flash memory 103b. The RAM 102 temporarily stores data to be processed at the times of execution of the programs by the CPU 101.

The ROM 103a and the flash memory 103b of the information processing device 100 store various types of programs. The flash memory 103b further stores various types of data that are used in the execution of the programs and tables in which data are stored. The information processing device 100 may include a hard disk in place of the flash memory 103b.

The short-distance wireless communication circuit 104a of the information processing device 100 is a network interface card (NIC) and performs, in accordance with a communication standard, such as Bluetooth (registered trademark) low energy (BLE), data communication using radio waves over a short distance from several meters to several tens of meters. The long-distance wireless communication circuit 104b is a NIC and performs, in accordance with a communication standard, such as long term evolution (LTE) or 5th generation (5G), data communication using radio waves with a not-illustrated base station connected to the Internet IN over a long distance of several kilometers. In this way, the long-distance wireless communication circuit 104b of the information processing device 100 performs data communication with the information processing devices 200, 310, and 320 and the vehicles 400 and 900, which are connected to the Internet IN. The voice communication circuit 104c performs voice communication with a not-illustrated base station, using radio waves.

The video card 105a of the information processing device 100 renders images, based on digital signals output from the CPU 101 and also outputs image signals that represent the rendered images. The display device 105b is an electroluminescence (EL) display and displays images in accordance with the image signals output from the video card 105a. The information processing device 100 may include a plasma display panel (PDP) or a liquid crystal display (LCD) in place of the EL display. The input device 105c is one or more of a touch pad and a button and inputs a signal corresponding to an operation by the user.

The location measurement circuit 106 of the information processing device 100 is a quasi-zenith satellite system (QZSS) circuit. The location measurement circuit 106 receives signals emitted from quasi-zenith satellites, measures latitude, longitude, and altitude indicating a location of the information processing device 100, based on the received signals, and outputs a signal indicating the measured latitude, longitude, and altitude. The location measurement circuit 106 may be, instead of the QZSS circuit, a global positioning system (GPS) circuit that receives GPS signals emitted by GPS satellites and measures latitude, longitude, and altitude indicating a location of the information processing device 100, based on the received GPS signals.

The speaker 109a of the information processing device 100 outputs sound in accordance with a signal output by the CPU 101, and the microphone 109b of the information processing device 100 outputs a signal representing ambient sound around the information processing device 100.

Figure 3:
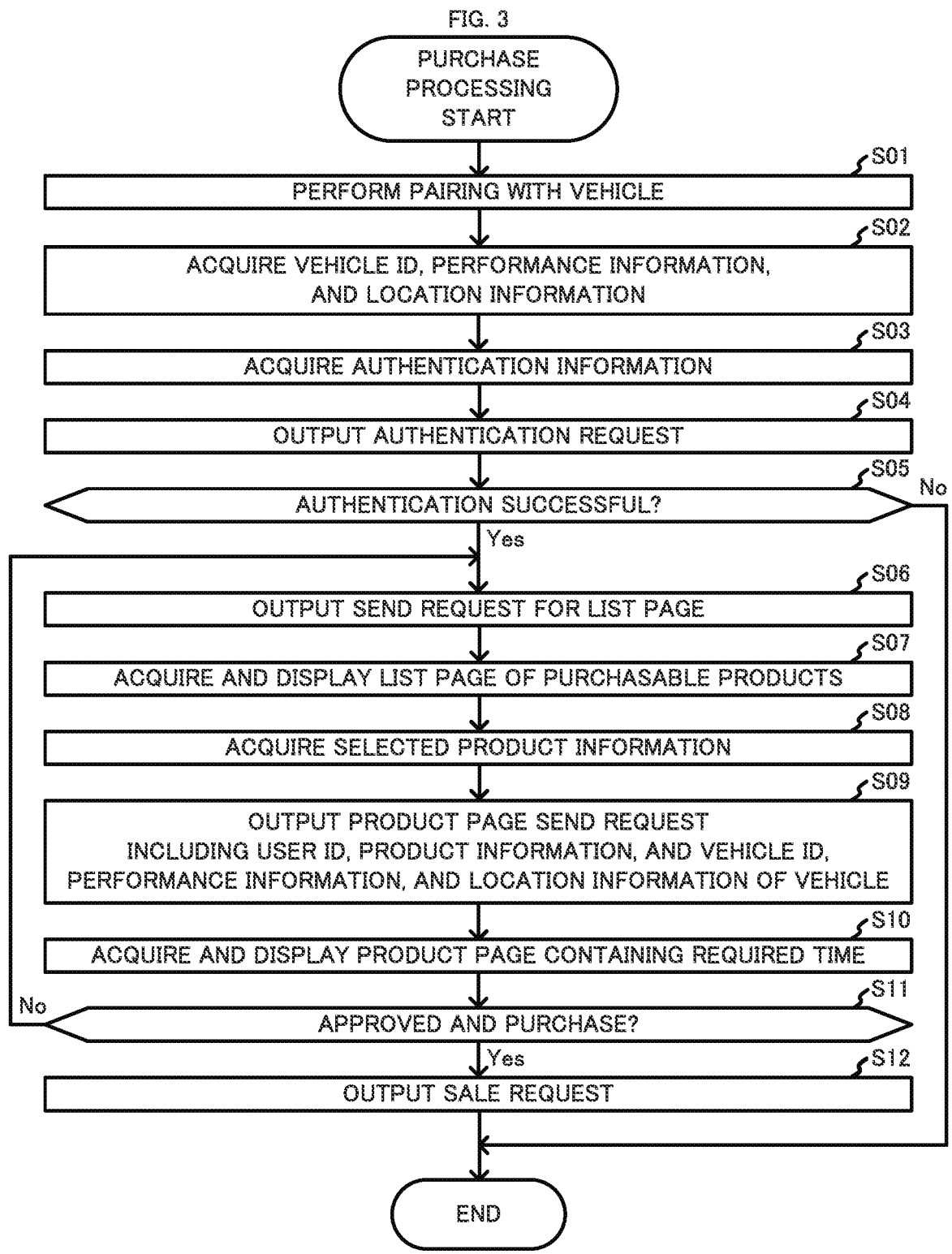
FIG. 3 is a flowchart illustrating an example of purchase processing that the information processing device of the user according to Embodiment 1 executes.

The user carrying the information processing device 100 moves to a location at which the vehicle 900 that is caused to transport a product to be purchased and the short-distance wireless communication circuit 104a of the information processing device 100 can communicate with each other and subsequently performs an operation for purchasing the product on the information processing device 100. When the input device 105c of the information processing device 100 outputs a signal corresponding to the operation, the CPU 101 of the information processing device 100 starts execution of purchase processing as illustrated in FIG. 3.

When the execution of the purchase processing is started, the CPU 101 of the information processing device 100 performs control of causing the short-distance wireless communication circuit 104a of the information processing device 100 to pair with the vehicle 900 (step S01). Subsequently, the CPU 101 outputs a send request requesting sending of information relating to the vehicle 900 to the short-distance wireless communication circuit 104a with the vehicle 900 as the destination.

In the present embodiment, the information relating to the vehicle 900 includes a vehicle identification (ID) "900" that identifies the vehicle 900, performance information indicating vehicle performance of the vehicle 900, location information representing a location of the vehicle 900 in latitude, longitude, and altitude, and a communication address assigned to the vehicle 900. In addition, the vehicle performance of the vehicle 900 includes mobile performance of the vehicle 900. Further, the vehicle 900 is an unmanned ground vehicle, the mobile performance of the vehicle 900 includes traveling performance of the vehicle 900, and the traveling performance of the vehicle 900 is represented by a maximum traveling speed that is achievable by the vehicle 900. Although, in the present embodiment, the traveling performance of the vehicle 900 is represented by the maximum traveling speed of the vehicle 900, the present embodiment is not limited thereto, and the traveling performance of the vehicle 900 may be represented by an average traveling speed of the vehicle 900.

When the short-distance wireless communication circuit 104a of the information processing device 100 receives information relating to the vehicle 900 from the vehicle 900, the CPU 101 of the information processing device 100 acquires the information from the short-distance wireless communication circuit 104a. Subsequently, the CPU 101 acquires, from the acquired information, the vehicle ID "900", the performance information, the location information, and the communication address of the vehicle 900, which is associated with the information processing device 100 of the user by pairing being established (step S02).

In the present embodiment, the vehicle 900 that is associated with the information processing device 100 is also associated with the user who carries the information processing device 100 via the information processing device 100. Thus, hereinafter, the vehicle 900 is referred to as the vehicle 900 associated with the user.

Although, in the present embodiment, pairing being established between the information processing device 100 and the vehicle 900 means that the information processing device 100 and the vehicle 900 exchange encryption keys used for communication, with each other, the present embodiment is not limited thereto, and the pairing may mean exchange and saving of encryption keys. Thus, in the present embodiment, when pairing has been established between the information processing device 100 and the vehicle 900, the information processing device 100 can acquire various types of information from the vehicle 900 as described above while preventing contents of communicated information from being known by a third party. Further, when pairing has been established between the information processing device 100 and the vehicle 900, the information processing device 100 may control operation, including, for example, movement, or a state of the vehicle 900 by sending a control command to the vehicle 900 while preventing contents of control from being known by a third party. In this case, when receiving a control command, the vehicle 900 may operate or change a state in accordance with the control command.

After having executed step S02, the CPU 101 of the information processing device 100 causes the display device 105b to display a message that prompts input of authentication information including a user ID identifying the user and a password that the user has set in advance. When the user who has visually recognized the message operates the input device 105c of the information processing device 100, the input device 105c outputs a signal corresponding to the operation. The CPU 101 of the information processing device 100 acquires authentication information of the user, based on the signal (step S03). Next, the CPU 101 outputs an authentication request that includes the acquired authentication information and that requests authentication of the user to the long-distance wireless communication circuit 104b with the information processing device 200 as the destination (step S04).

When the long-distance wireless communication circuit 104b of the information processing device 100 has not received a success report announcing that the authentication has succeeded from the information processing device 200 by the time when a predetermined period has elapsed since the long-distance wireless communication circuit 104b sent the authentication request to the information processing device 200, the CPU 101 of the information processing device 100 determines that the authentication has failed (step S05; No). Subsequently, the CPU 101 causes the display device 105b to display a message notifying that the authentication has failed and subsequently terminates the execution of the purchase processing.

In contrast, when a success report is received before a predetermined period elapses after the long-distance wireless communication circuit 104b of the information processing device 100 sent the authentication request, the CPU 101 of the information processing device 100 determines that the authentication has succeeded (step S05; Yes).

Next, the CPU 101 of the information processing device 100 generates a send request requesting sending of a list page that is a web page in which a list of product information relating to products that are purchasable (hereinafter, referred to as purchasable products) is contained. Subsequently, the CPU 101 outputs the generated send request to the long-distance wireless communication circuit 104b with the information processing device 200 as the destination (step S06). Although, in the present embodiment, product information relating to a purchasable product is a product number representing a type of the purchasable product, the present embodiment is not limited thereto, and the product information may be information indicating the name of the type of the purchasable product or a combination of information indicating the product number and information indicating the name.

When the long-distance wireless communication circuit 104b of the information processing device 100 receives a list page of product information from the information processing device 200, the CPU 101 of the information processing device 100 acquires the list page from the long-distance wireless communication circuit 104b and causes the display device 105b to display the acquired list page (step S07).

The user who has visually recognized the list page performs, on the information processing device 100, an operation of selecting a piece of product information relating to a product that the user considers purchasing out of one or a plurality of pieces of product information contained in the list page. When the input device 105c of the information processing device 100 outputs a signal corresponding to the operation, the CPU 101 of the information processing device 100 acquires the selected product information, based on the signal (step S08).

Subsequently, the CPU 101 of the information processing device 100 generates a send request requesting sending of a product page that is a web page in which a description of a product relating to the product information selected by the user (hereinafter, referred to as a selected product) is contained. In the product page, not only the description of the selected product but also a required time required for the vehicle 900 associated with the user to transport the selected product to a specified location specified by the user is contained.

Thus, the CPU 101 of the information processing device 100 associates the user ID identifying the user, the product information selected by the user, and the vehicle ID "900", the performance information, the location information, and the communication address of the vehicle 900, which is associated with the user, with one another and adds the associated information to the generated send request, and subsequently outputs the send request to the long-distance wireless communication circuit 104b with the information processing device 200 as the destination (step S09).

When the long-distance wireless communication circuit 104b of the information processing device 100 receives a product page in which a required time is contained from the information processing device 200, the CPU 101 of the information processing device 100 acquires the product page from the long-distance wireless communication circuit 104b. Next, the CPU 101, by causing the display device 105b to display the acquired product page (step S10), notifies the user of the required time contained in the product page.

When the user who has visually recognized the description and required time of the selected product contained in the product page does not approve the required time or does not decide to purchase the selected product, the user performs an operation for redisplaying the list page (hereinafter, referred to as a redisplay operation) on the information processing device 100. In contrast, when the user approves the required time and decides to purchase the selected product, the user performs an operation for approval and purchase (hereinafter, simply referred to as a purchase operation) on the information processing device 100. Although, in the present embodiment, in order to simplify description, it is described that the user purchases one selected product, the present embodiment is not limited thereto.

When the input device 105c of the information processing device 100 outputs a signal corresponding to the redisplay operation, the CPU 101 determines that the required time is not approved or purchase of the selected product is not decided (step S11; No). Subsequently, the CPU 101, by repeating the above-described processing from step S06, causes the list page to be redisplayed.

In contrast, when the input device 105c of the information processing device 100 outputs a signal corresponding to the purchase operation, the CPU 101 determines that the required time is approved and the purchase of the selected product is decided (step S11; Yes). Subsequently, the CPU 101 outputs a sale request that is both a report announcing that the required time is approved and a request requesting sale of the selected product to the long-distance wireless communication circuit 104b with the information processing device 200 as the destination (step S12) and subsequently terminates the execution of the purchase processing.

Figure 4:
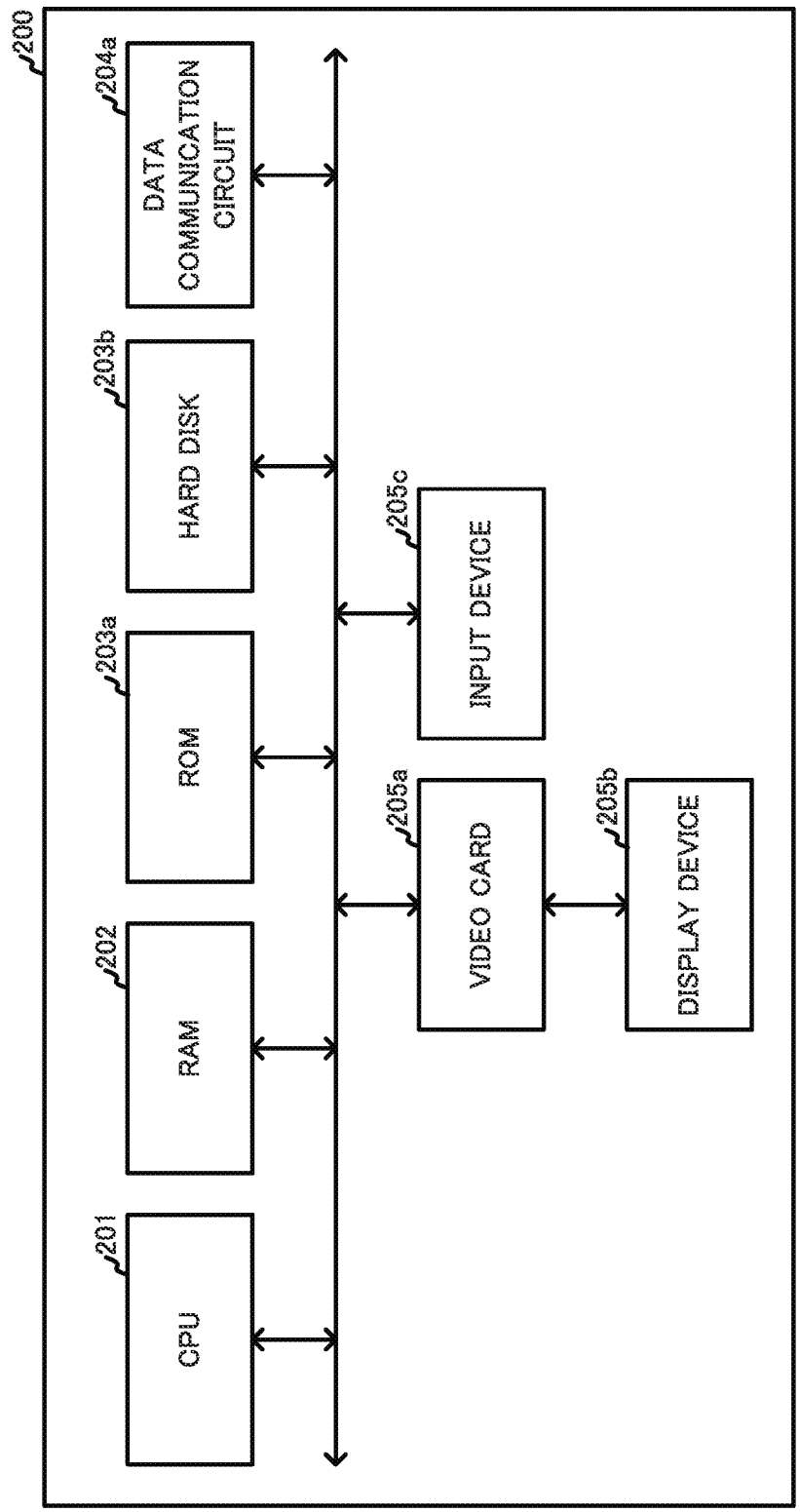
FIG. 4 is a hardware configuration diagram illustrating a configuration example of an information processing device installed at a business office.

The information processing device 200 that receives a sale request from the information processing device 100 is a server machine and is installed in a business office BO of a broker that mediates sale of a product. The information processing device 200 includes a CPU 201, a RAM 202, a ROM 203a, a hard disk 203b, a data communication circuit 204a, a video card 205a, a display device 205b, and an input device 205c, which are hardware components, as illustrated in FIG. 4. Although, in the present embodiment, the information processing device 200 includes one CPU 201, the information processing device 200 may include a plurality of CPUs. In addition, the information processing device 200 may include a plurality of RAMs and may include a plurality of flash memories.

Configurations and functions of the CPU 201, the RAM 202, the ROM 203a, the data communication circuit 204a, the video card 205a, and the display device 205b that the information processing device 200 includes are the same as the configurations and functions of the CPU 101, the RAM 102, the ROM 103a, the long-distance wireless communication circuit 104b, the video card 105a, and the display device 105b, illustrated in FIG. 2, that the information processing device 100 includes, respectively.

The hard disk 203b of the information processing device 200 stores various types of programs, various types of data used in execution of the various types of programs, and tables in which data are stored. The information processing device 200 may include a flash memory in place of the hard disk 203b.

The input device 205c of the information processing device 200 is one or more of a keyboard, a mouse, a touch pad, and a button and inputs a signal corresponding to an operation by an employee of the sales broker.

Figure 5:
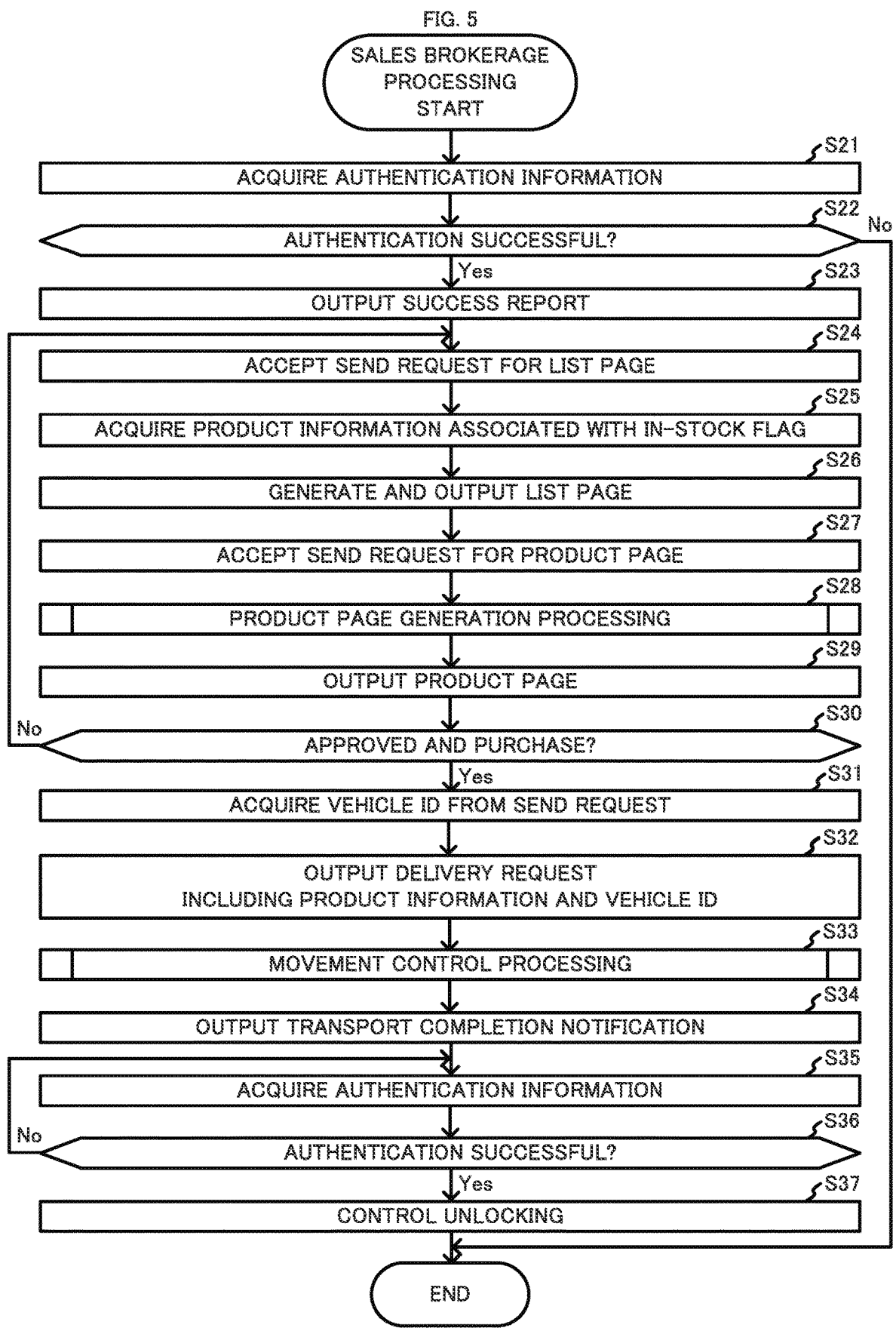
FIG. 5 is a flowchart illustrating an example of sales brokerage processing that the information processing device of the business office according to Embodiment 1 executes.
Figure 6:
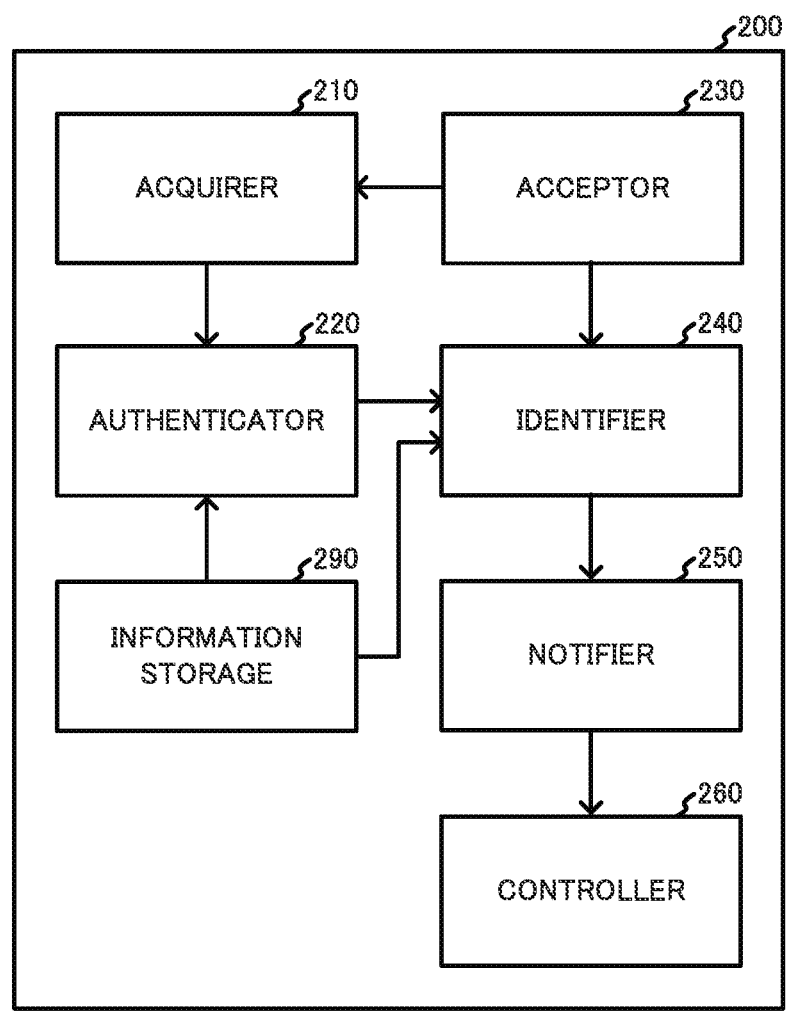
FIG. 6 is a functional block diagram illustrating an example of functions that the information processing device of the business office has.

When the data communication circuit 204a of the information processing device 200 receives an authentication request from the information processing device 100, the CPU 201 of the information processing device 200 authenticates the user who operates the information processing device 100, based on the authentication request and, when the authentication succeeds, executes sales brokerage processing, as illustrated in FIG. 5, of mediating sale of a product. Through this processing, the CPU 201 functions as an acquirer 210, as illustrated in FIG. 6, that acquires authentication information from the authentication request and an authenticator 220 that performs authentication, based on the acquired authentication information.

The CPU 201 of the information processing device 200 also functions as an acceptor 230 that accepts a send request including product information relating to a selected product that is a product selected by a user and that is purchasable by the user and performance information indicating vehicle performance of the vehicle 900 associated with the user.

In the present embodiment, the acceptance that the information processing device 200 performs means acquisition of received information from the data communication circuit 204a. In addition, the acquisition that the information processing device 200 performs means acquisition of information, using a method different from the acceptance and includes, for example, acquisition of information included in accepted information, acquisition of information that the hard disk 203b stores, and acquisition of information, based on a signal output from the input device 205c.

Further, the CPU 201 of the information processing device 200 functions as an identifier 240 that performs identification of a required time required for the vehicle 900 to transport a selected product relating to accepted product information to a specified location specified by the user, based on performance information included in an accepted send request. Still further, the CPU 201 functions as a notifier 250 that notifies the user of an identified required time. In addition, the CPU 201 functions as a controller 260 that, when a sale request requesting sale of a selected product is received by the data communication circuit 204a, performs, on the vehicle 900, control of causing the vehicle 900 to transport the selected product to a specified location in an identified required time.

The hard disk 203b of the information processing device 200 functions as an information storage 290 that stores information used in the execution of the sales brokerage processing. The information storage 290 stores, in advance, a user table, as illustrated in FIG. 7, in which information relating to users is stored in advance. A plurality of records is stored in the user table in advance, and, in each record, a user ID identifying a user, information indicating a password that the user has set in advance, and information indicating a specified location in an address are associated with one another and stored in advance.

The information storage 290 of the information processing device 200 stores, in advance, a shop table, as illustrated in FIG. 8, in which information relating to the shops SH1 and SH2, which sell products, is stored in advance. A plurality of records is stored in advance in the shop table. In the present embodiment, in order to simplify description, the following description will be made using, as a specific example, a case where, in the first record, a shop ID "SH1" identifying the shop SH1, information indicating the location of the shop SH1 in an address, character strings "NULL" indicating that the shop SH1 does not have a vehicle that an employee of the shop SH1 uses, and information indicating a load time required for an employee of the shop SH1 to load a product on the vehicle 900 are associated with one another and stored in advance.

In the present embodiment, the load time at the shop SH1 is an average value of times that have been required for employees of the shop SH1 to load a product on the vehicle 900 in the past. However, the load time is not limited to an average value, and the load time may be a maximum value of times that have ever been required to load a product on the vehicle 900 in the past and a person skilled in the art can determine, by experiment, a suitable value.

In addition, in the present embodiment, in the second record in the shop table, a shop ID "SH2" identifying the shop SH2, information indicating the location of the shop SH2 in an address, a vehicle ID "400" of the vehicle 400 that an employee of the shop SH2 uses, performance information indicating vehicle performance of the vehicle 400, and information indicating a load time required for an employee of the shop SH2 to load a product on the vehicle 400 are associated with one another and stored in advance.

In the present embodiment, the load time at the shop SH2 is an average value of times that have been required for employees of the shop SH2 to load a product on the vehicle 400 in the past. However, the load time is not limited to an average value, and the load time may be a maximum value of times that have ever been required to load a product on the vehicle 400 in the past and a person skilled in the art can determine, by experiment, a suitable value.

The information storage 290 of the information processing device 200 also stores, in advance, a product table, as illustrated in FIG. 9, in which information relating to products that the shops SH1 and SH2 sell is stored in advance. A plurality of records is stored in the product table in advance, and, in each record, product information relating to a product, the shop ID "SH1" or "SH2" identifying the shop SH1 or SH2 that sells the product, and a stock flag indicating whether or not the product is in stock in the shop SH1 or SH2 are associated with one another and stored in advance.

When the execution of the sales brokerage processing in FIG. 5 is started, the acceptor 230 of the information processing device 200 accepts an authentication request received from the information processing device 100. Next, the acquirer 210 acquires authentication information from the accepted authentication request (step S21). Next, the acquirer 210 acquires, from the user table in FIG. 7, information indicating a password associated with a user ID included in the authentication information. Subsequently, when the authenticator 220 determines that the password indicated by the information acquired from the user table and a password indicated by information included in the authentication information do not coincide with each other, the authenticator 220 determines that the user authentication has failed (step S22; No) and terminates the execution of the sales brokerage processing.

In contrast, when the authenticator 220 of the information processing device 200 determines that the two passwords coincide with each other, the authenticator 220 determines that the user authentication has succeeded (step S22; Yes) and outputs a success report announcing that the authentication has succeeded to the data communication circuit 204a with the information processing device 100 as the destination (step S23).

Subsequently, when the data communication circuit 204a of the information processing device 200 receives a send request for a list page, the acceptor 230 of the information processing device 200 accepts the received send request (step S24). Next, the acquirer 210 of the information processing device 200 acquires one or a plurality of pieces of product information that is associated with stock flags each of which indicates that the product is in stock from the product table in FIG. 9 (step S25). Since a product that is in stock is a product purchasable by the user, the identifier 240 generates a list page in which a list of the acquired one or plurality of pieces of product information is contained. Next, the identifier 240 outputs the generated list page to the data communication circuit 204a with the information processing device 100 as the destination (step S26).

Figure 10:
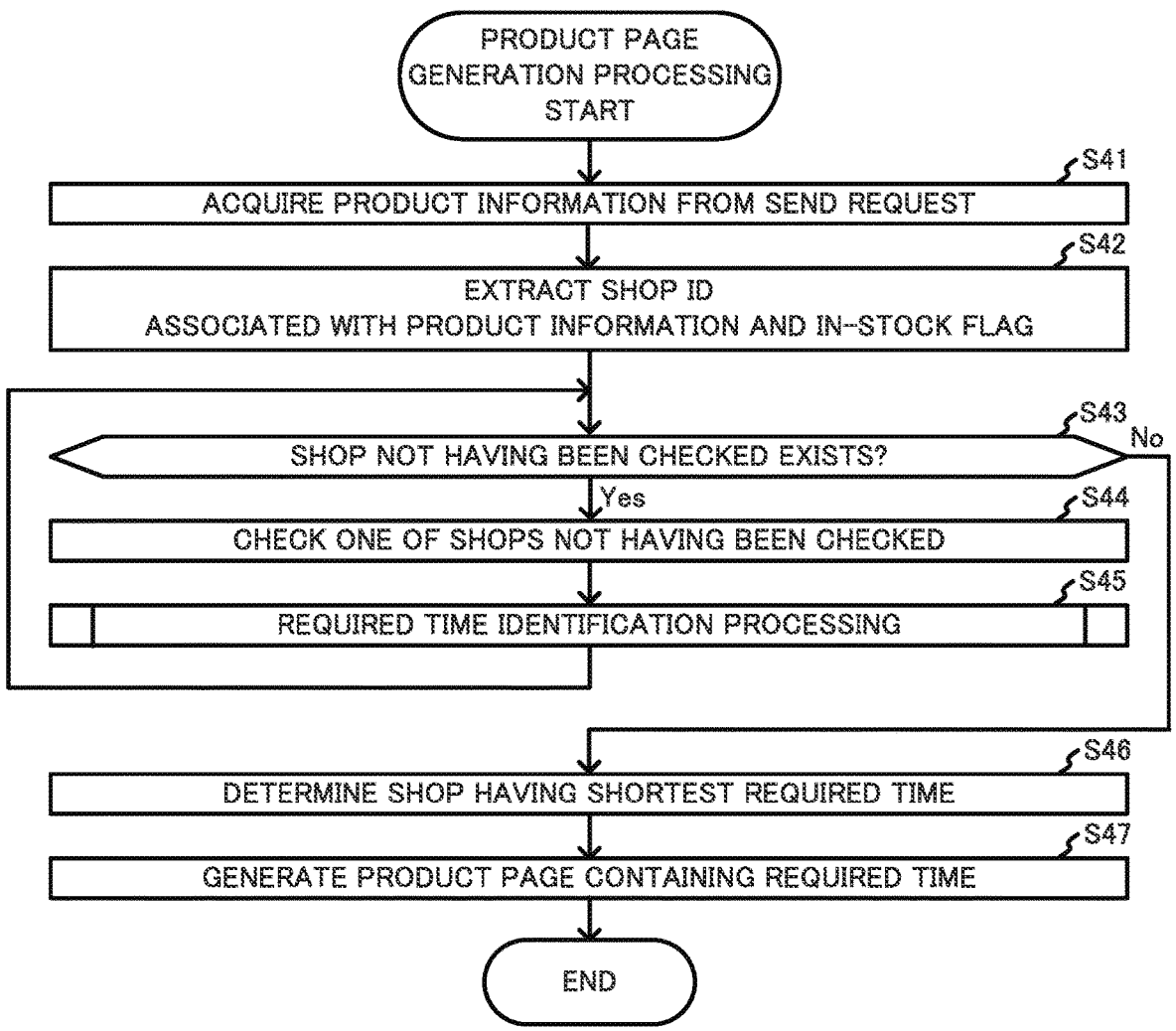
FIG. 10 is a flowchart illustrating an example of product page generation processing that the information processing device of the business office executes.

Subsequently, when the data communication circuit 204a of the information processing device 200 receives a send request requesting sending of a product page of a selected product that is a product relating to product information selected by the user who has visually recognized the list page, the acceptor 230 accepts the received send request (step S27). Next, the information processing device 200 executes product page generation processing, as illustrated in FIG. 10, of generating a product page that is requested to be sent (step S28).

When the execution of the product page generation processing is started, the identifier 240 of the information processing device 200 acquires the product information selected by the user from the accepted send request (step S41) and extracts one or more shop IDs associated with the acquired product information and stock flags indicating that the product is in stock, from the product table in FIG. 9 (step S42). Through this processing, the shop IDs of shops that can sell the selected product because the selected product is in stock are extracted.

Subsequently, when the identifier 240 of the information processing device 200 determines that there exists a shop ID that has not been checked among the extracted one or plurality of shop IDs (step S43; Yes), the identifier 240 sets one of the shop IDs that have not been checked, as a target of a check (step S44). In the present embodiment, in order to simplify description, the following description will be made using, as a specific example, a case where the shop ID "SH1" identifying the shop SH1 is set as a target of a check.

Figure 11:
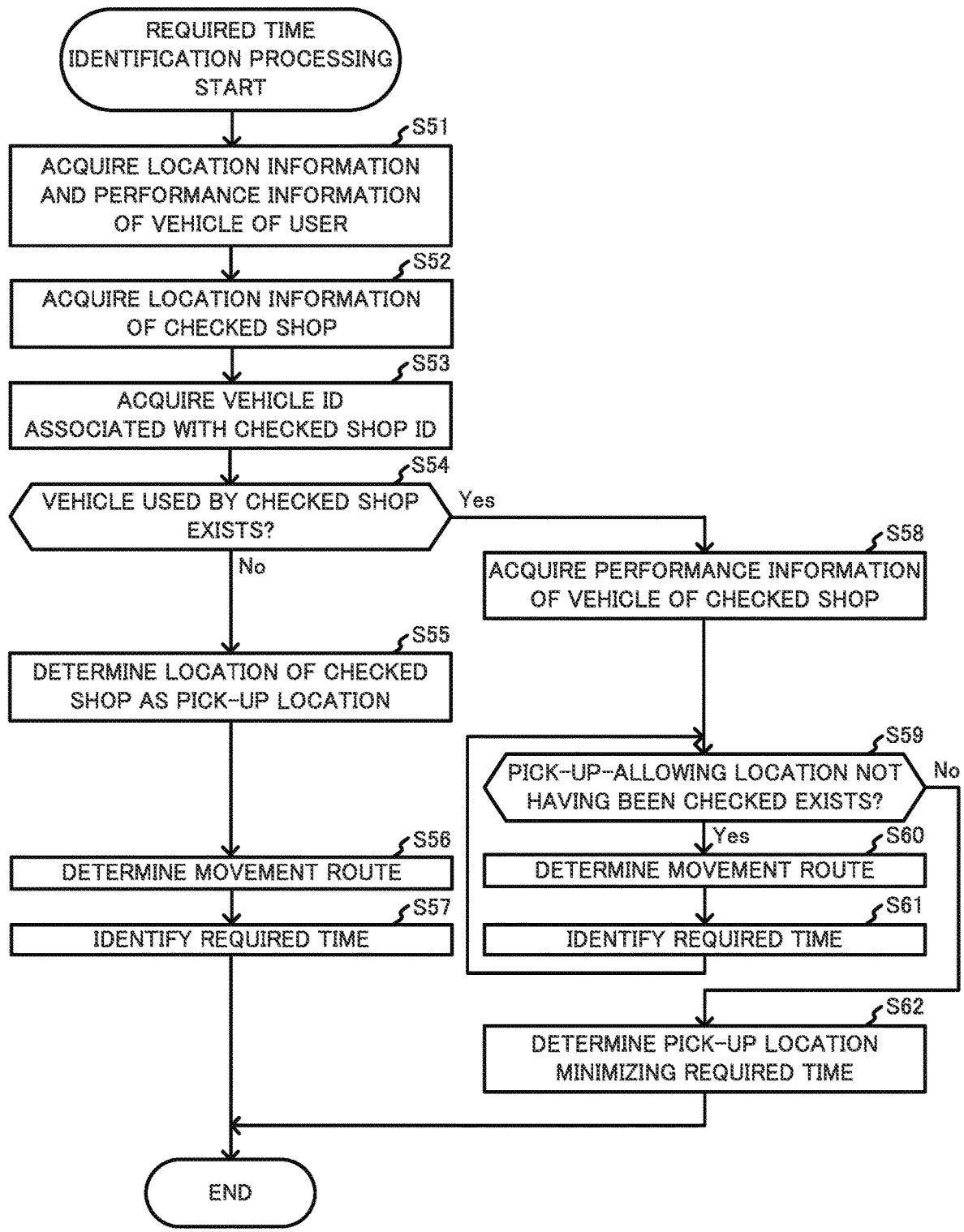
FIG. 11 is a flowchart illustrating an example of required time identification processing that the information processing device of the business office executes.

Subsequently, the information processing device 200 executes required time identification processing, as illustrated in FIG. 11, of identifying a required time required for the vehicle 900 to transport a product that is sold by the shop (hereinafter, referred to as a checked shop) SH1 identified by the checked shop ID (hereinafter, referred to as a checked shop ID) "SH1" to a specified location specified by the user (step S45). In the present embodiment, the required time required for the vehicle 900 to transport a product to a specified location means a period from the vehicle 900 sets off and starts movement to a pick-up location until the vehicle 900, storing a product that the vehicle 900 picked up at the pick-up location, arrives at the specified location specified by the user, and does not mean a period from the vehicle 900 sets off from the pick-up location until the vehicle 900 arrives at the specified location.

When the execution of the required time identification processing is started, the acquirer 210 of the information processing device 200 acquires location information indicating a location of the vehicle 900 associated with the user in latitude, longitude, and altitude and performance information of the vehicle 900 from the send request accepted in step S27 in FIG. 5 (step S51).

Next, the acquirer 210 of the information processing device 200 acquires location information that is information associated with the checked shop ID "SH1" and that indicates the location of the checked shop SH1 in an address from the shop table in FIG. 8 (step S52) and acquires information indicating latitude, longitude, and altitude that the information storage 290 has associated with the acquired location information in advance and stored. Through this processing, location information indicating the location of the checked shop SH1 in latitude, longitude, and altitude is acquired.

Subsequently, the acquirer 210 of the information processing device 200 acquires a vehicle ID "NULL" associated with the checked shop ID "SH1" from the shop table (step S53) and determines that the value "NULL" of the acquired vehicle ID indicates that there exists no vehicle used by an employee of the checked shop SH1 (step S54; No). Subsequently, the identifier 240 determines the location of the checked shop SH1 as a pick-up location at which the vehicle 900 picks up a product (step S55).

Subsequently, the identifier 240 of the information processing device 200 reads a not-illustrated partial route table in which information relating to partial routes, such as a road, on which the vehicle 900 can move is stored from the information storage 290. In the partial route table, a plurality of records is stored in advance, and, in each record, the latitude, longitude, and altitude of the start node of an edge that is a partial route, the latitude, longitude, and altitude of the end node of the edge, and information representing distance of the edge are associated with one another and stored in advance.

Next, the identifier 240 of the information processing device 200 executes a route search algorithm, such as Dijkstra's algorithm, using latitude, longitude, and altitude indicating each of the location of the vehicle 900, the start nodes and end nodes of a plurality of edges, and the location of the pick-up location. Through this processing, the identifier 240 determines a shortest whole route from the location of the vehicle 900 to the pick-up location (hereinafter, referred to as a first route) by combining partial routes. Next, the identifier 240 generates information that indicates the first route and that includes (i) information indicating the locations of a plurality of nodes included in the first route in latitude, longitude, and altitude and (ii) information indicating a visiting sequence of the plurality of nodes.

Subsequently, the acquirer 210 of the information processing device 200 acquires a user ID from the send request accepted in step S27 in FIG. 5 and acquires information that indicates a specified location in an address and that is associated with the acquired user ID in the user table in FIG. 7. Next, the acquirer 210 acquires information indicating latitude, longitude, and altitude that the information storage 290 has associated with the acquired information in advance and stored. Through this processing, location information indicating the specified location in latitude, longitude, and altitude is acquired. Next, the identifier 240 of the information processing device 200 determines a shortest whole route from the pick-up location to the specified location (hereinafter, referred to as a second route), based on the location information of the pick-up location at which the vehicle 900 picks up the product and the location information of the specified location specified by the user and generates information indicating the determined second route.

In this way, the identifier 240 of the information processing device 200 determines a movement route on which the vehicle 900 moves in order to transport the product (step S56). The movement route is a route including the first route from the location of the vehicle 900 to the pick-up location and the second route from the pick-up location to the specified location.

Subsequently, the identifier 240 of the information processing device 200 identifies a movement time required for the vehicle 900 to move to the pick-up location by dividing the distance of the first route from the location of the vehicle 900 to the pick-up location by the maximum speed indicated by the performance information of the vehicle 900.

Next, the acquirer 210 of the information processing device 200 acquires information indicating a load time associated with the checked shop ID "SH1" from the shop table in FIG. 8. Subsequently, the identifier 240 identifies a movement time required for the vehicle 900 to move from the pick-up location to the specified location, based on the distance of the second route from the pick-up location to the specified location specified by the user and the performance information of the vehicle 900.

Next, the identifier 240 of the information processing device 200 calculates the sum of the movement time required for the vehicle 900 to move to the pick-up location, the load time required for an employee to load the product on the vehicle 900 at the pick-up location, and the movement time required for the vehicle 900 to move from the pick-up location to the specified location. Through this processing, the identifier 240 identifies a required time from the vehicle 900 sets off and starts movement until the vehicle 900 transports the product that the vehicle 900 picked up at the pick-up location and arrives at the specified location (step S57) and subsequently terminates the execution of the required time identification processing.

After having executed the required time identification processing in step S45 in FIG. 10, the information processing device 200 repeats the above-described processing from step S43. In the present embodiment, in order to simplify description, the following description will be made using, as a specific example, a case where the shop ID "SH2" identifying the shop SH2 has not been checked and the shop ID "SH2" is set as a target of a check.

In step S43, when the identifier 240 of the information processing device 200 determines that the shop ID "SH2" has not been checked (step S43; Yes), the identifier 240 sets the shop ID "SH2" as a target of a check (step S44). Subsequently, the information processing device 200 executes the required time identification processing in FIG. 11 in order to identify a required time required for the vehicle 900 to transport a product that is sold by the checked shop SH2 to the specified location (step S45).

When the execution of the required time identification processing is started, the information processing device 200 executes the processing in steps S51 to S53 (steps S51 to S53). Through this processing, the information processing device 200 acquires location information of the checked shop SH2 associated with the checked shop ID "SH2" and the vehicle ID "400" from the shop table in FIG. 8. Subsequently, the identifier 240 of the information processing device 200 determines that the value "400" of the acquired vehicle ID indicates that there exists a vehicle used by an employee of the checked shop SH2 and the vehicle to be used is the vehicle 400 (step S54; Yes).

Next, the acquirer 210 of the information processing device 200 acquires performance information of the vehicle 400 associated with the checked shop ID "SH2" from the shop table (step S58). Next, the identifier 240, based on the performance information of the vehicle 900 and the vehicle 400, determines a pick-up location at which the vehicle 900 picks up the product that the vehicle 400 transports from the checked shop SH2, based on a required time from the vehicle 900 sets off and starts movement until the vehicle 900 transports the product that the vehicle 900 picked up at the pick-up location and arrives at the specified location. In the present embodiment, in order to simplify description, the following description will be made using, as a specific example, a case where, at the time of start of the execution of the required time identification processing, the vehicle 400 is parked at the checked shop SH2.

Although, in the present embodiment, it will be described that the identifier 240 of the information processing device 200 determines a location that minimizes the required time as a pick-up location, the present embodiment is not limited thereto. The identifier 240 may assign priorities to a plurality of pick-up-allowing locations at which the vehicle 900 can pick up the product that the vehicle 400 has transported in ascending order of required times, select a location out of one or a plurality of locations the assigned priorities of which are higher than a predetermined priority, based on, for example, a software-generated random number or a predetermined rule, and determine the selected location to be the pick-up location.

For this purpose, the acquirer 210 of the information processing device 200 acquires a plurality of pieces of location information indicating, in latitude, longitude, and altitude, pick-up-allowing locations that the information storage 290 stores in advance. Next, the identifier 240 identifies an equation representing a smallest sphere including the location of the vehicle 900 and the location of the checked shop SH2, based on the latitude, longitude, and altitude indicating the location of the vehicle 900 and the latitude, longitude, and altitude indicating the location of the checked shop SH2. Subsequently, the identifier 240 identifies one or a plurality of pieces of location information indicating pick-up-allowing locations that are located on the inner side of the surface of the sphere out of the acquired one or plurality of pieces of location information, based on the identified equation. In this way, for each of one or a plurality of pick-up-allowing locations that are located between the location of the checked shop SH2 and the location of the vehicle 900, a piece of location information is identified. Although, in the present embodiment, the pick-up-allowing locations include, for example, a road and a parking lot at which the vehicle 400 and the vehicle 900 can stop, the present embodiment is not limited thereto.

Subsequently, when the identifier 240 of the information processing device 200 determines that there exists a location that has not been checked among the pick-up-allowing locations that are respectively indicated by the acquired one or plurality of pieces of location information (step S59; Yes), the identifier 240 sets one of the locations that have not been checked, as a target of a check. Next, the identifier 240 determines a first route that is the shortest whole route that starts from the location of the vehicle 900 and reaches the checked location that is a location set as a target of a check, using the partial route table and generates information indicating the first route. The identifier 240 also determines a second route that is the shortest whole route that starts from the checked location and reaches the specified location and generates information indicating the second route. Subsequently, the identifier 240 determines a movement route of the vehicle 900 including the first route and the second route.

Likewise, the identifier 240 of the information processing device 200 determines a shortest whole route from the checked shop SH2 at which the vehicle 400 is parked to the checked location (hereinafter, referred to as a third route) (step S60) and generates information indicating the determined third route.

Subsequently, the identifier 240 of the information processing device 200 identifies a movement time required for the vehicle 900 to move to the checked location, based on the distance of the first route from the location of the vehicle 900 to the checked location and the performance information of the vehicle 900 associated with the user. Next, the identifier 240 identifies a time required for the product to be transported to the checked location by the vehicle 400.

The acquirer 210 of the information processing device 200 acquires information indicating a load time associated with the checked shop ID "SH2" from the shop table in FIG. 8. Subsequently, the identifier 240 identifies a movement time required for the vehicle 400 to move to the checked location, based on the distance of the third route from the checked shop SH2 to the checked location and the performance information of the vehicle 400 of the checked shop SH2. Next, the identifier 240 identifies a time required for the product to be transported to the checked location by adding a load time indicated by the acquired information to the movement time required for the vehicle 400 to move to the checked location.

Subsequently, the identifier 240 of the information processing device 200 identifies the longer time between the time required for the product to be transported to the checked location and the movement time required for the vehicle 900 to move to the checked location as a time required for the product to become able to be picked up.

Subsequently, the acquirer 210 of the information processing device 200 acquires information indicating a pick-up time required for the vehicle 900 to pick up the product that the vehicle 400 has transported, from the information storage 290. In the present embodiment, the pick-up time is an average value of times that have been required for the vehicle 900 to pick up products in the past. However, the pick-up time is not limited to an average value, and the pick-up time may be a maximum value of times that have ever been required for the vehicle 900 to pick up products in the past, and a person skilled in the art can determine a suitable value by experiment or based on the designs of the vehicle 900 and the vehicle 400.

Next, the identifier 240 of the information processing device 200 identifies a movement time required for the vehicle 900 that has picked up the product to move from the checked location to the specified location, based on the distance of the second route from the checked location to the specified location and the performance information of the vehicle 900.

Subsequently, the identifier 240 of the information processing device 200 adds the pick-up time and the movement time required for the vehicle 900 to move to the specified location to the time required for the product to become able to be picked up. Through this processing, the identifier 240 identifies a required time from the vehicle 900 sets off and starts movement until the vehicle 900 transports the product that the vehicle 900 picked up at the pick-up location and arrives at the specified location (step S61). Subsequently, the information processing device 200 repeats the above-described processing from step S59.

When, in step S59, it is determined that there exists no pick-up-allowing location that has not been checked (step S59; No), the identifier 240 of the information processing device 200 determines a pick-up-allowing location for which the shortest required time is identified to be the pick-up location at which the vehicle 900 picks up the product from the vehicle 400 (step S62), and the information processing device 200 subsequently terminates the execution of the required time identification processing.

After having executed the required time identification processing in step S45 in FIG. 10, the information processing device 200 repeats the above-described processing from step S43. On this occasion, when the identifier 240 of the information processing device 200 determines that there exists no shop ID that has not been checked (step S43; No), the identifier 240 determines a shop that provides the user with the product (hereinafter, referred to as a provision shop) out of the shops identified by the extracted one or plurality of shop IDs, based on one or more required times identified in step S45 (step S46).

Although, in the present embodiment, the identifier 240 of the information processing device 200 determines one of shops for which the shortest required time is identified to be a provision shop, the present embodiment is not limited thereto. The identifier 240 may assign priorities to the shops identified by the one or more shop IDs extracted in step S42 in ascending order of identified required times, select a shop out of one or a plurality of shops the assigned priorities of which are higher than a predetermined priority, based on, for example, a software-generated random number or a predetermined rule and determine the selected shop to be the provision shop.

In the present embodiment, in order to simplify description, the following description will be made using, as a specific example, a case where the shop SH1 is determined to be the provision shop that provides the user with the product.

After the processing in step S46 has been executed, the acquirer 210 of the information processing device 200 acquires a product page in which a description of a product relating to the product information is contained and that is a web page that the information storage 290 has associated with the product information acquired in step S41 in advance and stored. Next, the notifier 250 of the information processing device 200, by adding information indicating the shortest required time to the product page, generates a product page in which a description of the selected product selected by the user and the required time are contained (step S47). Subsequently, the notifier 250 terminates the execution of the product page generation processing.

After the product page generation processing has been executed in step S28 in FIG. 5, the notifier 250 of the information processing device 200 outputs the product page in which the required time is contained to the data communication circuit 204a with the information processing device 100 as the destination (step S29). Through this processing, the notifier 250 notifies the user carrying the information processing device 100 of the required time.

Subsequently, when the data communication circuit 204a of the information processing device 200 receives a send request for a list page instead of a sale request, the controller 260 of the information processing device 200 determines that the required time is not approved or sale of the selected product is not requested (step S30; No). Subsequently, the information processing device 200 repeats the above-described processing from step S24.

In contrast, when the data communication circuit 204a of the information processing device 200 receives a sale request, the controller 260 determines that the required time is approved and the sale of the selected product is requested (step S30; Yes). Subsequently, the acquirer 210 acquires the vehicle ID "900" of the vehicle 900 associated with the user from the send request accepted in step S27 (step S31).

Next, the controller 260 of the information processing device 200 generates a request that includes the product information acquired in step S41 in FIG. 10 and the vehicle ID "900" of the vehicle 900 and that requests a product relating to the product information to be sold and the sold product to be delivered to the vehicle 900 identified by the vehicle ID "900" (hereinafter, simply referred to as a delivery request). Subsequently, the controller 260 outputs the delivery request to the data communication circuit 204a with the information processing device 310, which is a sending destination corresponding to the provision shop SH1 determined to be the shop providing the product, as the destination (step S32).

The sending destination corresponding to the provision shop SH1 is not limited to the information processing device 310 and may be, for example, an e-mail address of one of employees of the provision shop SH1 including the shop manager of the provision shop SH1. In this case, the information processing device 310 may be, for example, a smartphone, be carried by the employee, and receive a delivery request that was sent with the e-mail address as the destination, from a not-illustrated mail server on the inside or outside of the provision shop SH1. Alternatively, the sending destination corresponding to the provision shop SH1 may be, for example, an application program that is executed in the information processing device 310 carried by the employee of the provision shop SH1.

When receiving the delivery request, the information processing device 310 of the shop SH1 displays the product information and the vehicle ID "900" included in the delivery request. The employee of the shop SH1 who has visually recognized the display on the information processing device 310 finds a product relating to the displayed product information in, for example, a warehouse, settles accounts for sale of the found product, and subsequently waits for arrival of the vehicle 900 identified by the displayed vehicle ID "900". Although, in the present embodiment, in order to simplify description, it is described that one selected product is sold, the present embodiment is not limited thereto.

Figure 12:
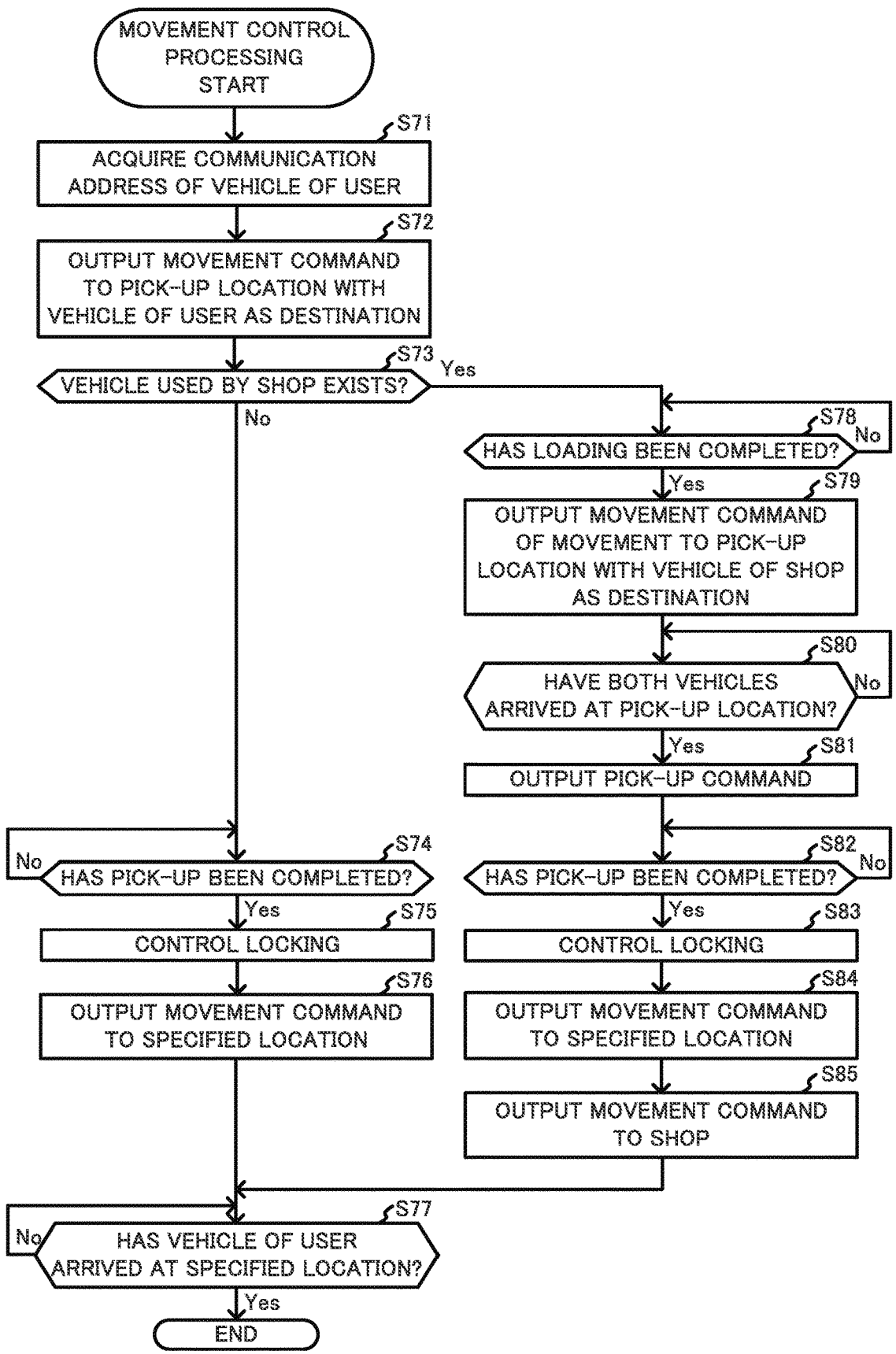
FIG. 12 is a flowchart illustrating an example of movement control processing that the information processing device of the business office executes.

After having executed the processing in step S32, the information processing device 200 executes movement control processing, as illustrated in FIG. 12, of performing, on the vehicle 900, control of causing the vehicle 900 to transport the sold product to the specified location in the identified required time (step S33).

When the execution of the movement control processing is started, the acquirer 210 of the information processing device 200 acquires the communication address of the vehicle 900 from the send request accepted in step S27 in FIG. 5 (step S71).

Next, the controller 260 of the information processing device 200 generates a movement command that includes information indicating the first route from the location of the vehicle 900 to the pick-up location and that commands the vehicle 900 to move on the first route at the maximum speed. Subsequently, the controller 260 outputs the generated movement command to the data communication circuit 204a with the communication address of the vehicle 900 associated with the user as the destination (step S72).

When receiving the movement command, the vehicle 900 starts movement and travels the first route to the shop SH1, which is the pick-up location, at the maximum speed. When the vehicle 900 arrives at the shop SH1, the employee of the shop SH1 determines that the vehicle ID "900" displayed on the vehicle 900 coincides with the vehicle ID "900" displayed on the information processing device 310. Next, the employee loads the sold product on the vehicle 900 and performs, on the vehicle 900, an operation of causing the vehicle 900 to send a pick-up completion report announcing that the pick-up of the product is completed. The vehicle 900 sends the pick-up completion report in response to the operation.

After having executed the processing in step S72, the identifier 240 of the information processing device 200, by executing the same processing as the processing in step S54 in FIG. 11, determines that the provision shop SH1, which was determined to be the shop that provides the product, does not have a vehicle that the employee of the shop SH1 uses (step S73; No).

Next, the controller 260 of the information processing device 200 determines whether or not the vehicle 900 has completed the pick-up of the product (step S74). On this occasion, when the data communication circuit 204a of the information processing device 200 has not received a pick-up completion report from the vehicle 900, the controller 260 determines that the pick-up has not been completed (step S74; No). Subsequently, the controller 260 sleeps for a predetermined amount of time and subsequently repeats the processing in step S74.

In contrast, when the pick-up completion report is received, the controller 260 of the information processing device 200 determines that the pick-up of the product by the vehicle 900 has been completed (step S74; Yes). Subsequently, the controller 260 generates a lock command commanding a storage cabinet 920 that stores the picked-up product to be locked. Next, the controller 260 generates a movement command that includes information indicating the second route from the pick-up location to the specified location specified by the user and that commands the vehicle 900 to move on the second route at the maximum speed.

Subsequently, the controller 260 outputs the generated lock command and movement command to the data communication circuit 204a with the communication address of the vehicle 900 as the destination (steps S75 and S76).

When receiving the lock command and the movement command, the vehicle 900 locks the storage cabinet 920, starts movement, and travels the second route to the specified location at the maximum speed. Subsequently, when arriving at the specified location, the vehicle 900 sends an arrival report to the information processing device 200.

After having executed the processing in step S76, the controller 260 of the information processing device 200 determines whether or not the vehicle 900 has arrived at the specified location (step S77). On this occasion, when the data communication circuit 204a of the information processing device 200 has not received an arrival report, the controller 260 determines that the vehicle 900 has not arrived at the specified location (step S77; No). Subsequently, the controller 260 sleeps for a predetermined amount of time and subsequently repeats the processing in step S77.

In contrast, when the arrival report is received, the controller 260 of the information processing device 200 determines that the vehicle 900 has arrived at the specified location (step S77; Yes) and terminates the execution of the movement control processing.

After the movement control processing has been executed in step S33 in FIG. 5, the notifier 250 of the information processing device 200 generates a password used for receipt of the product, using, for example, a software-generated random number. Subsequently, the notifier 250 outputs a transport completion notification that includes the generated password and that announces that the transport of the product to the specified location is completed and the password is used for the receipt of the product to the data communication circuit 204a with the information processing device 100 carried by the user as the destination (step S34).

When the long-distance wireless communication circuit 104b that the information processing device 100 of the user includes receives the transport completion notification, the CPU 101 causes the display device 105b to display the transport completion notification. Although, in the present embodiment, it is described that a first user who is the user carrying the information processing device 100 visually recognizes the message and the first user himself/herself moves to the specified location, the present embodiment is not limited thereto. The first user may inform a second user, who is a family member of or a person living with the first user or a friend, a boyfriend/girlfriend, or an acquaintance to whom the first user presents the product, of a password included in the message and subsequently instruct the second user to move to the specified location, and the second user may move to the specified location in accordance with the instruction and receive the product.

Subsequently, the first user performs an operation of causing authentication information that is a password to be input to the vehicle 900 that is parked at the specified location. The vehicle 900 sends the authentication information to the information processing device 200 in response to the operation.

When receiving the authentication information from the vehicle 900, the information processing device 200 executes the same processing as the processing in steps S21 and S22 (steps S35 and S36). Through this processing, the password that is the authentication information is acquired, and, when the acquired password and the password in the transport completion notification do not coincide with each other, the authenticator 220 determines that the authentication has failed (step S36; No). Subsequently, the information processing device 200 repeats the above-described processing from step S35.

When the vehicle 900 has not received an unlock command commanding the storage cabinet 920 to be unlocked from the information processing device 200 even when a predetermine period has elapsed since the vehicle 900 sent the authentication request, the vehicle 900 determines that the authentication has failed and displays a message notifying that the authentication has failed. The first user who has visually recognized the message performs an operation of causing the authentication information to be input to the vehicle 900 again, and the vehicle 900 sends the authentication information again in response to the operation.

In step S36, when the acquired password and the password in the transport completion notification coincide with each other, the authenticator 220 of the information processing device 200 determines that the authentication has succeeded (step S36; Yes). Subsequently, the controller 260 outputs an unlock command commanding the storage cabinet 920 to be unlocked to the data communication circuit 204*a* with the vehicle 900 as the destination (step S37) and subsequently terminates the execution of the sales brokerage processing.

When receiving the unlock command, the vehicle 900 unlocks the storage cabinet 920 in which the product is stored, and the first user receives the product from the storage cabinet 920.

Each of the information processing device 310 installed in the shop SH1 and the information processing device 320 installed in the shop SH2 includes a not-illustrated CPU, RAM, ROM, hard disk, data communication circuit, video card, display device, and input device, which are hardware components. Configurations and functions of the hardware components that each of the control device 310 and 320 includes are the same as the configurations and functions of the hardware components that the information processing device 200 illustrated in FIG. 4 includes.

Figure 13:
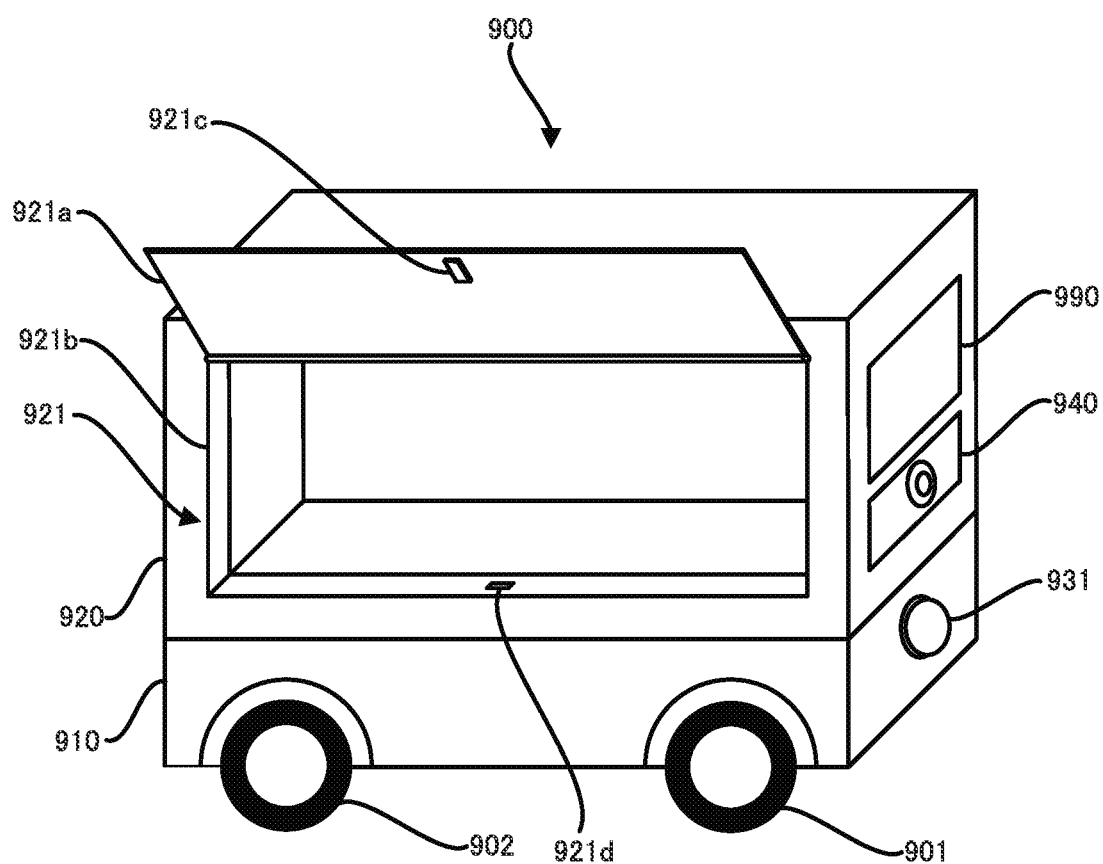
FIG. 13 is an appearance configuration diagram illustrating an appearance example of a vehicle according to Embodiment 1.

A configuration and the functions of the vehicle 400 of the shop SH2 are the same as the configuration and the functions of the vehicle 900 associated with the first user. The vehicle 900 includes a vehicle body 910 that is provided with a plurality of wheels including wheels 901 and 902, the storage cabinet 920 that is installed on the upper surface of the vehicle body 910, and an information processing device 990 that is built into the storage cabinet 920, as illustrated in FIG. 13.

The storage cabinet 920 of the vehicle 900 includes a storage box 921. The storage box 921 includes a not-illustrated bottom plate, ceiling plate, and back plate and not-illustrated two side plates and includes a box body that is closed by the plates and forms a space the front of which is opened. A door frame 921*b* that receives a door 921*a* is installed on the opening of the box body. The door 921*a* includes a deadbolt 921*c* that is a bolt, and the door frame 921*b* includes a strike 921*d* that is a strike plate for the deadbolt 921*c*.

The door 921*a* of the storage cabinet 920 that the vehicle 900 includes further includes a not-illustrated motor that locks the door 921*a* by inserting the deadbolt 921*c* into the strike 921*d* in accordance with a signal output from the information processing device 990 of the vehicle 900. The motor unlocks the door 921*a* by pulling out the deadbolt 921*c* from the strike 921*d* in accordance with a signal output from the information processing device 990.

The vehicle 900 further includes a light detection and ranging (LiDAR) sensor 931 that is installed on the front surface of the vehicle body 910 and a not-illustrated LiDAR sensor that is installed on the back surface of the vehicle body 910.

The LiDAR sensor 931 on the front surface that the vehicle 900 includes emits laser light in a plurality of directions that, when the front direction of the vehicle 900 is used as a reference azimuthal direction, is included in a range of azimuth angle formed with the reference azimuthal direction from −90 degrees to +90 degrees and elevation angle formed with the front direction of the vehicle 900 from −90 degrees to +90 degrees. The LiDAR sensor 931 on the front surface receives reflected light of the emitted laser light and, based on a time from the emission of the laser light to the reception of the reflected light, measures distances to a plurality of reflection points at which the laser light is reflected. Next, the LiDAR sensor 931 on the front surface calculates coordinate values of the plurality of reflection points in a three-dimensional coordinate system of the vehicle 900 with the center point of the vehicle 900 taken as the origin, based on the emission directions of the laser light and the measured distances. Subsequently, the LiDAR sensor 931 on the front surface outputs the calculated coordinate values of the plurality of reflection points to the information processing device 990 of the vehicle 900.

The LiDAR sensor on the back surface that the vehicle 900 includes emits infrared laser light in a plurality of directions that, when the rearward direction of the vehicle 900 is used as a reference azimuthal direction, is included in a range of azimuth angle formed with the reference azimuthal direction from −90 degrees to +90 degrees and elevation angle formed with the rearward direction of the vehicle 900 from −90 degrees to +90 degrees. In addition, the LiDAR sensor on the back surface calculates coordinate values of a plurality of reflection points of the emitted laser light in the three-dimensional coordinate system of the vehicle 900 and outputs the calculated coordinate values of the plurality of reflection points to the information processing device 990 of the vehicle 900.

The reason why the LiDAR sensor 931 on the front surface and the LiDAR sensor on the back surface that the vehicle 900 includes output the coordinate values of a plurality of reflection points to the information processing device 990 is that, in order to travel avoiding objects, such as an obstacle, the information processing device 990 of the vehicle 900 identifies the coordinate values in the three-dimensional space and sizes of objects existing in all directions with the vehicle 900 used as a reference.

The vehicle 900 further includes an imaging device 940 that is installed on the front surface of the storage cabinet 920 and that has an optical axis and an angle of view adjusted in such a way as to image the front of the vehicle 900. The imaging device 940 images the front of the vehicle 900 in accordance with a control signal output from the information processing device 990 of the vehicle 900 and outputs an image signal representing images obtained by the imaging to the information processing device 990.

Figure 14:
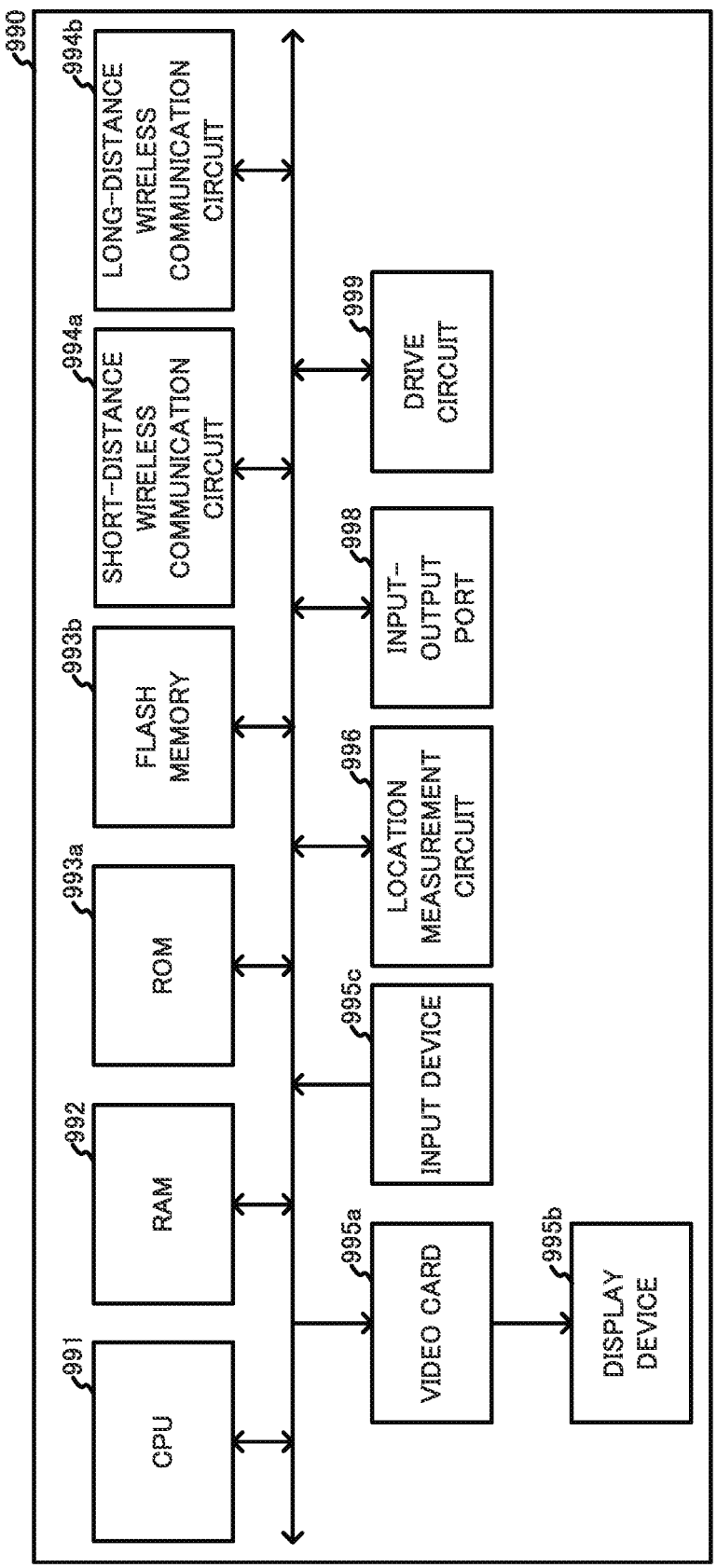
FIG. 14 is a hardware configuration diagram illustrating a configuration example of an information processing device that the vehicle includes.

The information processing device 990 of the vehicle 900 includes a CPU 991, a RAM 992, a ROM 993*a*, a flash memory 993*b*, a short-distance wireless communication circuit 994*a*, a long-distance wireless communication circuit 994*b*, a video card 995*a*, a display device 995*b*, an input device 995*c*, a location measurement circuit 996, an input-output port 998, and a drive circuit 999, which are hardware components, as illustrated in FIG. 14. Although, in the present embodiment, the vehicle 900 includes one CPU 991, the vehicle 900 may include a plurality of CPUs. In addition, the vehicle 900 may include a plurality of RAMs and may include a plurality of flash memories.

Configurations and functions of the CPU 991, the RAM 992, the ROM 993*a*, the flash memory 993*b*, the short-distance wireless communication circuit 994*a*, the long-distance wireless communication circuit 994*b*, the video card 995*a*, the display device 995*b*, the input device 995*c*, and the location measurement circuit 996 of the vehicle 900 are the same as the configurations and functions of the CPU 101, the RAM 102, the ROM 103*a*, the flash memory 103*b*, the short-distance wireless communication circuit 104*a*, the long-distance wireless communication circuit 104*b*, the video card 105*a*, the display device 105*b*, input device 105*c*, and the location measurement circuit 106 of the information processing device 100, respectively.

The input-output port 998 of the vehicle 900 is connected to not-illustrated cables that are respectively connected to the LiDAR sensor 931 on the front surface and the LiDAR sensor on the back surface, via not-illustrated cables. The input-output port 998 inputs signals representing coordinate values that the LiDAR sensor 931 on the front surface and the LiDAR sensor on the back surface respectively output, to the CPU 991.

The input-output port 998 of the vehicle 900 is connected to the imaging device 940 via a not-illustrated cable, outputs, to the imaging device 940, a control signal output by the CPU 991, and inputs, to the CPU 991, an image signal output by the imaging device 940.

The drive circuit 999 of the vehicle 900 is connected to not-illustrated cables that are respectively connected to not-illustrated motors that rotate the plurality of wheels. The drive circuit 999 rotates the plurality of wheels by driving the motors in accordance with a control signal output by the CPU 991.

The drive circuit 999 of the vehicle 900 is also connected to a cable connected to a not-illustrated motor that causes the deadbolt 921*c* that the door 921*a* includes to be pulled out from the strike plate 921*d* or causes the deadbolt 921*c* to be inserted into the strike 921*d*, and drives the motor in accordance with a signal output by the CPU 991.

Figure 15:
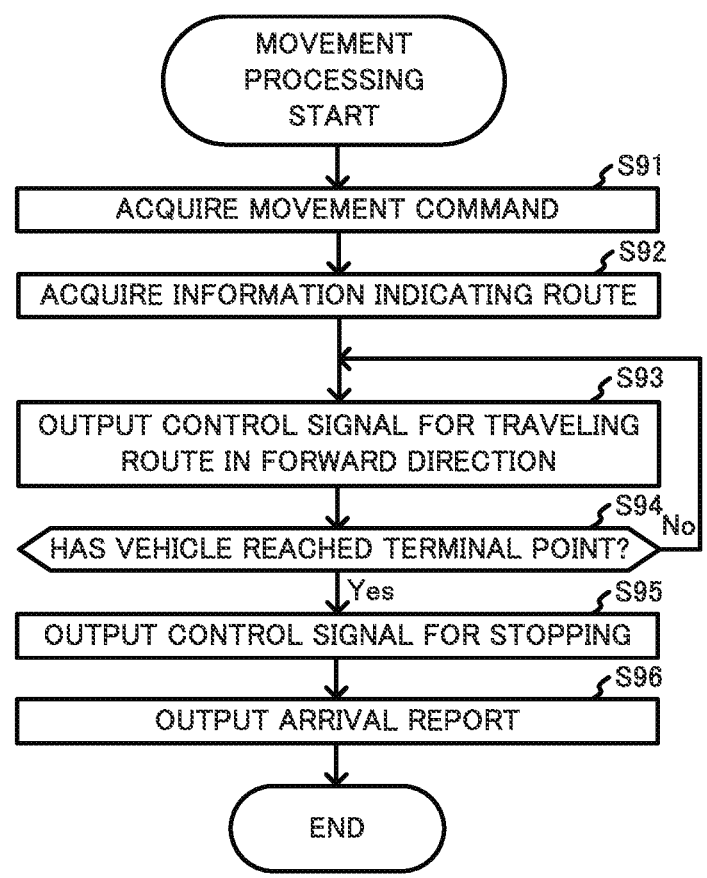
FIG. 15 is a flowchart illustrating an example of movement processing that the vehicle executes.

When the long-distance wireless communication circuit 994*b* of the vehicle 900 receives a movement command that includes information indicating the first route from the location of the vehicle 900 to the pick-up location and that commands the vehicle 900 to move on the first route at the maximum speed, the CPU 991 of the vehicle 900 executes movement processing as illustrated in FIG. 15 in order to move in accordance with the movement command.

When starting the execution of the movement processing, the CPU 991 of the vehicle 900 acquires the movement command from the long-distance wireless communication circuit 994*b* (step S91) and acquires information indicating the first route from the acquired movement command (step S92).

Subsequently, the CPU 991 of the vehicle 900 identifies latitude, longitude, and altitude of the vehicle 900, based on a signal output from the location measurement circuit 996 in order to travel the first route in the forward direction. The CPU 991 generates a control signal for traveling at the maximum speed in such a way as to cause a difference between the identified latitude, longitude, and altitude and the latitude, longitude, and altitude of, among a plurality of unvisited nodes included in the first route, the first unvisited node in the visiting sequence to be reduced. Subsequently, the CPU 991 outputs the generated control signal to the drive circuit 999 (step S93), and the drive circuit 999 causes the plurality of wheels to be rotated in accordance with the control signal.

Subsequently, when the CPU 991 of the vehicle 900 determines that, since the vehicle 900 has not visited all of the one or plurality of nodes included in the first route, the vehicle 900 has not reached the pick-up location, which is the terminal point of the first route (step S94; No), the CPU 991 repeats the above-described processing from step S93. In contrast, when the CPU 991 determines that, since the vehicle 900 has visited all of the one or plurality of nodes included in the first route, the vehicle 900 has reached the terminal point (step S94; Yes), the CPU 991 outputs a control signal for stopping at the pick-up location, which is the terminal point, to the drive circuit 999 (step S95). Subsequently, the CPU 991 outputs an arrival report to the long-distance wireless communication circuit 994*b* with the information processing device 200 as the destination (step S96) and subsequently terminates the execution of the movement processing.

When the vehicle 900 arrives at the shop SH1, which is the pick-up location, the product is loaded in the storage cabinet 920 of the vehicle 900 by the employee of the shop SH1. Subsequently, when the input device 995*c* of the vehicle 900, which is operated by the employee, outputs a signal corresponding to the operation, the CPU 991 outputs a pick-up completion report to the long-distance wireless communication circuit 994*b* with the information processing device 200 as the destination.

Subsequently, when the long-distance wireless communication circuit 994*b* of the vehicle 900 receives a lock command commanding the storage cabinet 920 to be locked, the CPU 991 causes the not-illustrated motor to lock the door 921*a* of the storage cabinet 920 by outputting, to the drive circuit 999, a control signal for causing the deadbolt 921*c* to be inserted into the strike 921*d*. Next, when the long-distance wireless communication circuit 994*b* of the vehicle 900 receives a movement command commanding the vehicle 900 to move to the specified location specified by the first user at the maximum speed, the CPU 991 of the vehicle 900 executes the movement processing illustrated in FIG. 15 again. Through this processing, the vehicle 900 moves to the specified location at the maximum speed in accordance with the movement command and stops at the specified location.

Subsequently, when the input device 995*c* of the vehicle 900, which has arrived at the specified location and is operated by the first user, outputs a signal corresponding to the operation, the CPU 991 acquires authentication information, which is a password, based on the signal. Next, the CPU 991 outputs an authentication request including the acquired authentication information to the long-distance wireless communication circuit 994*b* with the information processing device 200 as the destination.

When the CPU 991 of the vehicle 900 has not received an unlock command commanding the storage cabinet 920 to be unlocked even when a predetermine period has elapsed since the long-distance wireless communication circuit 994*b* sent the authentication request, the CPU 991 determines that the authentication has failed. Subsequently, the CPU 991, without unlocking the storage cabinet 920, causes the display device 995*b* to display a message notifying that the authentication has failed. In contrast, when receiving an unlock command before the predetermined period elapses after the authentication request was sent, the CPU 991 unlocks the door 921*a* of the storage cabinet 920 by outputting, to the drive circuit 999, a control signal causing the deadbolt 921*c* to be pulled out from the strike 921*d*. The first user receives the product from the unlocked storage cabinet 920.

According to the above-described configuration, the information processing system 1 includes the acceptor 230 that accepts product information relating to a product purchasable by the first user and performance information indicating vehicle performance of the vehicle 900 associated with the first user. In addition, the information processing system 1 includes the identifier 240 that identifies a required time required for the vehicle 900 to transport a product relating to the accepted product information to a specified location specified by the first user, based on the accepted performance information. Because of this configuration, the information processing system 1 is capable of identifying a required time required for the vehicle 900 to transport a product to a specified location specified by the first user, based on performance information of the vehicle 900, with high precision. In addition, since the information processing system 1 does not include the vehicle 900, the information processing system 1 has a difficulty in predicting and grasping vehicle performance of the vehicle 900 associated with the first user. However, after the information processing system 1 accepting the vehicle performance of the vehicle 900 associated with the first user, the information processing system 1 is capable of identifying the required time with high precision, no matter what performance the vehicle performance of the vehicle 900 is.

In addition, according to the above-described configuration, the information processing system 1 further includes the notifier 250 that notifies the first user of a required time. Thus, since the information processing system 1 is capable of informing the first user of a required time identified with high precision, it is possible to improve convenience for the first user.

Further, according to the above-described configuration, the vehicle 900 is owned by the first user. Although the vehicle performance of the vehicle 900 that is owned by an individual is expected to be various types of performance, after accepting the vehicle performance of the vehicle 900, the information processing system 1 is capable of identifying a required time based on the accepted vehicle performance, no matter what vehicle performance the vehicle 900 has.

Modified Example 1 of Embodiment 1

Although, in Embodiment 1, it was described that the first user carrying the information processing device 100 owned the vehicle 900 and the vehicle 900 was associated with the first user, the mode of ownership and the mode of association are not limited thereto.

For example, the first user and one or more second users who are family members of or persons living with the first user may co-own the vehicle 900, and the vehicle 900 may be associated with one or more of the first user and the one or more second users.

For example, the first user and one or more second users who are friends, lovers, or acquaintances of the first user may co-own the vehicle 900, and the vehicle 900 may be associated with one or more of the first user and the one or more second users.

For example, the first user and one or more third users who are users different from the first user and live in an apartment where the first user lives or work in an office building where the first user works may co-own the vehicle 900, and the vehicle 900 may be associated with one or more of the first user and the one or more third users.

For example, one or more of the first user and one or more third users who are users different from the first user and live in, commute to, or go to school in a predetermined area where the first user lives, to which the first user commutes, or in which the first user goes to school may be associated with the vehicle 900 by a sales broker. The predetermined area may be, for example, an administrative district or an area predetermined by the sales broker.

According to the above-described configuration, the vehicle 900 is associated with a plurality of users including the first user. Thus, after the information processing system 1 accepting the vehicle performance of the vehicle 900 associated with the plurality of users, the information processing system 1 is capable of identifying a required time with high precision, no matter what performance the vehicle performance of the vehicle 900 is.

Modified Example 2 of Embodiment 1

Although, in Embodiment 1, it was described that the first user carrying the information processing device 100 owned the vehicle 900, Embodiment 1 is not limited thereto. The first user may, for example, conclude a rental agreement with the owner of the vehicle 900 and thereby has the right to use the vehicle 900 granted by the owner, and temporarily use the vehicle 900 within a granted period.

In Embodiment 1, it was described that, since establishment of a pairing caused the vehicle 900 to be associated with the information processing device 100 of the first user, the vehicle 900 was also associated with the first user carrying the information processing device 100 via the information processing device 100. However, since establishment of a rental agreement causes the information processing device 100 that has sent an agreement request to be associated with the rented vehicle 900 by a not-illustrated rental system, the vehicle 900 according to the present modified example is also associated with the first user carrying the information processing device 100.

When the information processing device 100 according to the present modified example starts not-illustrated purchase processing, the CPU 101 of the information processing device 100 acquires information indicating a rental condition, based on a signal output by the input device 105*c* of the information processing device 100 operated by the first user. The rental condition includes, for example, the start time and end time of a period for which the vehicle 900 is rented and a price for the rental. Subsequently, the CPU 101 of the information processing device 100 outputs an agreement request that includes the acquired information indicating the rental condition and that requests conclusion of a rental agreement to the long-distance wireless communication circuit 104*b* with the not-illustrated rental system as the destination.

The not-illustrated rental system includes a not-illustrated information processing device that has the same configuration and functions as the configuration and functions of the information processing device 200. When a not-illustrated data communication circuit that the information processing device of the rental system includes receives the agreement request, a not-illustrated CPU determines to rent the vehicle 900 in accordance with a rental condition indicated by information included in the agreement request. Next, the not-illustrated CPU of the information processing device associates a communication address of the information processing device 100, which is used as identification information of the information processing device 100, with the vehicle ID "900" of the vehicle 900 and stores the associated information in a not-illustrated hard disk. Subsequently, the CPU of the information processing device outputs an agreement establishment report announcing that the rental agreement has been established to a not-illustrated data communication circuit with the information processing device 100 as the destination.

When the long-distance wireless communication circuit 104b of the information processing device 100 receives the agreement establishment report, the CPU 101 executes the same processing as the processing in steps S02 to S12 in FIG. 3. Through this processing, the information processing device 100 sends a send request that includes the product information selected by the first user, the performance information of the vehicle 900 associated with the first user, and the like, and that requests sending of a product page in which a description of a selected product relating to the product information and a required time are contained. Subsequently, the information processing device 100 receives and display the product page. Thereafter, when the information processing device 100 determines that the required time contained in the displayed product page is approved by the first user and purchase of the product is determined, the information processing device 100 sends a sale request and subsequently terminates the execution of the purchase processing.

The vehicle performance of the vehicle 900, which is rented and associated with the first user, is expected to be various types of performance. According to the above-described configuration, after the vehicle performance of the vehicle 900 is accepted, the information processing system 1 is capable of identifying a required time with high precision based on the accepted vehicle performance, no matter what vehicle performance the vehicle 900 associated with the first user has.

Modified Example 3 of Embodiment 1

Although, in Embodiment 1, the description was made using, as a specific example, a case where the shop SH1, which does not use a vehicle, is determined to be a provision shop that provides the first user with a product, Embodiment 1 is not limited thereto. In the present modified example, the following description will be made using, as a specific example, a case where the shop SH2, which uses the vehicle 400, is determined to be a provision shop.

Figure 16:
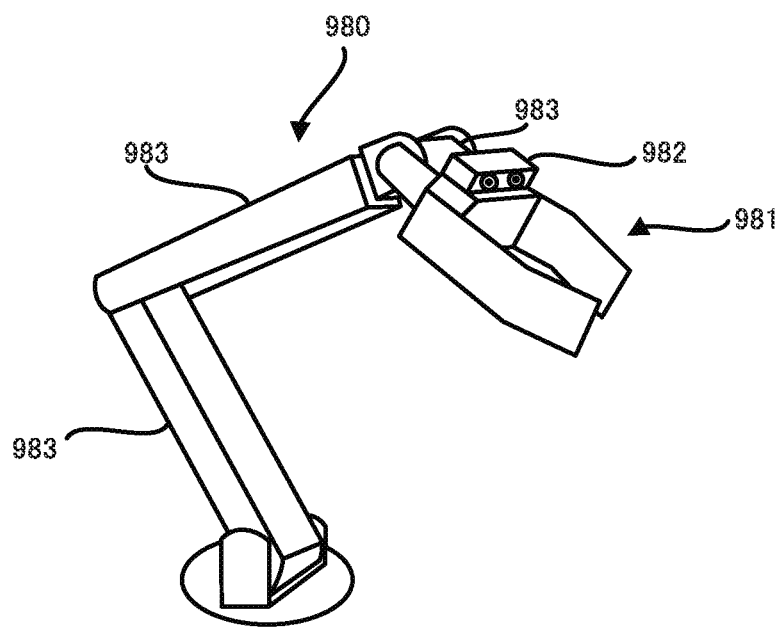
FIG. 16 is an appearance configuration diagram illustrating an appearance example of a robot arm that the vehicle includes.

The vehicle 900 according to the present modified example includes a robot arm 980, as illustrated in FIG. 16, that is installed on the upper surface of the storage cabinet 920 in order to receive a product from the vehicle 400. The robot arm 980 is a vertical articulated robot and includes a drive circuit that drives a not-illustrated motor in accordance with a control signal output from the information processing device 990 of the vehicle 900 and a two-claw-type gripper 981 that is opened and closed in parallel by the motor.

The robot arm 980 of the vehicle 900 includes an imaging device 982 that is mounted on the gripper 981 and that has an optical axis and an angle of view adjusted in such a way that the tips of the claws of the gripper 981 are included in the imaging range. The robot arm 980 includes a plurality of joint structures that can be moved by not-illustrated motors, and a plurality of arms 983 that move about the joint structures as centers. The gripper 981 is not limited to a two-claw-type gripper, and may have three or more claws or may include a plurality of fingers instead of the two claws.

The imaging device 982 that the robot arm 980 of the vehicle 900 includes is a digital stereo camera, performs imaging in accordance with a signal output from the information processing device 990 of the vehicle 900, and outputs, to the information processing device 990, an image signal representing two images that have parallax from each other. The purpose of such a signal being output to the information processing device 990 is that the information processing device 990 identifies, based on the parallax that the two images have, positional coordinates in a three-dimensional space, size, and the like of a product set to be gripped by the gripper 981.

The input-output port 998 of the vehicle 900 according to the present modified example is connected to the robot arm 980 via a not-illustrated cable and inputs a control signal output by the CPU 991 to the robot arm 980. The input-output port 998 also inputs, to the CPU 991, an image signal output from the imaging device 982 that the robot arm 980 includes.

When the information processing device 200 according to the present modified example starts the execution of the sales brokerage processing in FIG. 5, the information processing device 200 executes the processing in steps S21 to S32 (steps S21 to S32). Through this processing, the information processing device 200 generates a delivery request that includes product information relating to a product the sale of which is requested and the vehicle ID "900" of the vehicle 900 that picks up the product and that requests the product to be sold and delivered to the vehicle 900. Then, the information processing device 200 sends the generated delivery request to the information processing device 320, which is the sending destination corresponding to the shop SH2. The sending destination corresponding to the shop SH2 is not limited to the information processing device 320 and may be an e-mail address of an employee of the shop SH2, and the information processing device 320 may be a smartphone carried by the employee and receive a delivery request that was sent with the e-mail address as the destination, on the inside or outside of the shop SH2. Alternatively, the sending destination corresponding to the shop SH2 may be an application program that is executed in the information processing device 320.

When receiving the delivery request, the information processing device 320 of the shop SH2 displays the product information and the vehicle ID "900" included in the delivery request. The employee of the shop SH2 who has visually recognized the display on the information processing device 320 finds a product relating to the displayed product information in, for example, a warehouse, settles accounts for sale of the found product, loads the product into a not-illustrated storage cabinet that the vehicle 400 of the shop SH2 includes, and performs an operation for inputting the displayed vehicle ID "900" on the vehicle 400.

When a not-illustrated input device of the vehicle 400 outputs a signal corresponding to the operation, a not-illustrated CPU of the vehicle 400 acquires the vehicle ID "900", based on the signal. Subsequently, the CPU of the vehicle 400 outputs a loading completion report announcing that loading of the product that is to be delivered to the vehicle 900 identified by the vehicle ID "900" has been completed to a data communication circuit with the information processing device 200 as the destination.

After having executed the processing in step S32, the information processing device 200 executes the movement control processing, illustrated in FIG. 12, of controlling movement of the vehicle 400 of the shop SH2 and the vehicle 900 associated with the first user (step S33).

When starting the execution of the movement control processing, the information processing device 200 executes the processing in steps S71 and S72 (steps S71 and S72).

Through this processing, the information processing device 200 sends, to the vehicle 900, a movement command that includes information indicating a first route from the location of the vehicle 900 to a pick-up location that is determined to be the intermediate location between the location of the vehicle 900 and the location of the shop SH2 and that commands the vehicle 900 to move on the first route at the maximum speed.

When receiving the movement command, the vehicle 900 starts movement, travels the first route to the pick-up location at the maximum speed, and, when arriving at the pick-up location, sends an arrival report to the information processing device 200.

After having executed step S72, the information processing device 200, by executing the same processing as the processing in step S54 in FIG. 11, determines that there exists a vehicle used by an employee of the shop SH2 and the vehicle to be used is the vehicle 400 (step S73; Yes). Subsequently, the controller 260 of the information processing device 200 determines whether or not loading of the product on the vehicle 400 of the shop SH2 has been completed (step S78). On this occasion, when the data communication circuit 204*a* of the information processing device 200 has not received a loading completion report from the vehicle 400, the controller 260 determines that the loading has not been completed (step S78; No). Subsequently, the controller 260 sleeps for a predetermined amount of time and subsequently repeats the processing in step S78.

In contrast, when the loading completion report is received, the controller 260 of the information processing device 200 determines that the loading of the product on the vehicle 400 has been completed (step S78; Yes). Next, the controller 260 of the information processing device 200 outputs a movement command that includes information indicating a third route from the shop SH2 to the pick-up location and that commands the vehicle 400 to move on the third route at the maximum speed to the data communication circuit 204*a* with the vehicle 400 as the destination (step S79).

When receiving the movement command, the vehicle 400 starts movement, travels the third route at the maximum speed, and, when arriving at the pick-up location, stops at the pick-up location and sends an arrival report to the information processing device 200. Subsequently, the CPU of the vehicle 400 causes a not-illustrated display device to display the vehicle ID "900" of the vehicle 900.

After having executed step S79, the controller 260 of the information processing device 200 determines whether or not the vehicle 400 of the shop SH2 and the vehicle 900 associated with the first user have arrived at the pick-up location (step S80). On this occasion, when the data communication circuit 204*a* of the information processing device 200 has not received an arrival report from the vehicle 400 or the vehicle 900, the controller 260 determines that the vehicle 400 or the vehicle 900 has not arrived at the pick-up location (step S80; No). Subsequently, the controller 260 sleeps for a predetermined amount of time and subsequently repeats the processing in step S80.

In contrast, when arrival reports are received from the vehicle 400 and the vehicle 900, the controller 260 of the information processing device 200 determines that the vehicle 400 and the vehicle 900 have arrived at the pick-up location (step S80; Yes). Subsequently, the controller 260 outputs a pick-up command commanding the vehicle 900 to receive the product from the vehicle 400 of the shop SH2 to the data communication circuit 204*a* with the vehicle 900 associated with the first user as the destination (step S81).

When receiving the pick-up command, the vehicle 900 receives the product, using the robot arm 980, from the vehicle 400 that displays the vehicle ID "900" of the vehicle 900 among one or a plurality of vehicles that is parked at the pick-up location. Then, the vehicle 900 loads, using the robot arm 980, the received product into the storage cabinet 920. Subsequently, the vehicle 900 sends a pick-up completion notification announcing that the pick-up of the product has been completed to the information processing device 200.

After having executed step S81, the controller 260 of the information processing device 200 determines whether or not the pick-up of the product has been completed (step S82). On this occasion, when the data communication circuit 204*a* of the information processing device 200 has not received a pick-up completion report, the controller 260 determines that the pick-up has not been completed (step S82; No). Subsequently, the controller 260 sleeps for a predetermined amount of time and subsequently repeats the processing in step S82.

In contrast, when the pick-up completion report is received, the controller 260 of the information processing device 200 determines that the pick-up of the product has been completed (step S82; Yes). Subsequently, the controller 260, by executing the same processing as the processing in steps S75 and S76 (steps S83 and S84), outputs a lock command commanding the vehicle 900 to perform locking and a movement command commanding the vehicle 900 to move to the specified location with the vehicle 900 as the destination.

Next, the controller 260 of the information processing device 200 outputs a movement command commanding the vehicle 400 to return to the shop SH2 by moving on the third route from the shop SH2 to the pick-up location in the reverse direction, to the data communication circuit 204*a* with the vehicle 400 of the shop SH2 as the destination (step S85).

When receiving the lock command and the movement command, the vehicle 900 associated with the first user locks the storage cabinet 920 and travels the second route from the pick-up location to the specified location at the maximum speed. When receiving the movement command, the vehicle 400 of the shop SH2 returns from the pick-up location to the shop SH2.

When, after having executed step S85, the controller 260 of the information processing device 200 determines that the vehicle 900 has arrived at the specified location (step S77; Yes), the controller 260 terminates the execution of the movement control processing.

When a not-illustrated long-distance wireless communication circuit that the vehicle 400 according to the present modified example includes receives the movement command output in step S79 in FIG. 12, the not-illustrated CPU of the vehicle 400 executes the movement processing in FIG. 15. Through this processing, the vehicle 400 moves on the third route reaching the pick-up location at the maximum speed with the product stored therein.

When the long-distance wireless communication circuit 994*b* of the vehicle 900 according to the present modified example receives the movement command output in step S72 in FIG. 12, the CPU 991 of the vehicle 900 executes the movement processing illustrated in FIG. 15. Through this processing, the vehicle 900 moves on the first route reaching the pick-up location at the maximum speed.

Figure 17:
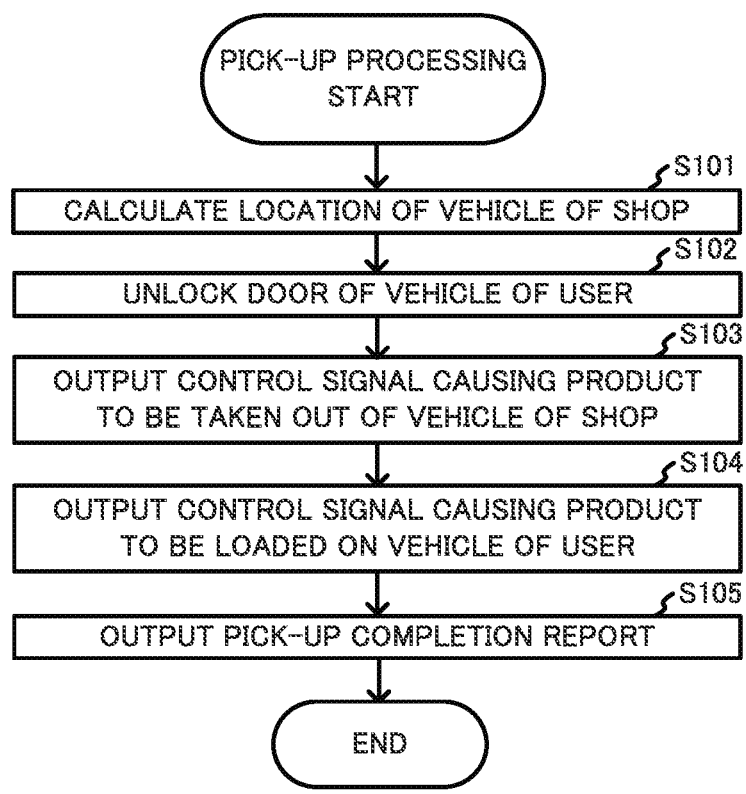
FIG. 17 is a flowchart illustrating an example of pick-up processing that the vehicle executes.

Subsequently, when the long-distance wireless communication circuit 994b of the vehicle 900 receives the pick-up command output in step S81 in FIG. 12, the CPU 991 of the vehicle 900 executes the pick-up processing as illustrated in FIG. 17.

When starting the execution of the pick-up processing, the CPU 991 of the vehicle 900 executes processing of outputting a signal commanding the imaging device 940, which has an optical axis and an angle of view adjusted in such a way that the front of the vehicle 900 can be imaged, to perform imaging. Next, the CPU 991 detects an image region corresponding to a vehicle that is parked at the pick-up location by applying, for example, template matching to an image represented by a signal output from the imaging device 940 (hereinafter, referred to as a captured image). A template used in the template matching is stored in the flash memory 993b of the vehicle 900 in advance.

On this occasion, when no image region corresponding to a vehicle is detected, the CPU 991 of the vehicle 900 executes processing of outputting a control signal causing one or more of the plurality of wheels to rotate to the drive circuit 999 in order to cause the optical axis of the imaging device 940 to be changed. Subsequently, the CPU 991 repeats the above-described processing from the processing of outputting a signal commanding the imaging device 940 to perform imaging.

In contrast, when an image region corresponding to a vehicle is detected, the CPU 991 of the vehicle 900 detects a character string displayed on the vehicle by executing, for example, optical character recognition (OCR) processing on the detected image region. On this occasion, when the character string detected from the image region does not coincide with the vehicle ID "900" of the vehicle 900, the CPU 991 repeats the above-described processing from the processing of outputting a control signal to cause the optical axis of the imaging device 940 to be changed.

In contrast, when the character string detected from the image region coincides with the vehicle ID "900" of the vehicle 900, the CPU 991 of the vehicle 900 determines that the image region corresponds to the vehicle 400 of the shop SH2. Subsequently, the CPU 991 calculates coordinate values representing the location of the vehicle 400, based on the location of the image region in the captured image and the direction of the optical axis of the imaging device 940 (step S101). Although, in the present embodiment, the coordinate values that the CPU 991 calculates are coordinate values in a three-dimensional coordinate system with the center point of the vehicle 900 taken as the origin, the present embodiment is not limited thereto.

Subsequently, the CPU 991 of the vehicle 900 generates a control signal causing the optical axis of the imaging device 982, which the robot arm 980 includes, to be changed in such a way that the imaging device 982 can image the vehicle 400, based on the calculated coordinate values of the vehicle 400. Next, the CPU 991 outputs the generated control signal and a signal commanding imaging to the imaging device 982 of the robot arm 980.

Next, the CPU 991 of the vehicle 900 acquires two captured images based on a signal output from the imaging device 982, and calculates, based on parallax of the acquired two captured images, coordinate values representing the location and shape of a not-illustrated door that the vehicle 400 includes. Subsequently, the CPU 991 outputs a control signal for causing the imaged door to be opened, based on the calculated coordinate values, to the robot arm 980. The robot arm 980 opens the door of the vehicle 400 in accordance with the control signal.

Next, the CPU 991 of the vehicle 900 outputs, to the drive circuit 999, a control signal causing the door 921a of the storage unit 920 that the vehicle 900 includes to be unlocked (step S102).

Subsequently, the CPU 991 of the vehicle 900 acquires coordinate values representing the location and shape of the door 921a that the storage cabinet 920 of the vehicle 900 includes from the flash memory 993b. Subsequently, the CPU 991 outputs a control signal for causing the door 921a to be opened, based on the acquired coordinate values, to the robot arm 980. The robot arm 980 opens the door 921a of the vehicle 900 in accordance with the control signal.

Subsequently, the CPU 991 of the vehicle 900 generates a control signal causing the optical axis of the imaging device 982, which the robot arm 980 includes, to be changed in such a way that the imaging device 982 can image the opening and the inside of the storage cabinet of the vehicle 400 after the door of the storage cabinet has been opened, based on the coordinate values representing the location of the door before the door is opened. Next, the CPU 991 outputs the generated control signal and a control signal commanding imaging to the robot arm 980. Subsequently, the CPU 991 acquires two captured images, based on a signal output from the imaging device 982 and, based on parallax of the acquired two captured images, calculates coordinate values representing the location and shape of the product stored in the box body of the storage cabinet that the vehicle 400 includes. Next, the CPU 991 outputs a control signal for causing the product, which is stored in the storage cabinet that the vehicle 400 of the shop SH2 includes, to be gripped and taken out, based on the calculated coordinate values, to the robot arm 980 (step S103). The robot arm 980 takes out the product from the vehicle 400 in accordance with the control signal.

Subsequently, the CPU 991 of the vehicle 900 generates a control signal for causing the optical axis of the imaging device 982, which the robot arm 980 includes, to be changed in such a way that the imaging device 982 can image the opening and the inside of the box body of the storage cabinet 920 that the vehicle 900 includes, based on the coordinate values acquired from the flash memory 993b. Next, the CPU 991 outputs the generated control signal and a control signal commanding imaging to the robot arm 980. Subsequently, the CPU 991 calculates coordinate values representing the location and shape of the opening of the box body and depth of the box body, based on parallax of the two captured images acquired based on a signal output from the imaging device 982. Next, the CPU 991 outputs a control signal for causing the product, which is taken out of the vehicle 400, to be loaded into the storage cabinet 920 of the vehicle 900 through the opening, based on the calculated coordinate values and depth, to the robot arm 980 (step S104). The robot arm 980 loads the taken-out product on the vehicle 900, which is associated with the first user, in accordance with the control signal.

Subsequently, the CPU 991 of the vehicle 900 outputs, to the robot arm 980, a control signal causing the door of the vehicle 400 and the door 921a of the vehicle 900, which were opened by the robot arm 980, to be closed. Subsequently, the CPU 991 of the vehicle 900 outputs a pick-up completion report to the long-distance wireless communication circuit 994b with the information processing device 200 as the destination (step S105) and subsequently terminates the execution of the pick-up processing.

Subsequently, when the long-distance wireless communication circuit 994b of the vehicle 900 receives the movement command output in step S84 in FIG. 12, the CPU 991 of the vehicle 900 executes the movement processing in FIG. 15. Through this processing, the vehicle 900 moves on the second route from the pick-up location to the specified location specified by the first user at the maximum speed with the product that was picked up at the pick-up location stored therein.

When the not-illustrated long-distance wireless communication circuit that the vehicle 400 includes receives the movement command output in step S85 in FIG. 12, the not-illustrated CPU of the vehicle 400 executes the movement processing in FIG. 15. Through this processing, the vehicle 400 returns from the pick-up location to the shop SH2.

Modified Example 4 of Embodiment 1

In Modified Example 3 of Embodiment 1, it was described that the vehicle 900 associated with the first user took out a product from the storage cabinet of the vehicle 400 of the shop SH2 and loaded the taken-out product into the storage cabinet 920 of the vehicle 900, using the robot arm 980 illustrated in FIG. 16.

However, Embodiment 1 is not limited to the description, and the vehicle 400 of the shop SH2 may include a not-illustrated robot arm that has the same configuration and functions as those of the robot arm 980. In this case, the vehicle 400 may take out the product from the storage cabinet of the vehicle 400 and load the taken-out product into the storage cabinet 920 of the vehicle 900, using the not-illustrated robot arm.

In addition, the vehicle 400 may take out the product from the storage cabinet of the vehicle 400, using the not-illustrated robot arm and the vehicle 900 may receive the product from the robot arm of the vehicle 400 and load the received product into the storage cabinet 920 of the vehicle 900, using the robot arm 980.

Modified Example 5 of Embodiment 1

Although, in Embodiment 1, it was described that the identifier 240 of the information processing device 200 identified a required time required for the vehicle 900 to transport a product to a specified location, Embodiment 1 is not limited thereto. The identifier 240 according to the present modified example identifies an arrival time at which a product, transported by the vehicle 900, arrives at a specified location.

Although, in the present embodiment, it will be described that the time is represented by date, hours, and minutes, the present embodiment is not limited thereto. The time may be represented by date, hours, minutes, and seconds, represented by date and hours, or represented by date. In addition, the time may be represented by hours, minutes, and seconds, represented by hours and minutes, or represented by hours.

Thus, the CPU 101 of the information processing device 100 according to the present modified example executes not-illustrated purchase processing. When starting the execution of the not-illustrated purchase processing, the information processing device 100, by executing the same processing as the processing in steps S01 to S07 in FIG. 3, displays a list page that is a web page in which a list of product information of purchasable products is contained.

Next, the CPU 101 of the information processing device 100 generates a send request requesting sending of a product page in which a description of a selected product relating to product information selected by the first user and an arrival time at which the selected product, transported by the vehicle 900, arrives at a specified location are contained. Subsequently, the CPU 101 performs processing of outputting the generated send request to the long-distance wireless communication circuit 104b with the information processing device 200 as the destination.

Subsequently, when the long-distance wireless communication circuit 104b of the information processing device 100 receives a product page in which an arrival time is contained from the information processing device 200, the CPU 101 of the information processing device 100 acquires the product page in which the arrival time is contained from the long-distance wireless communication circuit 104b. Next, the CPU 101, by causing the display device 105b to display the acquired product page, notifies the first user of the arrival time.

When the first user who has visually recognized the arrival time does not approve the arrival time or does not decide to purchase the selected product, the first user performs, on the information processing device 100, a redisplay operation for causing the information processing device 100 to redisplay the list page. When the input device 105c of the information processing device 100 outputs a signal corresponding to the redisplay operation, the CPU 101 determines that the arrival time is not approved or purchase of the selected product is not decided. Subsequently, the CPU 101 repeats the above-described processing from the same processing as the processing in step S06.

In contrast, when the first user approves the arrival time and decides to purchase the selected product, the first user performs a purchase operation on the information processing device 100. When the input device 105c of the information processing device 100 outputs a signal corresponding to the purchase operation, the CPU 101 determines that the arrival time is approved or the purchase of the selected product is decided. Subsequently, the CPU 101 outputs a sale request that is a report announcing that the arrival time is approved and that is a request requesting sale of the selected product to the long-distance wireless communication circuit 104b with the information processing device 200 as the destination and subsequently terminates the execution of the purchase processing.

When the information processing device 200 according to the present modified example starts execution of not-illustrated sales brokerage processing, the information processing device 200, by executing the same processing as the processing in steps S21 to S27, receives a send request requesting sending of a product page in which a description of the selected product and the arrival time are contained. Subsequently, the information processing device 200 executes not-illustrated product page generation processing.

When starting the execution of the not-illustrated product page generation processing, the information processing device 200 executes the same processing as the processing in steps S41 to S44 in FIG. 10. Through this processing, the information processing device 200 sets, among one or more shops that have stock of the selected product, the shop SH1 or SH2 that has not been checked as a target of a check. Subsequently, the information processing device 200 executes the required time identification processing, illustrated in FIG. 11, of identifying a required time with respect to the checked shop SH1 or SH2. Subsequently, the acquirer 210 of the information processing device 200 acquires, for example, a system time that is managed by the operating system (OS). Next, the acquirer 210 acquires information indicating a time required from sending of a product page containing an arrival time until reception of a sale request, from the information storage 290.

In the present embodiment, the time required from sending of a product page until reception of a sale request is an average value of times that have been required from a product page was sent to the information processing device 100 of the first user until a sale request is received from the information processing device 100 in the past. However, the time required from sending of a product page until reception of a sale request is not limited to the average value and may be an average value of times that have been required from product pages were sent to information processing devices that a plurality of users including or not including the first user respectively carry until sale requests are received in the past, and a person skilled in the art can determine a suitable value by experiment.

Subsequently, the identifier 240 of the information processing device 200 adds the identified required time and the time required from sending of a product page until reception of a sale request to the acquired system time. Through this processing, an arrival time at which the product sold by the checked shop SH1 or SH2, transported by the vehicle 900, arrives at the specified location is identified.

Subsequently, the information processing device 200 repeats the above-described processing from the same processing as the processing in step S43 in FIG. 10. Next, when the identifier 240 of the information processing device 200 determines that there exists no shop that has not been checked, the identifier 240 determines a provision shop that provides the first user with the product, based on one or more arrival times that are respectively identified with respect to one or more shops.

Although, in the present embodiment, the identifier 240 of the information processing device 200 determines one of shops for which the earliest arrival time is identified to be a provision shop, the present embodiment is not limited thereto. The identifier 240 may assign priorities to one or more shops having stock of the selected product in order from the earliest identified arrival times, select a shop out of one or a plurality of shops the assigned priorities of which are higher than a predetermined priority, based on, for example, a software-generated random number or a predetermined rule. In addition, the identifier 240 may determine the selected shop to be the provision shop that provides the first user with the product.

Subsequently, the notifier 250 of the information processing device 200, by adding information indicating the earliest arrival time to the product page of the selected product, generates a product page in which the arrival time is contained. Subsequently, the notifier 250 terminates the execution of the product page generation processing.

After the product page generation processing has been executed, the notifier 250 of the information processing device 200 outputs the product page in which the arrival time is contained to the data communication circuit 204a with the information processing device 100 as the destination. Through this processing, the notifier 250 notifies the first user carrying the information processing device 100 of the arrival time.

Subsequently, when the data communication circuit 204a of the information processing device 200 receives a send request for a list page instead of a sale request, the controller 260 of the information processing device 200 determines that the arrival time is not approved or sale of the selected product is not requested. Subsequently, the information processing device 200 repeats the above-described processing from the same processing as the processing in step S24 in FIG. 5.

In contrast, when the data communication circuit 204a of the information processing device 200 receives a sale request, the controller 260 of the information processing device 200 determines that the arrival time is approved and the sale of the selected product is requested. Subsequently, the information processing device 200, by executing the same processing as the processing in steps S31 to S37, controls the vehicle 900 or the vehicles 400 and 900 in such a way that the product is transported and arrives at the specified location at the approved arrival time, and subsequently terminates the execution of the sales brokerage processing.

According to the above-described configuration, the information processing system 1 includes the acceptor 230 that accepts product information relating to a product purchasable by the first user and performance information indicating vehicle performance of the vehicle 900 associated with the first user. In addition, the information processing system 1 includes the identifier 240 that identifies an arrival time at which a product relating to the accepted product information, transported by the vehicle 900, arrives at a specified location, based on the accepted performance information. Because of this configuration, the information processing system 1 is capable of identifying an arrival time at which the product, transported by the vehicle 900, arrives at the specified location with high precision, based on the performance information of the vehicle 900.

In addition, according to the above-described configuration, the information processing system 1 further includes the notifier 250 that notifies the first user of an arrival time. Thus, since the information processing system 1 is capable of informing the first user of an arrival time identified with high precision, it is possible to improve convenience for the first user.

Modified Example 6 of Embodiment 1

In Embodiment 1, it was described that the information processing device 200 was installed in a business office BO of a broker that mediates sale of a product and the information processing device 200 executed the sales brokerage processing as illustrated in FIG. 5. It was also described that the information processing device 310 was installed in the shop SH1 and managed stock of products sold by the shop SH1 and the information processing device 320 was installed in the shop SH2 and managed stock of products sold by the shop SH2. Further, it was described that the vehicle 400 was used by an employee of the shop SH2 and transported a product having been sold by the shop SH2 to a pick-up location at which the vehicle 900 picked up the product.

However, Embodiment 1 is not limited to the above-described configuration, and the information processing device 200 according to the present modified example is installed in a not-illustrated business office of a sales company that sells products and executes not-illustrated sale processing of selling a product. In addition, the information processing device 310 according to the present modified example is installed in a not-illustrated storehouse ST1 that the sales company uses and the information processing device 310 manages stock of products stored in the storehouse ST1, and the information processing device 320 is installed in a not-illustrated storehouse ST2 that the sales company uses and the information processing device 320 manages stock of products stored in the storehouse ST2. Further, the vehicle 400 according to the present modified example is used by an employee of the storehouse ST2 and transports a product having been stored in the storehouse ST2 to a pick-up location.

Thus, the information storage 290 of the information processing device 200 according to the present modified example stores, in advance, a storehouse table, as illustrated in FIG. 18. Information relating to the storehouses ST1 and ST2, which store products, is stored in advance in the storehouse table. A plurality of records is stored in advance in the storehouse table. In the present modified example, in the first record, a storehouse ID "ST1" identifying the storehouse ST1, information indicating the location of the storehouse ST1, a vehicle ID having a value "NULL" indicating that the storehouse ST1 does not have a vehicle used by an employee of the storehouse ST1, and information indicating a load time required for an employee of the storehouse ST1 to load a product on the vehicle 900 are associated with one another and stored in advance.

In addition, in the present modified example, in the second record in the storehouse table, a storehouse ID "ST2" identifying the storehouse ST2, information indicating the location of the storehouse ST2, the vehicle ID "400" of the vehicle 400 used by an employee of the storehouse ST2, performance information of the vehicle 400, and information indicating a load time required for an employee of the storehouse ST2 to load a product on the vehicle 400 are associated with one another and stored in advance.

The information storage 290 of the information processing device 200 also stores, in advance, a product table, as illustrated in FIG. 19, in which information relating to products that the storehouses ST1 and ST2 sell is stored in advance. A plurality of records is stored in the product table in advance, and, in each record, product information relating to a product, a storehouse ID identifying the storehouse ST1 or ST2 that stores the product, a stock flag indicating whether or not the product is in stock in the storehouse ST1 or ST2 are associated with one another and stored in advance.

When starting the execution of the not-illustrated sale processing, the information processing device 200, by executing the same processing as the processing in steps S21 to S24 in FIG. 5, accepts a send request requesting sending of a list page. Next, the acquirer 210 of the information processing device 200 acquires one or a plurality of pieces of product information that is associated with stock flags indicating that the products are in stock from the product table in FIG. 19. Then, the identifier 240 outputs a list page in which a list of the acquired one or plurality of pieces of product information is contained to the data communication circuit 204a with the information processing device 100 as the destination.

Subsequently, the information processing device 200, by executing the same processing as the processing in steps S27 and S28 in FIG. 5, accepts a send request requesting sending of a product page and executes not-illustrated product page generation processing.

When starting the execution of the not-illustrated product page generation processing, the information processing device 200, by executing the same processing as the processing in step S41 in FIG. 10, acquires product information relating to a selected product. Next, the identifier 240 of the information processing device 200 extracts one or a plurality of storehouse IDs that is associated with the acquired product information and stock flags indicating that the products are in stock from the product table in FIG. 19.

Subsequently, when the information processing device 200, by executing the same processing as the processing in step S43 in FIG. 10, determines that there exists a storehouse ID that has not been checked among the extracted one or plurality of storehouse IDs, the information processing device 200 sets one of the storehouse IDs that have not been checked, as a target of a check. In the present modified example, in order to simplify description, the following description will be made using, as a specific example, a case where the storehouse ID "ST1" identifying the storehouse ST1 is set as a target of a check.

Subsequently, the information processing device 200 executes not-illustrated required time identification processing of identifying a required time required to transport a product that is stored in the storehouse (hereinafter, referred to as a checked storehouse) ST1 identified by the checked storehouse ID (hereinafter, referred to as a checked storehouse ID) "ST1" to a specified location specified by the first user.

When the execution of the required time identification processing is started, the information processing device 200, by executing the same processing as the processing in step S51 in FIG. 11, acquires location information and performance information of the vehicle 900 associated with the first user. Next, the acquirer 210 of the information processing device 200, by executing the same processing as the processing in step S52, acquires location information associated with the checked storehouse ID "ST1" from the storehouse table illustrated in FIG. 18.

Subsequently, the acquirer 210 of the information processing device 200, by executing the same processing as the processing in step S53, acquires the vehicle ID "NULL" associated with the checked storehouse ID "ST1" from the storehouse table illustrated in FIG. 18. Subsequently, the acquirer 210 determines that the value "NULL" of the acquired vehicle ID indicates that the checked storehouse ST1 does not have a vehicle that an employee of the checked storehouse ST1 uses. Next, the identifier 240 of the information processing device 200, by executing the same processing as the processing in step S55, determines the location of the checked storehouse ST1 to be a pick-up location at which the vehicle 900 picks up the product.

Subsequently, the identifier 240 of the information processing device 200, by executing the same processing as the processing in step S56, determines a movement route of the vehicle 900, based on the location information of the checked storehouse ST1 and the location information of the vehicle 900. Next, the acquirer 210 acquires information indicating a load time associated with the checked storehouse ID "ST1" from the storehouse table in FIG. 18. Subsequently, the identifier 240, by executing the same processing as the processing in step S57, identifies a required time required for the vehicle 900 to transport a product in the checked storehouse ST1 to the specified location, based on distance of the determined movement route, a maximum speed indicated by the performance information of the vehicle 900, and the load time at the checked storehouse ST1. Subsequently, the information processing device 200 terminates the execution of the required time identification processing.

After the required time identification processing has been executed, the above-described processing is repeated from the same processing as the processing in step S43 in FIG. 10. In the present embodiment, in order to simplify description, the following description will be made using, as a specific example, a case where the storehouse ID "ST2" identifying the storehouse ST2 has not been checked and the storehouse ID "ST2" is set as a target of a check.

The information processing device 200 determines that the storehouse ID "ST2" has not been checked, sets the storehouse ID "ST2" that has not been checked as a target of a check, and executes the not-illustrated required time identification processing again in order to identify a required time required to transport a product in the checked storehouse ST2 to the specified location.

When starting the execution of the required time identification processing, the information processing device 200 executes the same processing as the processing in steps S51 to S54 in FIG. 11. Through this processing, the information processing device 200 acquires location information and the vehicle ID "400" associated with the checked storehouse ID "ST2" from the storehouse table in FIG. 18 and determines that the value "400" of the acquired vehicle ID indicates that a vehicle is used by an employee of the checked storehouse ST2 and the vehicle to be used is the vehicle 400.

Next, the information processing device 200, by executing the same processing as the processing in step S58, acquires performance information of the vehicle 400 associated with the checked storehouse ID "ST2" from the storehouse table. Next, the information processing device 200 executes the same processing as the processing in steps S59 to S62. Through this processing, the information processing device 200 acquires information indicating a load time associated with the checked storehouse ID "ST2" from the storehouse table in FIG. 18. Next, based on the location information of the checked storehouse ST2 and the vehicle 900, the performance information of the vehicle 900 and the vehicle 400, and the information indicating the load time, the information processing device 200 determines a location that minimizes the required time to be a pick-up location at which the vehicle 900 picks up a product that the vehicle 400 transports from the checked storehouse ST2. Subsequently, the information processing device 200 terminates the execution of the required time identification processing.

Subsequently, when the information processing device 200, by executing the same processing as the processing in step S43 in FIG. 10, determines that there exists no storehouse ID that has not been checked, the information processing device 200 executes the same processing as the processing in steps S46 and S47. Through this processing, the information processing device 200 determines the storehouse ST1 or ST2 that is identified to have the shortest required time to be a storehouse that provides the first user with the product. Then, after having generated a product page in which the shortest required time is contained, the information processing device 200 terminates the execution of the product page generation processing.

In the present embodiment, in order to simplify description, the following description will be made using, as a specific example, a case where the shop ST1 is determined to be a provision storehouse that provides the first user with the product.

Subsequently, when the information processing device 200, by executing the same processing as the processing in steps S29 to S31 in FIG. 5, determines that the required time is approved and sale of a product is requested, the information processing device 200 sells the product in the provision storehouse ST1. Subsequently, the information processing device 200 generates a delivery request that includes selected product information and the vehicle ID "900" of the vehicle 900 and that requests a product relating to the product information to be delivered to the vehicle 900 identified by the vehicle ID "900". Subsequently, the controller 260 outputs the delivery request to the data communication circuit 204a with the information processing device 310, which is a sending destination corresponding to the provision storehouse ST1, as the destination. The sending destination corresponding to the provision storehouse ST1 is not limited to the information processing device 310 and may be an e-mail address of an employee of the provision storehouse ST1, and the information processing device 310 may be a smartphone carried by the employee and receive a delivery request that was sent with the e-mail address as the destination on the inside or outside of the provision storehouse ST1. Alternatively, the sending destination corresponding to the provision storehouse ST1 may be an application program that is executed in the information processing device 310.

When receiving the delivery request, the information processing device 310 displays the product information and the vehicle ID "900" included in the delivery request. The employee of the provision storehouse ST1 who has visually recognized the display on the information processing device 310 finds a product relating to the displayed product information in the provision storehouse ST1 and waits for arrival of the vehicle 900 identified by the displayed vehicle ID "900".

Subsequently, the information processing device 200 executes the same processing as the processing in steps S33 to S37. Through this processing, the information processing device 200 performs control of causing the vehicle 900 to move to the pick-up location. Next, the information processing device 200 performs control of causing the vehicle 900, which has received the product from the employee of the storehouse ST1 at the pick-up location, to move to the specified location with the picked-up product stored therein and subsequently terminates the sale processing.

Modified Example 7 of Embodiment 1

In Embodiment 1, it was described that the identifier 240 of the information processing device 200 determined, among one or more shops that had stock of a selected product relating to product information selected by the first user, the shop SH1 that had the shortest required time required for the vehicle 900 to transport the selected product to a specified location to be a provision shop that provided the first user with the product. In addition, in Modified Example 6 of Embodiment 1, it was described that the identifier 240 of the information processing device 200 determined, among one or more storehouses that had stock of a selected product, a storehouse ST1 that had the shortest required time required for the vehicle 900 to transport the selected product to a specified location to be a provision storehouse that provided the first user with the product.

However, the present disclosure is not limited to Embodiment 1 and Modified Example 6 of Embodiment 1. Embodiment 1 and Modified Example 6 of Embodiment 1 can be combined with each other. Thus, the information storage 290 of the information processing device 200 according to the present modified example that is a combination of Embodiment 1 and Modified Example 6 of Embodiment 1 stores M records in which information relating to shops is stored and N records in which information relating to storehouses is stored (where M and N are integers of 0 or more that satisfy M+N≥1).

In each of the M records, a shop ID that is identification information identifying a shop and product information relating to a product that the shop sells are associated with each other and stored. In each of the N records, a storehouse ID that is identification information identifying a storehouse and product information relating to a product that is stored in the storehouse are associated with each other and stored.

In addition, the identifier 240 of the information processing device 200 according to the present modified example extracts one or more pieces of identification information associated with product information accepted by the acceptor 230, from the information storage 290. The identifier 240 also identifies a required time required for the vehicle 900 to transport a product that is sold by a shop or a product that is stored in a storehouse to a specified location. The shop or the storehouse is identified by each of the extracted one or more pieces of identification information. Because of this configuration, the information processing system 1 is capable of identifying required times with respect to products that are respectively sold or stored at one or more of the shops and the storehouses.

In each of the M records stored in the information storage 290 according to the present modified example, a shop ID that is identification information identifying a shop, product information relating to a product that the shop sells, and a stock flag indicating whether or not the product is in stock in the shop are associated with one another and stored. In addition, in each of the N records, a storehouse ID that is identification information identifying a storehouse, product information relating to a product that is stored in the storehouse, and a stock flag indicating whether or not the product is in stock in the storehouse are associated with one another and stored. The identifier 240 according to the present modified example extracts one or more pieces of identification information associated with product information accepted by the acceptor 230 and stock flags indicating that the products are in stock, from the information storage 290. Because of this configuration, the information processing system 1 is capable of identifying a required time with respect to each of products that are in stock at one or more of the shops and the storehouses.

The identifier 240 according to the present modified example determines one shop or storehouse that provides the first user with a product out of shops and storehouses that are respectively identified by the extracted one or more pieces of identification information, based on the identified one or more required times. Specifically, the identifier 240 determines a shop or storehouse that has the shortest identified required time to be the shop or storehouse that provides the first user with the product. Since, because of this configuration, the information processing system 1 is capable of reducing the required time required for the product to be transported by the vehicle 900 to a specified location specified by the first user, it is possible to improve transport efficiency of the vehicle 900 and convenience for the first user. Although the delivery efficiency of the vehicle 900 is represented by, for example, the number of products per unit time that the vehicle 900 can transport to the specified location, the representation of the delivery efficiency is not limited thereto.

The information processing system 1 according to the present modified example further includes the data communication circuit 204*a* that sends the vehicle ID "900" identifying the vehicle 900 to an information processing device 310 or 320 that is the sending destination corresponding to the determined one shop or storehouse. Thus, even without sending information indicating a specified location specified by the first user to a sending destination corresponding to a shop or a storehouse, the information processing system 1 is capable of causing the vehicle 900 to transport a product to the specified location after an employee of the shop or the storehouse loads the product on the vehicle 900 identified by the sent vehicle ID "900". Therefore, the information processing system 1 is capable of suppressing leakage of personal information of the first user including information indicating the specified location specified by the first user. In addition, since the address of a specified location is often expressed by the address of a first user or a combination of the address and name of the first user, the information processing system 1 is capable of suppressing leakage of personal information including information indicating the address and name of the first user.

The identifier 240 according to the present modified example further determines a movement route including the first route from the location of the vehicle 900 to a pick-up location at which the vehicle 900 picks up a product and the second route from the pick-up location to a specified location and identifies a required time, based on the determined movement route. In addition, the pick-up location is a location located between the location of one shop or storehouse that is determined to be a shop or a storehouse that provides the first user with a product and the location of the vehicle 900. Because of this configuration, the information processing system 1 is capable of identifying a shorter required time than in a case where the pick-up location is the location of a shop or a storehouse.

Modified Example 8 of Embodiment 1

In Modified Example 5 of Embodiment 1, it was described that the identifier 240 of the information processing device 200 identified an arrival time at which a product, transported by the vehicle 900, arrived at a specified location. In addition, in Modified Example 7 of Embodiment 1, it was described that the identifier 240 of the information processing device 200 determined a shop or a storehouse that has the shortest required time required to transport a selected product to a specified location to be a provision shop or a provision storehouse that provided the first user with the product.

However, the present disclosure is not limited to Modified Example 5 of Embodiment 1 and Modified Example 7 of Embodiment 1. Modified Example 5 of Embodiment 1 and Modified Example 7 of Embodiment 1 can be combined with each other. The identifier 240 of the information processing device 200 according to the present modified example that is a combination of Modified Example 5 of Embodiment 1 and Modified Example 7 of Embodiment 1 determines a shop or a storehouse that has the earliest arrival time at which a product, transported by the vehicle 900, arrives at a specified location to be a provision shop or a provision storehouse that provides the first user with the product.

Modified Example 9 of Embodiment 1

In Embodiment 1, it was described that the information processing system 1 included the vehicle 400. In Embodiment 1, it was also described that, although the vehicle 400 was used by an employee of the shop SH2 and transported, from the shop SH2 to a pick-up location, a product having been sold by the shop SH2, the vehicle 400 was not used by an employee of the shop SH1 and did not transport a product having been sold by the shop SH1.

However, Embodiment 1 is not limited to the configuration, and the information processing system 1 does not have to include the vehicle 400. In addition, Embodiment 1 is not limited to this configuration, and the information processing system 1 may include the vehicle 400 and another not-illustrated vehicle. In this case, the not-illustrated vehicle may be used by an employee of the shop SH1 and transport a product having been sold by the shop SH1 from the shop SH1 to a pick-up location, and the vehicle 400 may be used by an employee of the shop SH2 and transport a product having been sold by the shop SH2 from the shop SH2 to the pick-up location.

Modified Example 10 of Embodiment 1

Although, in Embodiment 1, it was described that the pick-up-allowing locations included a road and a parking lot at which the vehicle 400 and the vehicle 900 can stop, Embodiment 1 is not limited thereto. The pick-up-allowing location may be an entrance of an apartment complex, an office building, a hotel, a commercial facility including a convenience store and a department store, or a public facility or an entranceway of a house at which the vehicle 400 and the vehicle 900 can stop. The pick-up-allowing location may also be a lobby of an apartment complex, an office building, a hotel, a commercial facility, or a public facility, a yard of a house, an apartment complex, an office building, a hotel, a commercial facility, or a public facility, a parking lot, or a park.

In addition, although, in Embodiment 1, it was described that, when arriving at a pick-up location, the vehicle 400 stopped at the pick-up location and, when arriving at a pick-up location or a specified location, the vehicle 900 stopped at the pick-up location or the specified location, Embodiment 1 is not limited thereto. When arriving at a pick-up location, the vehicle 400 may cruise or travel back and forth at a predetermined speed or less at the pick-up location, and, when arriving at a pick-up location or a specified location, the vehicle 900 may cruise or travel back and forth at a predetermined speed or less at the pick-up location or the specified location.

Modified Example 11 of Embodiment 1

Although, in Embodiment 1, it was described that the information processing device 200 mediated sale of one of selected products relating to a piece of product information selected by the first user, Embodiment 1 is not limited thereto. The information processing device 200 may mediate sale of a plurality of selected products. In this case, the vehicle 400 is only required to move from the shop SH2 to a pick-up location with a plurality of sold products stored in a not-illustrated storage cabinet, and the vehicle 900 is only required to move from the pick-up location to a specified location specified by the first user with the plurality of sold products stored in the storage cabinet 920. The plurality of sold products may be contained in, for example, a packaging container, which is a cardboard box, and transported by the vehicle 400 and the vehicle 900 or the plurality of sold products may be separately contained in a plurality of packaging container and transported by the vehicle 400 and the vehicle 900.

Although it was described that the storage cabinet 920 of the vehicle 900 included one storage box 921, Embodiment 1 is not limited thereto, and the storage cabinet 920 may include a plurality of storage boxes 921. In addition, the not-illustrated storage cabinet of the vehicle 400 may include a plurality of storage boxes.

Modified Example 12 of Embodiment 1

Although, in Embodiment 1, it was described that the information processing system 1 did not include the vehicle 900 associated with the first user, Embodiment 1 is not limited thereto, and the information processing system 1 may include the vehicle 900. In addition, although, in Embodiment 1, it was described that the vehicle 900 was associated with the first user, Embodiment 1 is not limited thereto, and the vehicle 900 does not have to be associated with the first user.

Modified Example 13 of Embodiment 1

Although, in Embodiment 1, it was described that the information processing device 100 was a smartphone, Embodiment 1 is not limited thereto, and the information processing device 100 may be a tablet-type personal computer or a laptop-type personal computer.

Modified Example 14 of Embodiment 1

Figure 20:
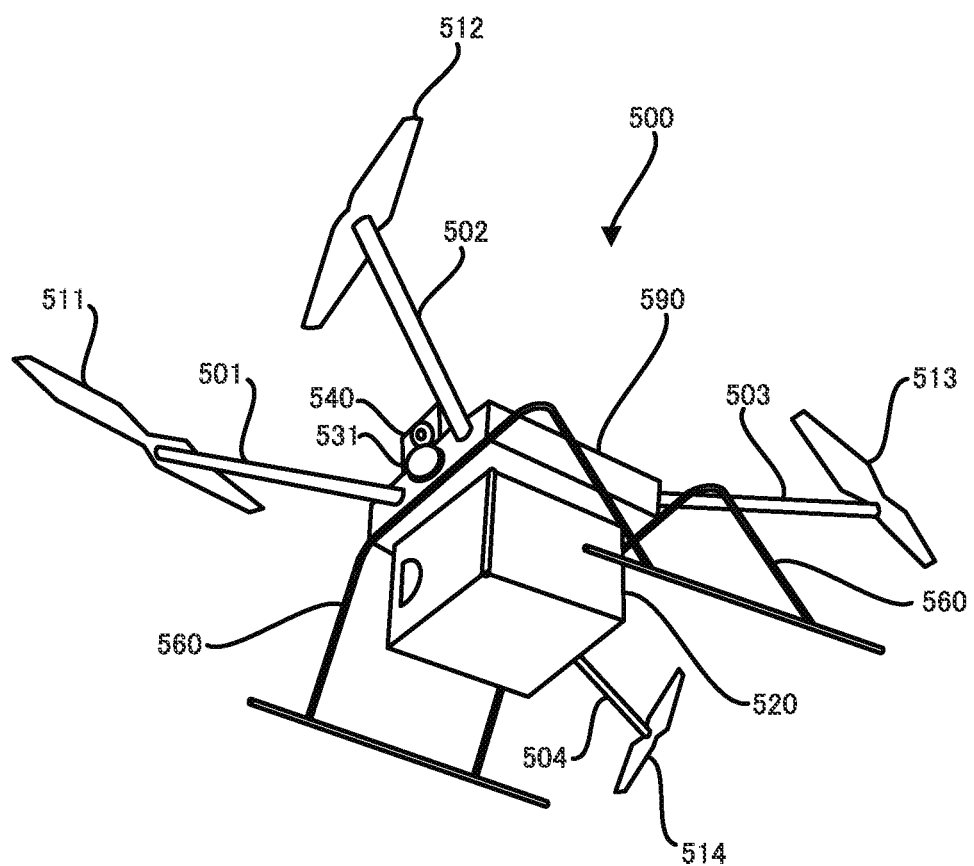
FIG. 20 is an appearance configuration diagram illustrating an appearance example of a vehicle according to Modified Example 14 of Embodiment 1.

In Embodiment 1, it was described that the information processing system 1 included the vehicle 400 that has the same configuration and functions as the configuration and functions of the vehicle 900 and that is an unmanned ground vehicle. However, Embodiment 1 is not limited to the configuration, and the information processing system 1 according to the present modified example includes a vehicle 500, as illustrated in FIG. 20, that is an unmanned aircraft, such as a drone.

Thus, vehicle performance of the vehicle 500 according to the present modified example includes mobile performance of the vehicle 500, and the mobile performance of the vehicle 500 includes flight performance of the vehicle 500. In addition, the flight performance of the vehicle 500 is represented by a flight speed that the vehicle 500 can achieve. Although, in the present modified example, the flight performance of the vehicle 500 is represented by the maximum flight speed of the vehicle 500, the present modified example is not limited thereto, and the flight performance of the vehicle 500 may be represented by an average flight speed of the vehicle 500.

The vehicle 500 according to the present modified example includes an information processing device 590 that controls an attitude and flight of the vehicle 500 and propeller arms 501 and 502 and propeller arms 503 and 504 that protrude right forward and left forward from the front surface of the information processing device 590 and left rearward and right rearward from the back surface of the information processing device 590, respectively. Further, the vehicle 500 includes propellers 511 to 514 that are installed on the tips of the propeller arms 501 to 504, respectively and not-illustrated motors that rotate the propellers 511 to 514 in accordance with control by the information processing device 590.

Further, on the under surface of the information processing device 590 of the vehicle 500, a storage cabinet 520 for storing a product is installed. A configuration and functions of the storage cabinet 520 that the vehicle 500 includes are the same as the configuration and the functions of the storage cabinet 920 that the vehicle 900 includes.

The vehicle 500 also includes a LiDAR sensor 531 that is installed on the front surface of the information processing device 590 and a not-illustrated LiDAR sensor that is installed on the back surface of the information processing device 590. Configurations and functions of the LiDAR sensor 531 on the front surface and the LiDAR sensor on the back surface that the vehicle 500 includes are the same as the configurations and functions of the LiDAR sensor 931 on the front surface and the LiDAR sensor on the back surface that the vehicle 900 includes.

The vehicle 500 further includes, on the upper surface of the information processing device 590, an imaging device 540 that has an optical axis and an angle of view adjusted in such a way as to image the front of the vehicle 500. A configuration and functions of the imaging device 540 that the vehicle 500 includes are the same as the configuration and the functions of the imaging device 940 that the vehicle 900 includes.

In addition, the vehicle 500 further includes support legs 560 that protrude downward from the under surface of the information processing device 590 and that support the information processing device 590.

The information processing device 590 of the vehicle 500 includes a not-illustrated CPU, RAM, ROM, flash memory, short-distance wireless communication circuit, long-distance wireless communication circuit, video card, display device, input device, location measurement circuit, input-output port, and drive circuit, which are hardware components. Configurations and functions of the hardware components that the information processing device 590 of the vehicle 500 includes are the same as the configurations and functions of the hardware components that the information processing device 990 of the vehicle 900 illustrated in FIG. 14 includes.

The drive circuit of the vehicle 500 is connected to not-illustrated cables that are respectively connected to not-illustrated motors that rotate the propellers 511 to 514. The drive circuit drives, in accordance with signals output by the CPU, the not-illustrated motors that rotate the propellers 511 to 514.

When the data communication circuit of the vehicle 500 receives a movement command sent from the information processing device 200, the CPU of the vehicle 500 executes not-illustrated movement processing in order to move in accordance with the movement command.

When starting the execution of the movement processing, the CPU of the vehicle 500 executes the same processing as the processing in steps S91 to S95 in FIG. 15. Through this processing, the CPU acquires the movement command and acquires, from the movement command, information indicating a third route from the shop SH2 to a pick-up location. Then, the CPU outputs a control signal for takeoff and a control signal for flight on the third route at the maximum speed in the forward direction to the drive circuit in order. The drive circuit drives, in accordance with the control signals, the motors that rotate the propellers 511 to 514.

Subsequently, when the CPU of the vehicle 500 determines that the vehicle 500 has arrived at the terminal point, the CPU outputs a control signal for landing on the pick-up location, which is the terminal point, to the drive circuit. Subsequently, the CPU of the vehicle 500, by executing the same processing as the processing in step S96, outputs an arrival report to the long-distance wireless communication circuit and subsequently terminates the execution of the movement processing.

Although, in Embodiment 1 and the present modified example, it was described that the vehicle 900 was a ground traveling vehicle, Embodiment 1 and the present modified example are not limited thereto. The vehicle 900 may be an unmanned aircraft that has the same configuration and functions as the configuration and the functions of the vehicle 500.

Thus, the vehicle performance of the vehicle 900 according to the present modified example includes flight performance of the vehicle 900, and the flight performance of the vehicle 900 is represented by a flight speed that the vehicle 900 can achieve. Although, in the present modified example, the flight performance of the vehicle 900 is represented by the maximum flight speed of the vehicle 900, the present modified example is not limited thereto, and the flight performance of the vehicle 900 may be represented by an average flight speed of the vehicle 900.

In this case, the vehicle 900, which is an unmanned aircraft, includes a robot arm 980 that was described in Modified Example 3 of Embodiment 1 and may, by executing the pick-up processing illustrated in FIG. 17, receive a product, using the robot arm 980 from the vehicle 400, which is a ground traveling vehicle that was described in Embodiment 1, or the vehicle 500, which is an unmanned aircraft that was described in the present modified example.

In addition, the present modified example is not limited to the configuration, and the vehicle 400, which is a ground traveling vehicle, or the vehicle 500, which is an unmanned aircraft, may include a not-illustrated robot arm, and a product may be handed over, using the robot arm from the vehicle 400 or 500 to the vehicle 900, which is an unmanned aircraft.

Further, the present modified example is not limited to the configuration, and the vehicle 400, which is a ground traveling vehicle, or the vehicle 500, which is an unmanned aircraft, may take out a product from the vehicle 400 or 500, using a robot arm of the vehicle 400 or 500, and the vehicle 900, which is an unmanned aircraft, may receive the taken-out product, using the robot arm 980 of the vehicle 900.

Although, in the present modified example, it was described that the vehicle 500 was an unmanned aircraft, the present modified example is not limited thereto, and the vehicle 500 may be an unmanned flying object. Although, in the present modified example, it was described that the vehicle 500 was a drone that gains lift and thrust from the propellers 511 to 514, the present modified example is not limited thereto. The vehicle 500 may include wings and gain lift from the wings or may include a gasbag filled with gas the specific gravity of which is lower than air and gain lift from the gasbag. In addition, the vehicle 500 may include a jet engine or a rocket engine and gain thrust from the jet engine or the rocket engine.

The vehicle 900, as with the vehicle 500, may be an unmanned flying object, include wings and gain lift from the wings, include a gasbag and gain lift from the gasbag, or include a jet engine or a rocket engine and gain thrust from the jet engine or the rocket engine.

Although, when the vehicle 900 is an unmanned aircraft, the pick-up-allowing locations include a road and a parking lot on which the vehicle 500 and the vehicle 900 can land, the present modified example is not limited thereto. The pick-up-allowing location may be an entrance of an apartment complex, an office building, a hotel, a commercial facility, or a public facility or an entranceway of a house on which the vehicle 500 and the vehicle 900 can land. The pick-up-allowing location may also be a lobby of an apartment complex, an office building, a hotel, a commercial facility, or a public facility or may be a yard, a veranda, or a rooftop of a house, an apartment complex, an office building, a hotel, a commercial facility, or a public facility, a parking lot, or a park.

When arriving at a pick-up location, the vehicle 500 may, instead of landing on the pick-up location, circle in the air or fly back and forth at a predetermined speed or less or perform a hovering flight at an altitude within a predetermined range. When arriving at a pick-up location or a specified location, the vehicle 900 may, instead of landing on the pick-up location or the specified location, circle in the air or fly back and forth at a predetermined speed or less or perform a hovering flight at an altitude within a predetermined range.

Modified Example 15 of Embodiment 1

Figure 21:
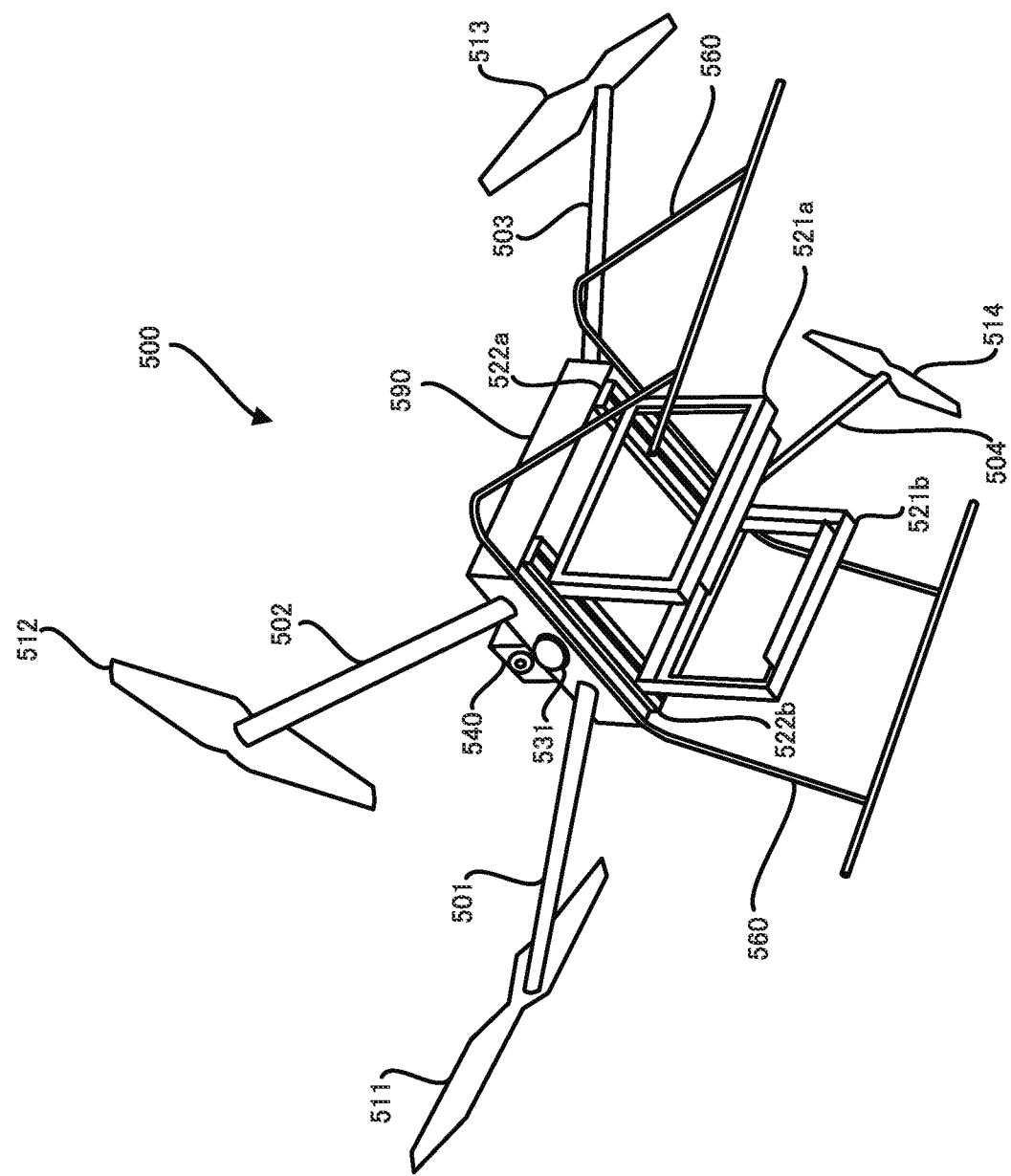
FIG. 21 is an appearance configuration diagram illustrating an appearance example of a vehicle according to Modified Example 15 of Embodiment 1.

Although, in Modified Example 14 of Embodiment 1, it was described that the vehicle 500 included, on the under surface of the information processing device 590, the storage cabinet 520 in which a product is stored, Embodiment 1 is not limited thereto. The vehicle 500 according to the present modified example includes a first holding frame 521a and a second holding frame 521b, as illustrated in FIG. 21, that surround and hold a product, on the under surface of the information processing device 590.

The first holding frame 521a of the vehicle 500 surrounds and holds the four sides of one (hereinafter, referred to as a first surrounded face) of the side faces of a rectangular parallelepiped shaped cardboard in which a product is packaged, and the second holding frame 521b surrounds and holds the four sides of another side face (hereinafter, referred to as a second surrounded face) opposite to the first surrounded face surrounded and held by the first holding frame 521a.

In addition, the vehicle 500 according to the present modified example includes, on the under surface of the information processing device 590, guide rails 522a and 522b that extend in the normal direction of the first surrounded face and the second surrounded face of the product, suspend the first holding frame 521a and the second holding frame 521b, and allow the movement direction of the first holding frame 521a and the second holding frame 521b to be the extending direction of the guide rails 522a and 522b.

Further, the vehicle 500 includes a not-illustrated motor that causes the first holding frame 521a and the second holding frame 521b to surround and hold a product by moving, in accordance with control by the information processing device 590, the first holding frame 521a and the second holding frame 521b in directions in which the first holding frame 521a and the second holding frame 521b come close to each other. The not-illustrated motor causes the first holding frame 521a and the second holding frame 521b to release a surrounded and held product by moving, in accordance with control by the information processing device 590, the first holding frame 521a and the second holding frame 521b in directions in which the first holding frame 521a and the second holding frame 521b move away from each other.

The not-illustrated drive circuit of the vehicle 500 drives, in accordance with a signal output by the not-illustrated CPU, the not-illustrated motor that moves the first holding frame 521a and the second holding frame 521b.

The vehicle 900 may include a not-illustrated first holding frame and second holding frame, guide rails, and a not-illustrated motor that moves the first holding frame and the second holding frame along the guide rail. Configurations and functions that the first holding frame, the second holding frame, the guide rails, and the motor of the vehicle 900 have are only required to be the same as the configurations and functions that the first holding frame 521a, the second holding frame 521b, the guide rails 522a and 522b, the motor that moves the first holding frame 521a and the second holding frame 521b of the vehicle 500 have.

Modified Example 16 of Embodiment 1

Although, in Embodiment 1, it was described that the specified location was specified in advance by the first user purchasing a product, the timing at which the first user specifies a specified location may be any timing, provided that the timing is before the execution of the sales brokerage processing illustrated in FIG. 5.

In addition, the specified location is not limited to a location that is specified by the first user before the execution of the sales brokerage processing and may be a location that is specified by the first user during the execution of the sales brokerage processing. Therefore, the CPU 101 that the information processing device 100 of the first user includes is only required to acquire information indicating a specified location specified by the first user in an address, based on a signal that corresponds to an operation by the first user and that the input device 105c outputs. Then, the CPU 101 output a send request, including the acquired information, for a product page with the information processing device 200 as the destination, in step S09 in FIG. 3. The acquirer 210 of the information processing device 200 is only required to acquire information indicating the specified location in an address from the send request for a product page that is accepted in step S27 in FIG. 5.

The specified location may be, for example, an entrance of an apartment complex where the first user lives or an entrance of an apartment complex where a second user who is a friend or the like of the first user to whom the first user presents a product lives, and may be any location, provided that the location is a location at which the vehicle 900 can stop.

Modified Example 17 of Embodiment 1

In Embodiment 1, it was described that the vehicles 400 and 900 were unmanned ground vehicles. In Modified Example 14 of Embodiment 1, it was described that the vehicles 500 and 900 were unmanned aircrafts. However, each of the vehicles 400, 500, and 900 is not necessarily unmanned, and provided that, with the exception of control by the information processing device 200, the vehicle is an object that autonomously moves, a person may be on board the vehicle.

Modified Example 18 of Embodiment 1

Although, in Embodiment 1, it was described that the information processing device 200 included the information storage 290, Embodiment 1 is not limited thereto. The information processing device 200 according to the present modified example does not include the information storage 290. The information processing device 200 according to the present modified example is connected to a not-illustrated information storage device that is, for example, a network attached storage (NAS) and that has the same functions as the functions of the information storage 290, via the Internet IN. In addition, the information processing device 200 performs the sales brokerage processing illustrated in FIG. 5, using information stored in the information storage device. The information processing system 1 according to the present modified example may include an information storage device or does not have to include an information storage device.

Modified Example 19 of Embodiment 1

In Embodiment 1, it was described that the information processing system 1 included the information processing device 200. In addition, in Embodiment 1, it was described that the CPU 201 of the information processing device 200, by executing the sales brokerage processing in FIG. 5, the product page generation processing in FIG. 10, the required time identification processing in FIG. 11, and the movement control processing in FIG. 12, functioned as the acquirer 210, the authenticator 220, the acceptor 230, the identifier 240, the notifier 250, and the controller 260 illustrated in FIG. 6. Further, it was described that the hard disk 203b of the information processing device 200 functioned as the information storage 290.

However, Embodiment 1 is not limited to the configuration, and the information processing system 1 does not have to include the information processing device 200. In this case, the sales brokerage processing in FIG. 5, the product page generation processing in FIG. 10, the required time identification processing in FIG. 11, and the movement control processing in FIG. 12 may be executed by the CPU 991 of the information processing device 990 that the vehicle 900 includes or the CPU 101 of the information processing device 100 carried by the first user. Therefore, the CPU 201 of the information processing device 200 does not function as the acquirer 210, the authenticator 220, the acceptor 230, the identifier 240, the notifier 250, and the controller 260, and the CPU 991 of the vehicle 900 or the CPU 101 of the information processing device 100 may function as not-illustrated functional units equivalent to those functional units. In addition, the hard disk 203b of the information processing device 200 does not function as the information storage 290, and the flash memory 993b of the vehicle 900 or the flash memory 103b of the information processing device 100 may function as a not-illustrated functional unit equivalent to the information storage 290.

In addition, Embodiment 1 is not limited to the above configuration, the sales brokerage processing in FIG. 5, the product page generation processing in FIG. 10, the required time identification processing in FIG. 11, and the movement control processing in FIG. 12 may be executed by one or more of the CPU 201 of the information processing device 200, the CPU 991 of the vehicle 900, and the CPU 101 of the information processing device 100 in a distributed manner.

Embodiment 2

Although, in Embodiment 1, it was described that the information processing device 200 mediated sale of a selected product relating to a piece of product information selected by the first user, the present disclosure is not limited thereto. An information processing device 200 according to the present embodiment mediates sale of a first product relating to product information selected by a first user and a second product. The second product is a product of a type different from the type of the first product and a product that a vehicle 900 can transport to a specified location in a required time required for the vehicle 900 to transport the first product to the specified location or within a time longer than the required time by a predetermined time. In the present embodiment, transport within a time includes transport in the time and transport in a time shorter than the time. Although, hereinbelow, as for the same constituent components as those in Embodiment 1, description will be made using the same reference numerals as those used in Embodiment 1, the description will focus on differences between the present embodiment and Embodiment 1.

Figure 22:
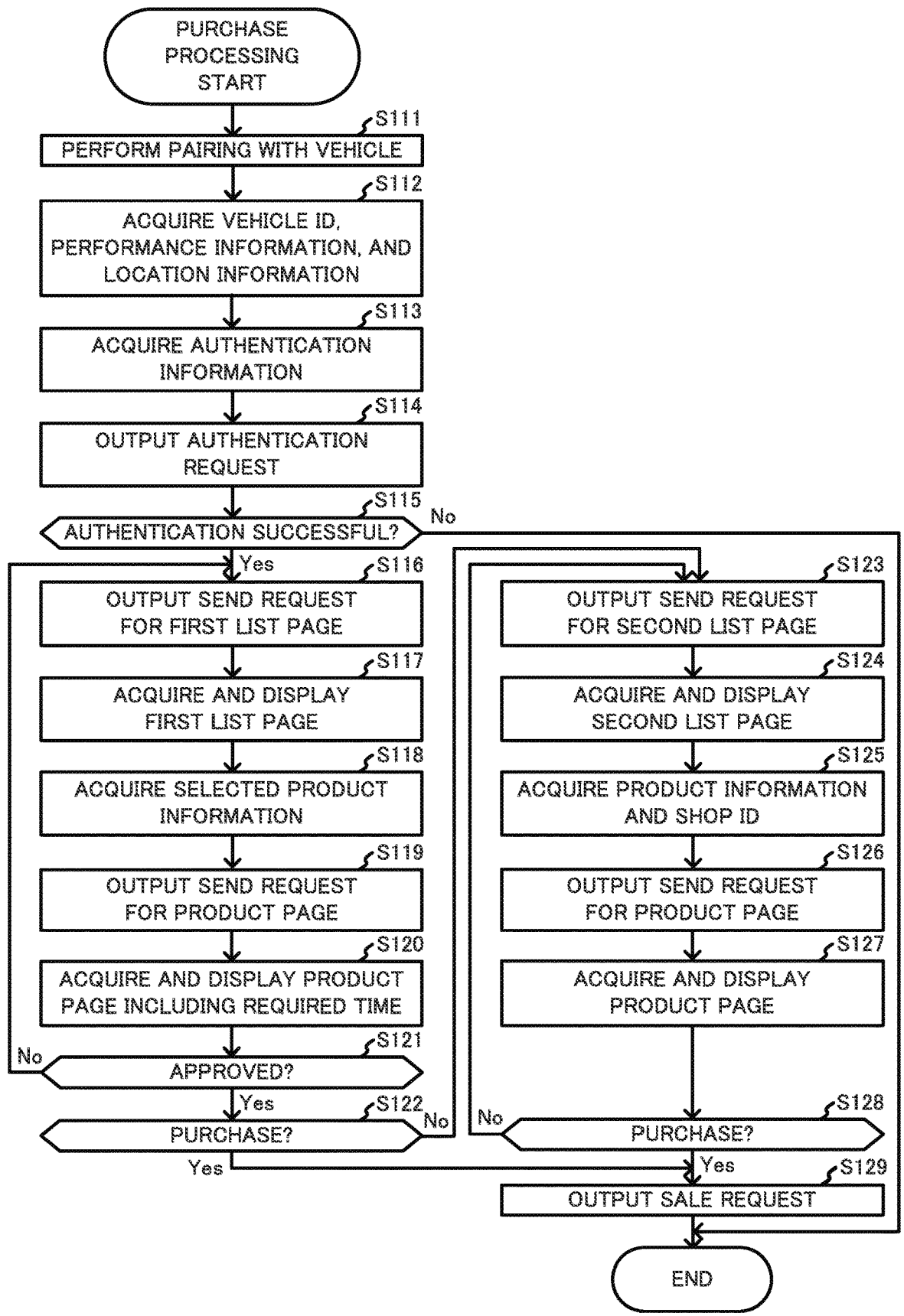
FIG. 22 is a flowchart illustrating an example of purchase processing that an information processing device of a user according to Embodiment 2 executes.

In the present embodiment, an information processing device 100 that is operated by the first user executes purchase processing as illustrated in FIG. 22 for purchase of the first product and the second product. When the execution of the purchase processing is started, a CPU 101 of the information processing device 100 executes the same processing as the processing in steps S01 to S07 in FIG. 3 (steps S111 to S117). Through this processing, the information processing device 100 receives a first list page in which a list of product information relating to purchasable products from the information processing device 200 and displays the received list page.

Next, the information processing device 100 executes the same processing as the processing in steps S08 to S10 (steps S118 to S120). Through this processing, the information processing device 100 acquires product information relating to a first product that the first user who has visually recognized the first list page considers purchasing. Subsequently, the information processing device 100 sends a send request that includes the acquired product information relating to the first product, and that requests sending of a product page in which a description of the first product and a required time required for the vehicle 900 to transport the first product to the specified location are contained, to the information processing device 200. Subsequently, when the information processing device 100 receives a product page of the first product from the information processing device 200, the information processing device 100 displays the received product page.

When the first user who has visually recognized the description of the first product and the required time contained in the product page does not approve the required time, the first user performs an operation for causing the information processing device 100 to redisplay the first list page (hereinafter, referred to as a first redisplay operation). When an input device 105c of the information processing device 100 outputs a signal corresponding to the first redisplay operation, the CPU 101 determines that the required time is not approved (step S121; No) and repeats the above-described processing from step S116.

In contrast, when the first user approves the required time and decides to purchase the first product, the first user performs a purchase operation on the information processing device 100. When the input device 105c of the information processing device 100 outputs a signal corresponding to the purchase operation, the CPU 101 determines that the required time is approved and purchase of the first product is decided (step S121; Yes and step S122; Yes). Subsequently, the CPU 101, by executing the same processing as the processing in step S12 in FIG. 3 (step S129), outputs a sale request that includes product information relating to the first product, that is a report announcing that the required time of the first product is approved, and that is a request requesting sale of the first product, and subsequently terminates the execution of the purchase processing.

In contrast, when the first user, although approving the required time, does not decide but defers the purchase of the first product in order to consider purchasing a second product, the first user performs an operation for causing a second list page to be displayed (hereinafter, referred to as a list display operation), on the information processing device 100. The second list page is a page in which a list of product information relating to second products and shop IDs of shops that sell the second products are contained. When the input device 105c of the information processing device 100 outputs a signal corresponding to the list display operation, the CPU 101 determines that the required time is approved and the purchase of the first product is not decided (step S121; Yes and step S122; No).

Next, the CPU 101 of the information processing device 100 outputs a request that is a report announcing that the required time is approved and that requests sending of the second list page (hereinafter, simply referred to as a send request for the second list page) to a long-distance wireless communication circuit 104b with the information processing device 200 as the destination (step S123). When the long-distance wireless communication circuit 104b, after having sent the send request to the information processing device 200, receives a second list page from the information processing device 200, the CPU 101 acquires the second list page from the long-distance wireless communication circuit 104b and causes a display device 105b to display the acquired second list page (step S124).

The first user who has visually recognized the second list page performs, on the information processing device 100, an operation of selecting, out of combinations of product information and shop IDs contained in the second list page, a combination of product information relating to a second product that the first user considers purchasing and a shop ID "SH1" or "SH2" of a shop SH1 or SH2 that sells the second product. When the input device 105c of the information processing device 100 outputs a signal corresponding to the operation, the CPU 101 of the information processing device 100 acquires a selected combination of product information and the shop ID "SH1" or "SH2", based on the signal (step S125).

Next, the CPU 101 of the information processing device 100 generates a send request requesting sending of a web page that includes the combination of product information and the shop ID "SH1" or "SH2" that was selected by the first user and in which a description of the second product that is sold by the shop SH1 or SH2 is contained (hereinafter, referred to as a product page of the second product). Subsequently, the CPU 101 outputs the generated send request to the long-distance wireless communication circuit 104b with the information processing device 200 as the destination (step S126).

When the long-distance wireless communication circuit 104b of the information processing device 100, after having sent the send request to the information processing device 200, receives a product page of the second product from the information processing device 200, the CPU 101 acquires the received product page of the second product and causes the display device 105b to display the acquired product page (step S127).

When the first user who has visually recognized the description of the second product contained in the product page does not decide the purchase of the second product, the first user performs an operation for causing the second list page to be redisplayed (hereinafter, referred to as a second redisplay operation), on the information processing device 100. When the input device 105c of the information processing device 100 outputs a signal corresponding to the second redisplay operation, the CPU 101 determines that the purchase of the second product is not decided (step S128; No). Subsequently, the CPU 101, by repeating the above-described processing from step S123, causes the second list page to be redisplayed.

In contrast, when the first user decides to purchase the first product and the second product, the first user performs a purchase operation on the information processing device 100. When the input device 105c of the information processing device 100 outputs a signal corresponding to the purchase operation, the CPU 101 determines that the purchase of the first product and the second product is decided (step S128; Yes). Subsequently, the CPU 101 generates a sale request that includes product information relating to the first product, product information relating to the second product, and the shop ID "SH1" or "SH2" of the shop SH1 or SH2 selling the second product and that requests sale of the first product and the second product. Next, the CPU 101 outputs the generated sale request to the long-distance wireless communication circuit 104b with the information processing device 200 as the destination (step S129) and subsequently terminates the execution of the purchase processing.

Figure 23A:
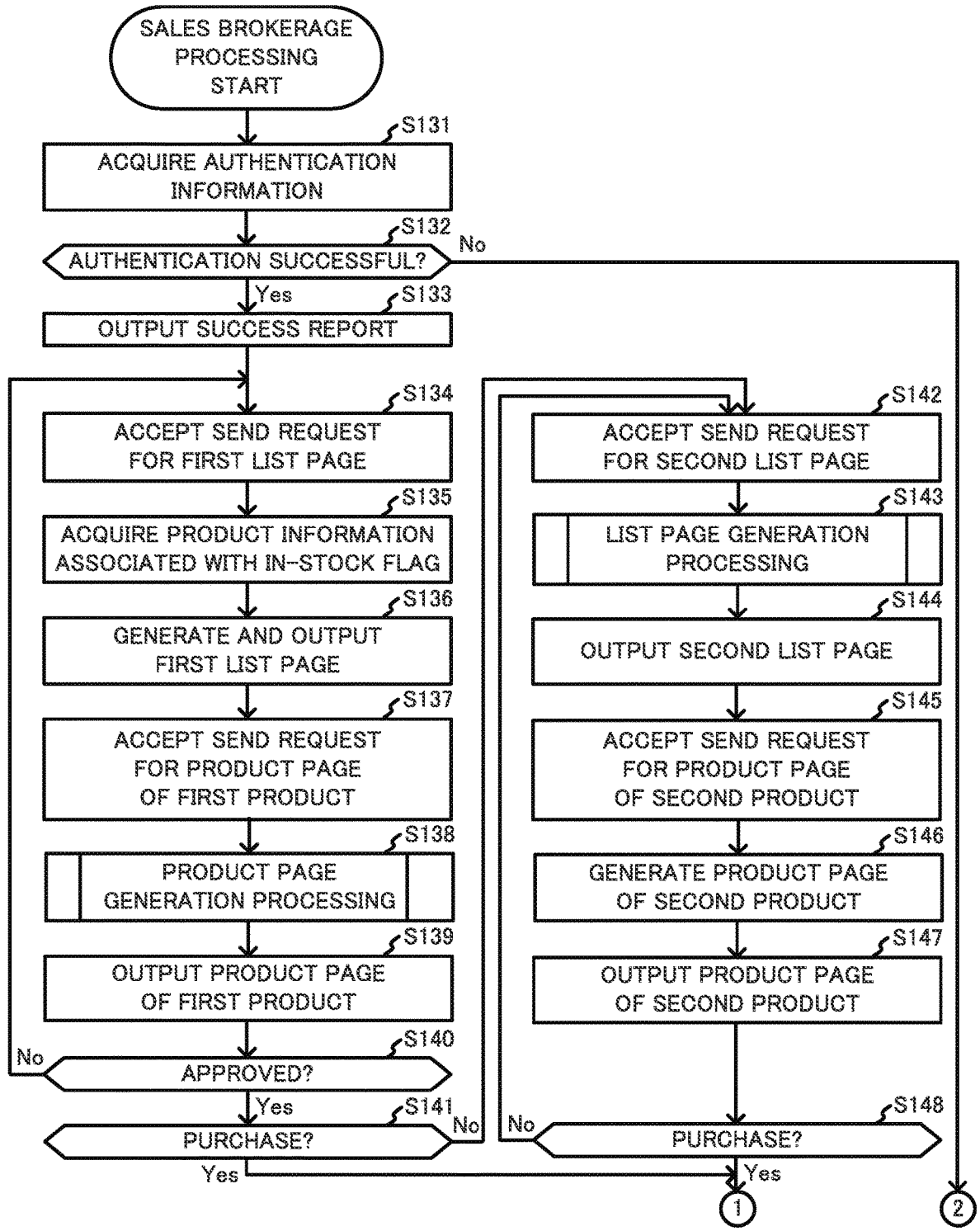
FIGS. 23A and 23B are a flowchart illustrating an example of sales brokerage processing that an information processing device of a business office according to Embodiment 2 executes.
Figure 23B:
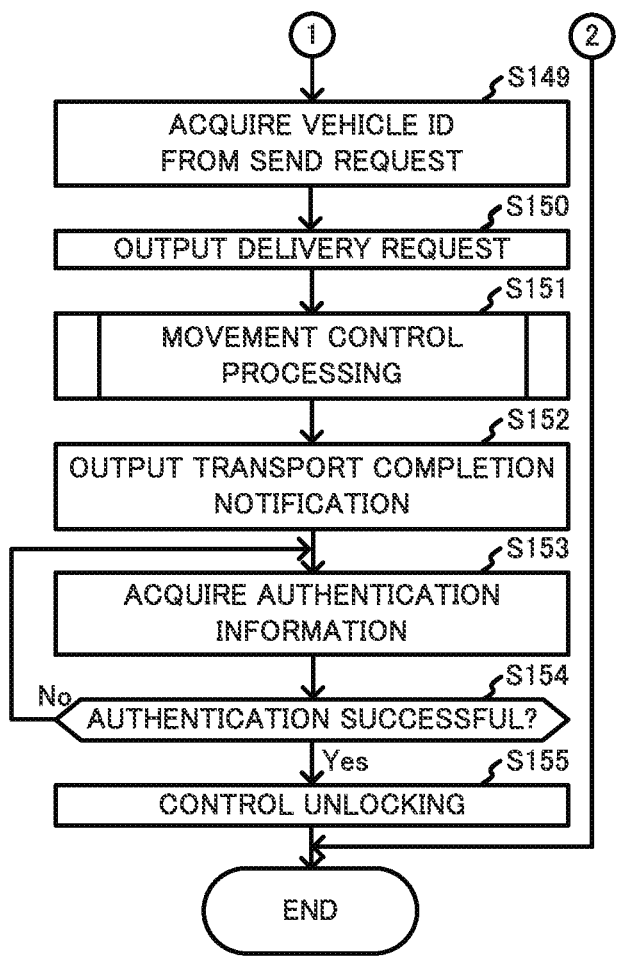

The information processing device 200 according to the present embodiment executes sales brokerage processing, as illustrated in FIGS. 23A and 23B, of mediating sale of the first product and the second product. When staring the execution of the sales brokerage processing, the information processing device 200 executes the same processing as the processing in steps S21 to S29 in FIG. 5 (steps S131 to S139). Through this processing, the information processing device 200 identifies a required time required for the vehicle 900 to transport the first product to a specified location and sends a product page including the identified required time to the information processing device 100.

Next, when the data communication circuit 204a of the information processing device 200 receives a send request requesting a first list page to be sent instead of a sale request, a controller 260 of the information processing device 200 determines that the required time of the first product is not approved (step S140; No). Subsequently, the information processing device 200 repeats the above-described processing from step S134.

In contrast, when the data communication circuit 204a of the information processing device 200 receives a sale request that includes product information of the first product but does not include product information of the second product, the controller 260 determines that the required time of the first product is approved and sale of the first product is requested (step S140; Yes and step S141; Yes). Subsequently, the information processing device 200, by executing the same processing as the processing in steps S31 to S37 (steps S149 to S155), performs, on the vehicle 900 or a vehicle 400 and the vehicle 900, control of causing the vehicle 900 or the vehicle 400 and the vehicle 900 to transport the sold first product to a specified location in the identified required time and subsequently terminates the execution of the sales brokerage processing.

In contrast, when the data communication circuit 204a of the information processing device 200 receives a send request requesting sending of a second list page instead of a sale request, the controller 260 determines that, although the required time of the first product is approved, the sale of the first product is not requested but deferred in order to consider purchasing a second product (step S140; Yes and step S141; No).

Subsequently, an acceptor 230 of the information processing device 200 accepts the send request received by the data communication circuit 204a (step S142). Next, the information processing device 200 executes list page generation processing, as illustrated in FIG. 24, of generating a second list page (step S143).

When starting the execution of the list page generation processing, an identifier 240 of the information processing device 200 generates a web page in which product information and a shop ID are not contained at all, as a second list page.

Next, an acquirer 210 of the information processing device 200 acquires one or a plurality of shop IDs that is associated with stock flags indicating that a product is in stock from a product table in FIG. 9 (step S161). Next, when the identifier 240 determines that there exists a shop ID that has not been checked among the acquired one or plurality of shop IDs (step S162; Yes), the identifier 240 sets one of the shop IDs that have not been checked, as a target of a check (step S163). In the present embodiment, in order to simplify description, the following description will be made using, as a specific example, a case where the shop ID "SH1" identifying the shop SH1 is set as a target of a check.

Subsequently, the identifier 240 of the information processing device 200 determines whether or not a provision shop that is determined to be a shop providing the first user with the first product in step S46 in FIG. 10 and the checked shop SH1 identified by the checked shop ID "SH1" are the same shop (step S164). In the present embodiment, in order to simplify description, the following description will be made using, as a specific example, a case where the shop SH1 is determined to be a provision shop that provides the first user with the first product.

On this occasion, since the checked shop ID "SH1" coincides with the shop ID "SH1" identifying the provision shop SH1, the identifier 240 of the information processing device 200 determines that the checked shop SH1 and the provision shop SH1 are the same shop (step S164; Yes). Thus, the identifier 240 determines that, when a product that is in stock in the checked shop SH1 is transported by the vehicle 900 in conjunction with the first product, the product can be transported in the required time of the first product. Therefore, the identifier 240 determines that a product that is in stock in the checked shop SH1 is a second product.

The reason why such a determination is made is that, in the present embodiment, there is no difference between a load time required for an employee of the shop SH1 to load only the first product on the vehicle 400 and a load time for the employee to load not only the first product but also a product of a type different from the type of the first product on the vehicle 400. However, there may be a difference between the load time in the case of loading only the first product and the load time in the case of loading the first product and a product of a type different from the type of the first product. In this case, the identifier 240 may determine that, since a predetermined time is set to a time longer than a difference between the load times in advance and, when a product that is in stock in the checked shop SH1 is transported by the vehicle 900 in conjunction with the first product, the product can be transported within a time longer than the required time of the first product by the predetermined time, the product is a second product. The difference between the load times may be an average value of differences that have been measured in the past or a maximum value of differences that have been measured in the past, and a person skilled in the art can determine, by experiment, a suitable value for the predetermined time.

Subsequently, the acquirer 210 of the information processing device 200 acquires one or a plurality of pieces of product information that is different from the product information relating to the first product and that is associated with the shop ID "SH1" of the checked shop SH1 and stock flags indicating that the products are in stock, from the product table in FIG. 9. Next, the identifier 240 combines the acquired one or plurality of pieces of product information and the checked shop ID with each other and adds the combinations to the second list page (step S171).

Subsequently, the information processing device 200 repeats the above-described processing from step S162. In the present embodiment, in order to simplify description, the following description will be made using, as a specific example, a case where the shop ID "SH2" identifying the shop SH2 has not been checked and the shop ID "SH2" is set as a target of a check.

In step S162, when the identifier 240 of the information processing device 200 determines that the shop ID "SH2" has not been checked (step S162; Yes), the identifier 240 sets the shop ID "SH2" as a target of a check (step S163). Next, since the checked shop ID "SH2" does not coincide with the shop ID "SH1" of the provision shop SH1, the identifier 240 of the information processing device 200 determines that the checked shop SH2 and the provision shop SH1 are different shops (step S164; No).

Subsequently, the information processing device 200, by executing the same processing as the processing in steps S53 and S54 in FIG. 11 (steps S165 and S166), determines that an employee of the checked shop SH2 uses a vehicle and the vehicle to be used is the vehicle 400 (step S166; Yes). Next, the acquirer 210 of the information processing device 200 acquires location information and performance information associated with the shop ID "SH2" of the checked shop SH2 from a shop table in FIG. 8 (step S167).

Subsequently, the identifier 240 of the information processing device 200, by executing the same processing as the processing in step S60 in FIG. 11 (step S168), determines a third route of the vehicle 400 from the checked shop SH2 to a pick-up location of the first product.

Next, the acquirer 210 of the information processing device 200 acquires information indicating a load time associated with the checked shop ID "SH2". Subsequently, the identifier 240 identifies a movement time required for the vehicle 400 to move to the pick-up location, based on the performance information of the vehicle 400 and distance of the third route. Next, the identifier 240 identifies a transport time required for a product to be transported to the pick-up location by adding a load time indicated by the acquired information to the movement time of the vehicle 400 (step S169).

Next, the identifier 240 of the information processing device 200 determines whether or not length of the transport time required for a product in the checked shop SH2 to be transported to the pick-up location is equal to or less than length of the movement time required for the vehicle 900 associated with the first user to move to the pick-up location (step S170). On this occasion, when the identifier 240 determines that the length of the transport time of the checked shop SH2 is equal to or less than the length of the movement time of the vehicle 900 (step S170; Yes), the identifier 240 determines that it is possible to cause the vehicle 900 to transport a product that is in stock in the checked shop SH2 to a specified location in the same time as the required time of the first product or within a time longer than the required time of the first product by the predetermined time. Therefore, the identifier 240 determines that a product that is in stock in the checked shop SH2 is a second product.

The reason why such a determination is made is that, in the present embodiment, the predetermined time is set to a time longer than a take-out time required for an employee of the shop SH1, which is the pick-up location, to take out a product of the shop SH2 from the vehicle 400, in advance. When there is a difference between the load times, the predetermined time is only required to be set to a time longer than a difference between the above-described load times and longer than the take-out time in advance. The take-out time may be an average value of times that have been required for employees to take out a product of the shop SH2 in the past or a maximum value thereof, and a person skilled in the art can determine, by experiment, a suitable value for the predetermined time.

That is, the reason why such a determination is made is that an employee of the provision shop SH1, which is a pick-up location, is able to take out a product of the checked shop SH2 from the vehicle 400 before the predetermined time elapses after the vehicle 900 arrives at the pick-up location in a case where the vehicle 400 that stores the product of the checked shop SH2 arrives at the pick-up location when or before the vehicle 900 arrives at the pick-up location of the first product. Thus, when the employee loads the taken-out product on the vehicle 900 in conjunction with the first product, a required time required to transport the product and the first product becomes, only by not more than the predetermined time, longer than a required time required to transport only the first product.

In addition, in a case where the vehicle 400 arrives at the pick-up location and the employee can take out a product of the checked shop SH2 from the vehicle 400 when or before the vehicle 900 arrives at the pick-up location, the employee is able to cause the first product and the product of the checked shop SH2 to be stored into the vehicle 900 immediately after the arrival of the vehicle 900. Thus, the required time required to transport the product and the first product becomes the same as the required time required to transport only the first product.

Subsequently, the acquirer 210 of the information processing device 200 acquires one or a plurality of pieces of product information that is different from the product information relating to the first product and that is associated with the shop ID "SH2" of the checked shop SH2 and stock flags indicating that the products are in stock, from the product table in FIG. 9. Next, the identifier 240 combines the acquired one or plurality of pieces of product information and the checked shop ID "SH2" with each other and adds the combinations to the second list page (step S171). Subsequently, the information processing device 200 repeats the above-described processing from step S162.

In step S170, when the identifier 240 of the information processing device 200 determines that the length of the transport time of the checked shop SH2 is longer than the length of the movement time of the vehicle 900 (step S170; No), the identifier 240 determines that it is not possible to cause the vehicle 900 to transport a product in the checked shop SH2 to a specified location within a time longer than the required time of the first product by the predetermined time. Subsequently, the information processing device 200 repeats the above-described processing from step S162.

When, in step S162, the identifier 240 of the information processing device 200 determines that there exists no shop ID that has not been checked (step S162; No), the information processing device 200 terminates the execution of the list page generation processing.

After having executed the list page generation processing in step S143 in FIG. 23A, the information processing device 200 executes the same processing as the processing in steps S26 to S29 in FIG. 5 (steps S144 to S147). Through this processing, the information processing device 200 sends the second list page to the information processing device 100. Subsequently, the information processing device 200 receives a send request requesting sending of a product page in which a description of a second product relating to product information selected by the first user is contained and subsequently sends the product page of the second product.

In the present embodiment, in order to simplify description, the following description will be made using, as a specific example, a case where a send request requesting sending of a product page of a second product that the shop SH2 sells is accepted.

Subsequently, when the data communication circuit 204a of the information processing device 200 receives a send request for a second list page instead of a sale request, the controller 260 of the information processing device 200 determines that sale of the second product is not requested (step S148; No). Subsequently, the information processing device 200 repeats the above-described processing from step S142.

In contrast, when the data communication circuit 204a of the information processing device 200 receives a sale request that includes the product information of the first product, product information of the second product, and the shop ID "SH2" of the shop SH2 that sells the second product, the controller 260 determines that sale of the first product and the second product is requested (step S148; Yes). Subsequently, the information processing device 200, by executing the same processing as the processing in step S31 in FIG. 5 (step S149), acquires the vehicle ID "900" of the vehicle 900 associated with the first user.

Next, the controller 260 of the information processing device 200 generates a delivery request that includes the product information of the first product and the vehicle ID "900" of the vehicle 900 picking up the first product and that requests the first product to be sold and delivered to the vehicle 900. Subsequently, the controller 260 outputs the generated delivery request to the data communication circuit 204a with an information processing device 310 of the provision shop SH1, which is determined to be a shop providing the first user with the first product, as the destination.

In addition, the controller 260 of the information processing device 200 generates a delivery request that includes the product information of the second product and the vehicle ID "900" of the vehicle 900 that picks up the second product. Next, the controller 260 outputs the generated delivery request to the data communication circuit 204a with the information processing device 320, which is a sending destination corresponding to the shop SH2 identified by the shop ID "SH2" included in the sale request, as the destination (step S150).

When receiving the delivery request, an information processing device 310 of the shop SH1 displays the product information of the first product and the vehicle ID "900" included in the delivery request. An employee of the shop SH1 who has visually recognized the display on the information processing device 310 finds the first product in, for example, a warehouse, settles accounts for sale of the first product, and subsequently waits for arrival of the vehicle 900.

When receiving the delivery request, the information processing device 320 of the shop SH2 displays the product information of the second product and the vehicle ID "900" included in the delivery request. An employee of the shop SH2 who has visually recognized the display on the information processing device 320, after having found the second product and settled accounts for sale of the second product, loads the second product into a not-illustrated storage cabinet that the vehicle 400 of the shop SH2 includes, and performs an operation for inputting the vehicle ID "900" on the vehicle 400. The vehicle 400 displays the vehicle ID "900" in accordance with the operation and sends a loading completion report to the information processing device 200.

After having executed the processing in step S150, the information processing device 200 according to the present embodiment executes not-illustrated movement control processing in order to perform, on the vehicles 400 and 900, control of causing the vehicles 400 and 900 to transport the first product and the second product to a specified location within the required time or within a time longer than the required time by the predetermined time (step S151).

When starting the execution of the movement control processing, the information processing device 200, by executing the same processing as the processing in steps S71 and S72 in FIG. 12, causes the vehicle 900 associated with the first user to display the vehicle ID "900" and move to the shop SH1, which is the pick-up location, at the maximum speed.

Next, when the information processing device 200, by executing the same processing as the processing in steps S73, S78, and S79, determines that loading of the second product on the vehicle 400 is completed, the information processing device 200 causes the vehicle 400 to display the vehicle ID "900" and move to the pick-up location at the maximum speed.

When the vehicle 400 arrives at the shop SH1, which is the pick-up location, the employee of the shop SH1 determines whether or not the vehicle ID "900" displayed on the vehicle 400 coincides with the vehicle ID "900" displayed on the information processing device 310. Next, when determining that the vehicle IDs "900" coincide with each other, the employee takes out the second product from the vehicle 400. In addition, when the vehicle 900 arrives at the shop SH1, the employee of the shop SH1 determines whether or not the vehicle ID "900" displayed on the vehicle 900 coincides with the vehicle ID "900" displayed on the information processing device 310. Next, when determining that the vehicle IDs "900" coincide with each other, the employee loads the first product and the second product on the vehicle 900 and performs, on the vehicle 900, an operation of causing the vehicle 900 to send a pick-up completion report announcing that the loading of the first product and the pick-up of the second product are completed. The vehicle 900 sends the pick-up completion report in response to the operation.

When, after having executed the same processing as the processing in step S79, the information processing device 200, by executing the same processing as the processing in steps S82 and S83, determines that the loading of the first product and the pick-up of the second product are completed, the information processing device 200 causes a storage cabinet 920 of the vehicle 900 to be locked. Next, the information processing device 200, by executing the same processing as the processing in steps S84, S85, and S77, causes the vehicle 400 to return to the shop SH2 and causes the vehicle 900 to move to the specified location at the maximum speed, and subsequently terminates the execution of the not-illustrated movement control processing.

After having executed the processing in step S151 in FIG. 23B, the information processing device 200, by executing the same processing as the processing in steps S34 to S37 in FIG. 5 (steps S152 to S155), delivers the first product and the second product to the first user and subsequently terminates the execution of the sales brokerage processing.

According to the above-described configuration, an information processing system 1 includes the data communication circuit 204a that sends an identified required time of a first product to the information processing device 100 that the first user uses. In addition, when a send request for a second list page that is a report announcing that the required time of the first product is approved and that is a request requesting sending of the second list page is received by the data communication circuit 204a, the identifier 240 identifies a second product that is transportable to a specified location by the vehicle 900 in conjunction with the first product in the required time of the first product or within a time longer than the required time of the first product by a predetermined time. In addition, the data communication circuit 204a of the information processing device 200 sends a second list page including product information relating to the identified second product to the information processing device 100. Therefore, the information processing system 1 is capable of sending product information relating to the second product that is transportable to the specified location by the vehicle 900 without extending the approved required time or with the approved required time extended only by not more than the predetermined time, to the information processing device 100. Thus, the information processing system 1 is capable of improving convenience for the first user who uses the information processing device 100 compared with, for example, a case of, after having sent the required time of the first product to the information processing device 100, sending product information relating to a product that extends the required time by a time longer than the predetermined time to the information processing device 100.

According to the above-described configuration, the information processing system 1 includes the controller 260 that, when a sale request requesting sale of the first product and the second product is received by the data communication circuit 204a, performs, on the vehicle 900, control of causing the vehicle 900 to transport the first product and the second product to a specified location in the required time of the first product or within a time longer than the required time of the first product by the predetermined time. Thus, the information processing system 1 is capable of improving transport efficiency of the vehicle 900.

Modified Example 1 of Embodiment 2

In Embodiment 2, the description was made using, as a specific example, a case where the first user decides purchasing a first product that is sold by the shop SH1 and a second product that is sold by the shop SH2. However, in the present modified example, the description will be made using, as a specific example, a case where the first user decides purchasing a first product and a second product that are sold by the shop SH1.

Thus, the information processing device 200 according to the present modified example receives, from the information processing device 100 that the first user uses, a sale request including product information of the first product, product information of the second product, and the shop ID "SH1" of the shop SH1 that sells the second product. Next, the information processing device 200 determines that sale of the first product and the second product in the shop SH1 is requested (step S148; Yes).

Subsequently, the information processing device 200, by executing the same processing as the processing in step S31 in FIG. 5 (step S149), acquires the vehicle ID "900" of the vehicle 900 associated with the first user. Next, the controller 260 of the information processing device 200 generates a delivery request that includes the product information of the first product, the product information of the second product, and the vehicle ID "900" of the vehicle 900 picking up the first product and the second product and that requests the first product and the second product to be sold and delivered to the vehicle 900. Subsequently, the controller 260 outputs the generated delivery request to the data communication circuit 204a with the information processing device 310, which is a sending destination corresponding to the shop SH1 that sells the first product and the second product, as the destination (step S150).

When receiving the delivery request, the information processing device 310 of the shop SH1 displays the product information of the first product, the product information of the second product, and the vehicle ID "900" included in the delivery request. An employee of the shop SH1 who has visually recognized the display on the information processing device 310 finds the first product and the second product in, for example, a warehouse, settles accounts for sale of the first product and the second product, and subsequently waits for arrival of the vehicle 900.

After having executed the processing in step S150, the information processing device 200 according to the present embodiment executes the movement control processing illustrated in FIG. 12 in order to perform, on the vehicle 900, control of causing the vehicle 900 to transport the first product and the second product to a specified location within a required time (step S151).

When starting the execution of the movement control processing, the information processing device 200, by executing the processing in steps S71 to S73 in FIG. 12 (steps S71 to S73), causes the vehicle 900 to display the vehicle ID "900" and move to a pick-up location at the maximum speed. When the vehicle 900 arrives at the shop SH1 that is the pick-up location, the employee of the shop SH1 determines whether or not the vehicle ID "900" displayed on the vehicle 900 coincides with the vehicle ID "900" displayed on the information processing device 310. When determining that the IDs coincide with each other, the employee loads the first product and the second product on the vehicle 900.

After having executed the processing in step S73, the information processing device 200, by executing the processing in steps S74 to S77 (steps S74 to S77), causes the vehicle 900 to move to a specified location specified by the first user at the maximum speed. Subsequently, the information processing device 200 terminates the execution of the movement control processing.

After having executed the processing in step S151 in FIG. 23B, the information processing device 200, by executing the same processing as the processing in steps S34 to S37 in FIG. 5 (steps S152 to S155), delivers the first product and the second product to the first user and subsequently terminates the execution of the sales brokerage processing.

Modified Example 2 of Embodiment 2

In Embodiment 2, in step S46 in FIG. 10 the description was made using, as a specific example, a case where the shop SH1 is determined to be a provision shop that provides the first user with the first product. However, in the present modified example, the description will be made using, as a specific example, a case where the shop SH2 is determined to be a provision shop that provides the first user with the first product.

When starting the execution of the list page generation processing illustrated in FIG. 24, the information processing device 200 according to the present modified example, by executing the processing in steps S161 to S163 (steps S161 to S163), sets one of shops that have not been checked among shops that have stock of products as a target of a check. In the present modified example, in order to simplify description, the following description will be made using, as a specific example, a case where the shop ID "SH1" identifying the shop SH1 is set as a target of a check.

Subsequently, since the checked shop ID "SH1" does not coincide with the shop ID "SH2" of the provision shop SH2, which is determined to be a shop that provides the first user with the first product, the identifier 240 of the information processing device 200 determines that the checked shop SH1 and the provision shop SH2 are different shops (step S164; No).

Next, the information processing device 200, by executing the same processing as the processing in steps S53 and S54 in FIG. 11 (steps S165 and S166), determines that an employee of the checked shop SH1 does not use a vehicle (step S166; No). Therefore, the identifier 240 determines that a product that is in stock in the checked shop SH1 cannot be transported to the specified location unless the vehicle 900 moves to the checked shop SH1 to pick up the product. Thus, the identifier 240 determines that a product that is in stock in the checked shop SH1 cannot be transported to the specified location by the vehicle 900 that transports the first product sold by the shop SH2 unless the required time of the first product is extended by a time longer than a predetermined time. Therefore, the identifier 240 determines that a product that is in stock in the checked shop SH1 is not a second product.

Subsequently, the information processing device 200 repeats the above-described processing from step S162. When, in step S162, the identifier 240 of the information processing device 200 determines that there exists no shop ID that has not been checked (step S162; No), the information processing device 200 terminates the execution of the list page generation processing.

Modified Example 3 of Embodiment 2

Although, in Embodiment 2, it was described that, when the vehicle 400 of the shop SH2 arrived at the shop SH1 that was the pick-up location, an employee of the shop SH1 took out the second product stored in the vehicle 400 and loaded the taken-out second product on the vehicle 900 associated with the first user, Embodiment 2 is not limited thereto.

The vehicle 900 may include a robot arm 980 described in Modified Example 3 of Embodiment 1, take out the second product from the vehicle 400 that has arrived at the shop SH1 that is the pick-up location, using the robot arm 980, and load the taken-out second product into the storage cabinet 920 of the vehicle 900. In this case, the predetermined time is only required to be set, in advance, to a time longer than a transfer time required for the vehicle 900 to, in order to transfer the product, take out the second product from the vehicle 400 and load the taken-out second product into the storage cabinet 920 of the vehicle 900, using the robot arm 980. The transfer time may be an average value of times that have been required for the vehicle 900 to transfer products in the past or a maximum value thereof, and a person skilled in the art can determine, by experiment, a suitable value for the predetermined time.

In addition, Embodiment 2 is not limited to the configuration, the vehicle 400 may include a not-illustrated robot arm and, when arriving at the shop SH1 that is the pick-up location, take out the second product from the vehicle 400, using the not-illustrated robot arm and load the taken-out second product into the storage cabinet 920 of the vehicle 900.

Modified Example 4 of Embodiment 2

In Embodiment 2, it was described that, since the information processing system 1 did not include a vehicle that is used by an employee of the shop SH1, the information processing system 1 determined the shop SH1 to be the pick-up location of the first product that the shop SH1 sold and the second product that the shop SH2 sold. In addition, in Embodiment 2, it was described that, when the vehicle 400 of the shop SH2 arrived at the shop SH1 that was the pick-up location, an employee of the shop SH1 took out the second product of the shop SH2 stored in the vehicle 400 and loaded the taken-out second product and the first product of the shop SH1 on the vehicle 900 associated with the first user.

However, Embodiment 2 is not limited to the configuration, the information processing system 1 may include a not-illustrated vehicle that is used by an employee of the shop SH1 and determine a location located at an intermediate location among the shops SH1 and SH2 and a specified location specified by the first user to be the pick-up location of the first product of the shop SH1 and the second product of the shop SH2. In this case, the vehicle 900 may include the robot arm 980 described in Modified Example 3 of Embodiment 1, take out the first product from the vehicle of the shop SH1 that has arrived at the pick-up location, using the robot arm 980, and load the taken-out first product into the storage cabinet 920 of the vehicle 900. In this case, the vehicle 900 may also take out the second product from the vehicle 400 of the shop SH2 that has arrived at the pick-up location, using the robot aim 980, and load the taken-out second product into the storage cabinet 920 of the vehicle 900.

Modified Example 5 of Embodiment 2

Modified Example 5 of Embodiment 1 in which an arrival time at which a product, transported by the vehicle 900, arrives at a specified location is identified and Embodiment 2 can be combined with each other. Thus, the information processing system 1 according to the present modified example that is a combination of Modified Example 5 of Embodiment 1 and Embodiment 2 includes the data communication circuit 204a that sends an identified arrival time of the first product to the information processing device 100 that the first user uses. In addition, when a send request for a second list page that is a report announcing that the arrival time of the first product is approved and that is a request requesting sending of the second list page is received by the data communication circuit 204a, the identifier 240 of the information processing device 200 identifies a second product that is transportable to a specified location by the vehicle 900 in conjunction with the first product at the arrival time of the first product or at a time later than the arrival time of the first product by a predetermined time. In addition, the data communication circuit 204a of the information processing device 200 sends a second list page including product information relating to the identified second product to the information processing device 100. Therefore, the information processing system 1 is capable of sending product information relating to a product that is transportable to the specified location by the vehicle 900 without delaying the approved arrival time or with the approved arrival time delayed only by not more than the predetermined time, to the information processing device 100. Thus, the information processing system 1 is capable of improving convenience for the first user who uses the information processing device 100 compared with, for example, a case of, after having sent the required time of the first product to the information processing device 100, sending product information relating to a product that delays the arrival time by a time longer than the predetermined time to the information processing device 100.

According to the above-described configuration, the information processing system 1 includes the controller 260 that, when a sale request requesting sale of the first product and the second product is received by the data communication circuit 204a, performs, on the vehicle 900, control of causing the vehicle 900 to transport the first product and the second product to the specified location at the arrival time of the first product or by a time later than the arrival time of the first product by the predetermined time. Thus, the information processing system 1 is capable of improving transport efficiency of the vehicle 900.

Modified Example 6 of Embodiment 2

In Embodiment 2, it was described that the information processing device 200 mediated sale of the first product relating to product information selected by the first user and the second product that is a product of a type different from the type of the first product and that the vehicle 900 can transport to a specified location in a required time required for the vehicle 900 to transport the first product to the specified location or within a time longer than the required time by a predetermined time.

However, Embodiment 2 is not limited to the configuration, the information processing device 200 may mediate sale of the first product and second to K-th products (where K is a natural number of 3 or more) that are products of types different from the type of the first product and that are transportable by the vehicle 900 to a specified location in the required time of the first product or within a time longer than the required time by a predetermined time.

Embodiments 1 and 2, Modified Examples 1 to 19 of Embodiment 1, and Modified Examples 1 to 6 of Embodiment 2 of the present disclosure can be combined with one another.

It is possible to provide the present disclosure as not only the information processing device 200 that includes a configuration for achieving functions according to any one of Embodiments 1 and 2, Modified Examples 1 to 19 of Embodiment 1, and Modified Examples 1 to 6 of Embodiment 2 and the information processing device 100 and the information processing device 990 that include configurations for achieving functions according to Modified Example 19 of Embodiment 1 but also a system that is a system constituted by a plurality of devices and that includes, as a whole system, a configuration for achieving functions according to any one of Embodiments 1 and 2, Modified Examples 1 to 19 of Embodiment 1, and Modified Examples 1 to 6 of Embodiment 2.

It is possible to provide the present disclosure as the information processing device 200 that includes, in advance, a configuration for achieving functions according to any one of Embodiments 1 and 2, Modified Examples 1 to 19 of Embodiment 1, and Modified Examples 1 to 6 of Embodiment 2 of the present disclosure. In addition, application of programs enables an existing information processing device to function as the information processing device 200 according to any one of Embodiments 1 and 2, Modified Examples 1 to 19 of Embodiment 1, and Modified Examples 1 to 6 of Embodiment 2. That is, a computer (a CPU or the like) that controls an existing information processing device executing programs for achieving respective functional configurations achieved by the information processing device 200 exemplified in any one of Embodiments 1 and 2, Modified Examples 1 to 19 of Embodiment 1, and Modified Examples 1 to 6 of Embodiment 2 enables the existing information processing device to function as the information processing device 200 according to any one of Embodiments 1 and 2, Modified Examples 1 to 19 of Embodiment 1, and Modified Examples 1 to 6 of Embodiment 2.

It is possible to provide the present disclosure as the information processing device 990 that includes, in advance, a configuration for achieving functions according to Modified Example 19 of Embodiment 1 of the present disclosure. In addition, application of programs enables an existing information processing device to function as the information processing device 990 according to Modified Example 19 of Embodiment 1. That is, a computer (a CPU or the like) that controls an existing information processing device executing programs for achieving respective functional configurations achieved by the information processing device 990 exemplified in the above-described Modified Example 19 of Embodiment 1 enables the existing information processing device to function as the information processing device 990 according to Modified Example 19 of Embodiment 1.

It is possible to provide the present disclosure as the information processing device 100 that includes, in advance, a configuration for achieving functions according to Modified Example 19 of Embodiment 1 of the present disclosure. In addition, application of programs enables an existing information processing device to function as the information processing device 100 according to Modified Example 19 of Embodiment 1. That is, a computer (a CPU or the like) that controls an existing information processing device executing programs for achieving respective functional configurations achieved by the information processing device 100 exemplified in the above-described Modified Example 19 of Embodiment 1 enables the existing information processing device to function as the information processing device 100 according to Modified Example 19 of Embodiment 1.

Any distribution method of such programs can be used, and the programs can be stored and distributed in a recording medium, such as a memory card, a compact disc (CD)-ROM, and a digital versatile disk (DVD)-ROM, or can be distributed via a communication medium, such as the Internet.

A method according to the present disclosure can be implemented using the information processing device 200 according to any one of Embodiments 1 and 2, Modified Examples 1 to 19 of Embodiment 1, and Modified Examples 1 to 6 of Embodiment 2 and the information processing device 100 and the information processing device 990 according to Modified Example 19 of Embodiment 1. In addition, the method according to the present disclosure can be implemented using the information processing system 1 according to any one of Embodiments 1 and 2, Modified Examples 1 to 19 of Embodiment 1, and Modified Examples 1 to 6 of Embodiment 2.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDICES

Appendix 1

An information processing system characterized by including:

an acceptor that accepts product information relating to a product purchasable by a user and performance information indicating vehicle performance of a vehicle associated with the user; and an identifier that performs identification of a required time required for the vehicle to transport the product relating to the accepted product information to a specified location specified by the user or identification of an arrival time at which the product, transported by the vehicle, arrives at the specified location, based on the accepted performance information.

Appendix 2

The information processing system according to Appendix 1 characterized by further including a notifier that notifies the user of the required time or the arrival time.

Appendix 3

The information processing system according to Appendix 1 or 2, characterized in that
the identifier
from a storage that stores either one or more pieces of information in each of which identification information identifying a shop selling a product and the product information relating to the product that the shop sells are associated with each other or one or more pieces of information in each of which identification information identifying a storehouse storing a product and the product information relating to the product stored in the storehouse are associated with each other, extracts one or more pieces of identification information associated with the accepted product information, and
identifies the required time required to transport, to the specified location, each of products respectively sold by shops or products respectively stored in storehouses or the arrival time at which each of the products, transported to the specified location, arrives at the specified location, the shops being respectively identified by the extracted one or more pieces of identification information, the warehouses being respectively identified by the extracted one or more pieces of identification information.

Appendix 4

The information processing system according to Appendix 3, characterized in that
the storage stores either one or more pieces of the information in each of which the identification information identifying the shop, the product information relating to the product that the shop sells, and stock information indicating whether or not the product is in stock in the shop are associated with one another or one or more pieces of the information in each of which the identification information identifying the storehouse, the product information relating to the product stored in the storehouse, stock information indicating whether or not the product is in stock in the storehouse are associated with one another, and the identifier extracts the one or more pieces of identification information each of which is associated with the accepted product information and the stock information indicating that the product relating to the product information is in stock, from the storage.

Appendix 5

The information processing system according to Appendix 3 or 4, characterized in that the identifier determines one shop or storehouse that provides the user with the product out of the shops or the storehouses each of which is identified by one of the extracted one or more pieces of identification information, based on the identified one or more required times or arrival times.

Appendix 6

The information processing system according to Appendix 5 characterized by further including a communicator that sends information identifying the vehicle to a sending destination corresponding to the determined one shop or storehouse.

Appendix 7

The information processing system according to Appendix 5 or 6, characterized in that
the identifier
further determines a movement route including a route from a location of the vehicle to a pick-up location at which the vehicle picks up the product and a route from the pick-up location to the specified location, and
identifies the required time or the arrival time, based on the determined movement route, and
the pick-up location is a location located between a location of the determined one shop or storehouse and the location of the vehicle.

Appendix 8

The information processing system according to any one of Appendices 1 to 7, characterized in that the vehicle is owned by the user.

Appendix 9

The information processing system according to any one of Appendices 1 to 8, characterized in that the vehicle is associated with a plurality of users including the user.

Appendix 10

The information processing system according to any one of Appendices 1 to 5 characterized by further including:
a communicator that sends the identified required time or the identified arrival time to an information processing device that the user uses, wherein
when a report announcing that the required time or the arrival time is approved is received by the communicator, the identifier identifies a second product that is transportable to the specified location by the vehicle in conjunction with a first product that is the product in the required time or within a time longer than the required time by a predetermined time or at the arrival time or by a time later than the arrival time by the predetermined time, and the communicator sends product information relating to the identified second product to the information processing device of the user.

Appendix 11

The information processing system according to Appendix 10, characterized in that the information processing system further includes a controller that, when a sale request requesting sale of the first product and the second product is received by the communicator, performs, on the vehicle, control of causing the vehicle to transport the first product and the second product to the specified location in the required time or within the time longer than the required time by the predetermined time or control of causing the vehicle to transport the first product and the second product and arrive at the specified location at the arrival time or by the time later than the arrival time by the predetermined time.

Appendix 12

A device characterized by including:
an acceptor that accepts product information relating to a product purchasable by a user and performance information indicating vehicle performance of a vehicle associated with the user; and
an identifier that performs identification of a required time required for the vehicle to transport the product relating to the accepted product information to a specified location specified by the user or identification of an arrival time at which the product, transported by the vehicle, arrives at the specified location, based on the accepted performance information.

Appendix 13

A method characterized by including:
an acceptance step of accepting, by an information processing system or an information processing device, product information relating to a product purchasable by a user and performance information indicating vehicle performance of a vehicle associated with the user; and
an identification step of performing, by the information processing system or the information processing device, identification of a required time required for the vehicle to transport the product relating to the accepted product information to a specified location specified by the user or identification of an arrival time at which the product, transported by the vehicle, arrives at the specified location, based on the accepted performance information.

REFERENCE SIGNS LIST

1 Information processing system
100, 200, 310, 320, 590, 990 Information processing device
101, 201, 991 CPU
102, 202, 992 RAM
103a, 203a, 993a ROM
103b, 993b Flash memory
104a, 994a Short-distance wireless communication circuit
104b, 994b Long-distance wireless communication circuit
104c Voice communication circuit
105a, 205a, 995a Video card
105b, 205b, 995b Display device
105c, 205c, 995c Input device
106, 996 Location measurement circuit 109a Speaker
109b Microphone
203b Hard disk
204a Data communication circuit
210 Acquirer
220 Authenticator
230 Acceptor
240 Identifier
250 Notifier
260 Controller
290 Information storage
400, 500, 900 Vehicle
501 to 504 Propeller arm
511 to 514 Propeller
520, 920 Storage cabinet
521a First holding frame
521b Second holding frame
522a, 522b Guide rail
531, 931 LiDAR sensor
540, 940, 982 Imaging device
560 Support leg
901, 902 Wheel
910 Vehicle body
921 Storage box
921a Door
921b Door frame
921c Deadbolt
921d Strike
980 Robot arm
981 Gripper
983 Arm
998 Input-output port
999 Drive circuit
BO Business office
IN Internet
SH1, SH2 Shop

The invention claimed is:

1. A device comprising:
at least one memory storing program code including acceptor code, first identifier code, second identifier code, and controller code; and
at least one processor configured to read the program code and operate as instructed by the program code, wherein
the at least one processor is configured to execute the acceptor code to accept product information relating to a first product purchasable by a user and performance information indicating vehicle performance of an associated vehicle that is a vehicle associated with the user,
the at least one processor is configured to execute the first identifier code to perform identification of a required time required for the associated vehicle to transport the first product relating to the accepted product information to a specified location specified by the user or identification of an arrival time at which the first product, transported by the associated vehicle, arrives at the specified location, based on the accepted performance information,
the device further comprises a communication circuit configured to send the identified required time or the identified arrival time to an information processing device that the user uses,
the at least one processor is configured to execute the second identifier code to identify a second product when a report announcing that the required time or the arrival time is approved is received by the communication circuit,
the second product is a product
(1) that is transportable to the specified location by the associated vehicle in conjunction with the first product
(a) (i) in the required time or (ii) within a time longer than the required time by a predetermined time, or
(b) (i) at the arrival time or (ii) by a time later than the arrival time by the predetermined time, and
(2) that is sold by a shop different from a provision shop providing the user with the first product, or that is stored in a storehouse different from a provision storehouse providing the user with the first product,
the communication circuit is configured to send product information relating to the identified second product to the information processing device of the user, and
the at least one processor is configured to execute the controller code to perform, when a sale request requesting sale of the first product and the second product is received by the communication circuit, on the associated vehicle,
(a) control of causing the associated vehicle to transport the first product and the second product to the specified location (i) in the required time or (ii) within the time longer than the required time by the predetermined time, or
(b) control of causing the associated vehicle to transport the first product and the second product to arrive at the specified location (i) at the arrival time or (ii) by the time later than the arrival time by the predetermined time.

2. A method to be executed by an information processing system or an information processing device, the method by comprising:
accepting product information relating to a first product purchasable by a user and performance information indicating vehicle performance of an associated vehicle that is a vehicle associated with the user;
performing identification of a required time required for the associated vehicle to transport the first product relating to the accepted product information to a specified location specified by the user or identification of an arrival time at which the first product, transported by the associated vehicle, arrives at the specified location, based on the accepted performance information;
sending the identified required time or the identified arrival time to an information processing device that the user uses;
receiving a report announcing that the required time or the arrival time is approved; and
identifying a second product when the report is received, wherein
the second product is a product
(1) that is transportable to the specified location by the associated vehicle in conjunction with the first product
(a) (i) in the required time or (ii) within a time longer than the required time by a predetermined time, or
(b) (i) at the arrival time or (ii) by a time later than the arrival time by the predetermined time, and
(2) that is sold by a shop different from a provision shop providing the user with the first product, or that is stored in a storehouse different from a provision storehouse providing the user with the first product,
the method further comprises
sending product information relating to the identified second product to the information processing device of the user, receiving a sale request requesting sale of the first product and the second product, and performing, when the sale request is received, on the associated vehicle, (a) control of causing the associated vehicle to transport the first product and the second product to the specified location (i) in the required time or (ii) within the time longer than the required time by the predetermined time, or (b) control of causing the associated vehicle to transport the first product and the second product to arrive at the specified location (i) at the arrival time or (ii) by the time later than the arrival time by the predetermined time.

3. An information processing system comprising:

at least one memory storing program code including acceptor code, first identifier code, second identifier code, and controller code; and at least one processor configured to read the program code and operate as instructed by the program code, wherein the at least one processor is configured to execute the acceptor code to accept product information relating to a first product purchasable by a user and performance information indicating vehicle performance of an associated vehicle that is a vehicle associated with the user, the at least one processor is configured to execute the first identifier code to perform identification of a required time required for the associated vehicle to transport the first product relating to the accepted product information to a specified location specified by the user or identification of an arrival time at which the first product, transported by the associated vehicle, arrives at the specified location, based on the accepted performance information, the information processing system further comprises a communication circuit configured to send the identified required time or the identified arrival time to an information processing device that the user uses, the at least one processor is configured to execute the second identifier code to identify a second product when a report announcing that the required time or the arrival time is approved is received by the communication circuit, the second product is a product (1) that is transportable to the specified location by the associated vehicle in conjunction with the first product (a) (i) in the required time or (ii) within a time longer than the required time by a predetermined time, or (b) (i) at the arrival time or (ii) by a time later than the arrival time by the predetermined time, and (2) that is sold by a shop different from a provision shop providing the user with the first product, or that is stored in a storehouse different from a provision storehouse providing the user with the first product, the communication circuit is configured to send product information relating to the identified second product to the information processing device of the user, and the at least one processor is configured to execute the controller code to perform, when a sale request requesting sale of the first product and the second product is received by the communication circuit, on the associated vehicle, (a) control of causing the associated vehicle to transport the first product and the second product to the specified location (i) in the required time or (ii) within the time longer than the required time by the predetermined time, or (b) control of causing the associated vehicle to transport the first product and the second product to arrive at the specified location (i) at the arrival time or (ii) by the time later than the arrival time by the predetermined time.

4. The information processing system according to claim 3, wherein the program code further includes acquirer code, the at least one processor is configured to execute the acquirer code to acquire information indicating a location of the associated vehicle configured to pick up the first product, from a storage storing, by associating, the product information relating to the first product, and information indicating a location of the provision shop providing the user with the first product or a location of the provision storehouse providing the user with the first product, acquire the information indicating the location of the provision shop or the provision storehouse with which the accepted product information is associated, and acquire information indicating a location of the specified location specified by the user, and the at least one processor is configured to execute the first identifier code to identify a pre-pick-up movement time that is a time required for the associated vehicle to move from the location of the associated vehicle to a pick-up location at which the associated vehicle picks up the first product, the pick-up location being at the location of the provision shop or the provision storehouse, and a post-pick-up movement time that is a time required for the associated vehicle that has picked up the first product to move from the pick-up location to the specified location, based on the location of the associated vehicle, the location of the provision shop or the provision storehouse, and the location of the specified location that are indicated by the acquired information, and the vehicle performance of the associated vehicle indicated by the accepted performance information, and identify the required time required for the associated vehicle to transport the first product to the specified location or the arrival time at which the first product, transported by the associated vehicle, arrives at the specified location, based on the identified pre-pick-up movement time and the identified post-pick-up movement time.

5. The information processing system according to claim 4, wherein the storage further stores, by associating, product information relating to a considered product that the user considers purchasing, information indicating a location of a consideration shop that is a shop different from the provision shop and selling the considered product or a location of a consideration storehouse that is a storehouse different from the provision storehouse and storing the considered product, and information indicating vehicle performance of a transport vehicle that moves while transporting the considered product from the consideration shop or the consideration storehouse, and the at least one processor is configured to execute the second identifier code to identify a transport time required for the considered product to be transported by the transport vehicle from the consideration shop or the consideration storehouse to the pick-up location at which the associated vehicle picks up the considered product transported by the transport vehicle, based on the location of the consideration shop or the consideration storehouse, the vehicle performance of the transport vehicle, and the location of the pick-up location that are indicated by the stored information, and identify, when the identified transport time of the considered product is less than or equal to the pre-pick-up movement time required for the associated vehicle to move to the pick-up location, the considered product as the second product that is transportable to the specified location by the associated vehicle in conjunction with the first product
(a) (i) in the required time or (ii) within the time longer than the required time by the predetermined time, or
(b) (i) at the arrival time or (ii) by the time later than the arrival time by the predetermined time.

6. The information processing system according to claim 5, wherein
the pick-up location is a location at which the associated vehicle picks up the first product from an employee of the provision shop or the provision storehouse and the associated vehicle picks up the second product that is taken out from the transport vehicle by the employee.

7. The information processing system according to claim 6, wherein
the at least one processor is configured to execute the controller code to perform, when the sale request requesting sale of the first product and the second product is received by the communication circuit,
control of causing the associated vehicle and the transport vehicle that stores the second product to move to the pick-up location, and
after a pick-up completion report announcing that pick-up of the first product and the second product is completed is received by the communication circuit, control of causing the associated vehicle that stores the first product and the second product to move to the specified location.

8. The information processing system according to claim 3, wherein
the program code further includes acquirer code,
the at least one processor is configured to execute the acquirer code to
acquire information indicating a location of the associated vehicle configured to pick up the first product, from a storage storing, by associating, the product information relating to the first product, information indicating a location of the provision shop providing the user with the first product or a location of the provision storehouse providing the user with the first product, and information indicating vehicle performance of a first transport vehicle that moves while transporting the first product from the provision shop or the provision storehouse, acquire the information indicating the location of the provision shop or the provision storehouse with which the accepted product information is associated and the information indicating the vehicle performance of the first transport vehicle with each of which the accepted product information is associated,
acquire information indicating a location of a pick-up location at which the associated vehicle picks up the first product from the first transport vehicle, and
acquire information indicating a location of a specified location specified by the user,
the pick-up location is a location that is located between the location of the provision shop or the provision storehouse and the location of the associated vehicle and at which the associated vehicle picks up the first product from the first transport vehicle that moves while transporting the first product from the provision shop or the provision storehouse, and
the at least one processor is configured to execute the first identifier code to
identify a pre-pick-up movement time that is a time required for the associated vehicle to move from the location of the associated vehicle to the location of the pick-up location, based on the location of the associated vehicle and the location of the pick-up location that are indicated by the acquired information, and the vehicle performance of the associated vehicle indicated by the accepted performance information,
identify a first transport time required for the first transport vehicle to transport the first product from the location of the provision shop or the provision storehouse to the location of the pick-up location, based on the location of the provision shop or the provision storehouse, the location of the pick-up location, and the vehicle performance of the first transport vehicle that are indicated by the acquired information,
identify a post-pick-up movement time that is a time required for the associated vehicle that has picked up the first product from the first transport vehicle to move from the pick-up location to the specified location, based on the location of the pick-up location and the location of the specified location that are indicated by the acquired information, and the vehicle performance of the associated vehicle indicated by the accepted performance information, and
based on the identified pre-pick-up movement time, the identified first transport time, and the identified post-pick-up movement time, identify the required time required for the associated vehicle to transport the first product to the specified location or the arrival time at which the first product, transported by the associated vehicle, arrives at the specified location.

9. The information processing system according to claim 8, wherein
the storage further stores, by associating, product information relating to a considered product that the user considers purchasing, information indicating a location of a consideration shop that is a shop different from the provision shop and selling the considered product or a location of a consideration storehouse that is a storehouse different from the provision storehouse and storing the considered product, and information indicating vehicle performance of a second transport vehicle that moves while transporting the considered product from the consideration shop or the consideration storehouse, and
the at least one processor is configured to execute the second identifier code to
identify a second transport time required for the second transport vehicle to transport the considered product from the consideration shop or the consideration storehouse to the pick-up location, based on the location of the consideration shop or the consideration storehouse and the vehicle performance of the second transport vehicle that are indicated by the stored information, and the location of the pick-up location indicated by the acquired information, and identify, when the identified second transport time of the considered product is less than or equal to the pre-pick-up movement time required for the associated vehicle to move to the pick-up location, the considered product as the second product that is transportable to the specified location by the associated vehicle in conjunction with the first product
  (a) (i) in the required time or (ii) within the time longer than the required time by the predetermined time, or
  (b) (i) at the arrival time or (ii) by the time later than the arrival time by the predetermined time.

10. The information processing system according to claim 9, wherein the at least one processor is configured to execute the controller code to perform, when the sale request requesting sale of the first product and the second product is received by the communication circuit, control of causing the associated vehicle, the first transport vehicle that stores the first product, and the second transport vehicle that stores the second product to move to the pick-up location, and when an arrival report announcing that the associated vehicle arrives at the pick-up location, an arrival report announcing that the first transport vehicle arrives at the pick-up location, and an arrival report announcing that the second transport vehicle arrives at the pick-up location are received by the communication circuit, control of causing an robot arm included in the associated vehicle to take out the first product from the first transport vehicle and store the first product into the associated vehicle, and control of causing the robot arm included in the associated vehicle, to take out the second product from the second transport vehicle and store the second product into the associated vehicle.

11. The information processing system according to claim 10, wherein the at least one processor is configured to execute the controller code to perform, when a pick-up completion report announcing that pick-up of the first product and the second product is completed is received by the communication circuit, control of causing the associated vehicle that stores the first product and the second product to move to the specified location.

12. The information processing system according to claim 11, wherein the at least one processor is configured to execute the acquirer code to acquire from the storage a plurality of pieces of information, each information indicating a pick-up-allowing location at which the associated vehicle is capable of picking up the first product from the first transport vehicle, and the at least one processor is configured to execute the first identifier code to identify, for each pick-up-allowing location, the required time or the arrival time of a case in which a pick-up-allowing location is determined as the pick-up location, the pick-up-allowing location being located at a location of the locations indicated by the plurality of acquired pieces of information and between the location of the provision shop or the provision storehouse and the location of the associated vehicle, based on the location of the associated vehicle, the locations of the pick-up-allowing locations, the location of the provision shop or the provision storehouse, the vehicle performance of the first transport vehicle, and the location of the specified location that are indicated by the acquired information, and the vehicle performance of the associated vehicle indicated by the accepted performance information, and determine, as the pick-up location, a single pick-up-allowing location that is identified to have a shortest required time or a fastest arrival time from among the pick-up-allowing locations located at the locations indicated by the plurality of acquired pieces of information.

13. The information processing system according to claim 12, wherein the at least one processor is configured to execute the first identifier code to identify, based on the acquired information, a smallest sphere including the location of the provision shop or the provision storehouse, and the location of the associated vehicle, and from among the pick-up-allowing locations located at the locations indicated by the plurality of acquired pieces of information, identify one or more pick-up-allowing locations located on an inner side of a surface of the identified smallest sphere as pick-up-allowing locations located between the location of the provision shop or the provision storehouse and the location of the associated vehicle.

14. The information processing system according to claim 5, wherein the at least one processor is configured to execute the first identifier code to extract, from the storage that stores either one or more pieces of information in which identification information identifying a shop including the provision shop and product information relating to a product including the first product and sold at the shop are associated with each other, and information in which identification information identifying a storehouse including the provision storehouse and product information relating to a product including the first product and stored in the storehouse are associated with each other, one or more pieces of identification information associated with the accepted product information, and identify the required time required to transport, to the specified location, each of the products respectively sold by the shops or the products respectively stored in the storehouses, or the arrival time at which each of the products, transported to the specified location, arrives at the specified location, the shops being respectively identified by the extracted one or more pieces of identification information, the storehouses being respectively identified by the extracted one or more pieces of identification information.

15. The information processing system according to claim 14, wherein the storage stores either one or more pieces of the information in which the identification information identifying the shop, the product information relating to the product that the shop sells, and stock information indicating whether or not the product is in stock in the shop are associated with one another, and the information in which the identification information identifying the storehouse, the product information relating to the product stored in the storehouse, and stock information indicating whether or not the product is in stock in the storehouse are associated with one another, and the at least one processor is configured to execute the first identifier code to extract, from the storage, the one or more pieces of identification information that is associated with the accepted product information and the stock information indicating that the product relating to the product information is in stock.

16. The information processing system according to claim 14, wherein
the at least one processor is configured to execute the first identifier code to determine the provision shop or the provision storehouse that provides the user with the product out of the shops or the storehouses each of which is identified by one of the extracted one or more pieces of identification information, based on the identified one or more required times or arrival times.

17. The information processing system according to claim 14, wherein
the communication circuit is configured to send information identifying the associated vehicle to a sending destination corresponding to the determined provision shop or the determined provision storehouse.

18. The information processing system according to claim 4, wherein
the at least one processor is configured to execute the first identifier code to
further determine a movement route including a route from the location of the associated vehicle to the pick-up location at which the associated vehicle picks up the first product and a route from the pick-up location to the specified location, and
identify the required time or the arrival time based on the determined movement route.

19. The information processing system according to claim 3, wherein the associated vehicle is owned by the user.

20. The information processing system according to claim 3, wherein the associated vehicle is associated with a plurality of users including the user.

* * * * *